US009164841B2

(12) United States Patent
Resch

(10) Patent No.: US 9,164,841 B2
(45) Date of Patent: Oct. 20, 2015

(54) RESOLUTION OF A STORAGE ERROR IN A DISPERSED STORAGE NETWORK

(71) Applicant: CLEVERSAFE, INC., Chicago, IL (US)

(72) Inventor: Jason K. Resch, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 200 days.

(21) Appl. No.: 13/866,631

(22) Filed: Apr. 19, 2013

(65) Prior Publication Data

US 2013/0326264 A1 Dec. 5, 2013

Related U.S. Application Data

(60) Provisional application No. 61/655,753, filed on Jun. 5, 2012.

(51) Int. Cl.

| | |
|---|---|
| ***G06F 11/00*** | (2006.01) |
| ***G06F 11/10*** | (2006.01) |
| *G06F 11/20* | (2006.01) |
| *G06F 11/30* | (2006.01) |

(52) U.S. Cl.

CPC ........ *G06F 11/1088* (2013.01); *G06F 11/1092* (2013.01); *G06F 11/2094* (2013.01); *G06F 11/3034* (2013.01); *G06F 11/3055* (2013.01)

(58) Field of Classification Search

CPC ............ G06F 11/1076; G06F 11/1088; G06F 11/1092

See application file for complete search history.

(56) References Cited

U.S. PATENT DOCUMENTS

| | | | | |
|---|---|---|---|---|
| 4,092,732 | A | 5/1978 | Ouchi | |
| 5,208,813 | A * | 5/1993 | Stallmo | 714/6.32 |
| 5,454,101 | A | 9/1995 | Mackay et al. | |
| 5,485,474 | A | 1/1996 | Rabin | |
| 5,774,643 | A | 6/1998 | Lubbers et al. | |
| 5,802,364 | A | 9/1998 | Senator et al. | |
| 5,809,285 | A | 9/1998 | Hilland | |
| 5,812,753 | A * | 9/1998 | Chiariotti | 714/6.21 |
| 5,890,156 | A | 3/1999 | Rekieta et al. | |
| 5,987,622 | A | 11/1999 | Lo Verso et al. | |

(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(Continued)

*Primary Examiner* — Joseph Kudirka

(74) *Attorney, Agent, or Firm* — Garlick & Markison; Timothy W. Markison

(57) ABSTRACT

A method begins by a dispersed storage (DS) processing module identifying an encoded data slice having an error, where a storage unit of a dispersed storage network (DSN) stores the encoded data slice. The method continues with the DS processing module sending a lock command to the storage unit. The method continues with the DS processing module determining resolution for the error of the encoded data slice, where the resolution includes one or more of: rebuilding the encoded data slice, issuing a set of delete requests to storage units of the DSN regarding a set of encoded data slices, issuing a set of undo write requests to the storage units of the DSN regarding the set of encoded data slices, and issuing a set of roll-back write requests to the storage units of the DSN regarding the set of encoded data slices.

18 Claims, 49 Drawing Sheets

(56) References Cited

U.S. PATENT DOCUMENTS

| | | | | |
|---|---|---|---|---|
| 5,991,414 | A | 11/1999 | Garay et al. | |
| 6,012,159 | A | 1/2000 | Fischer et al. | |
| 6,058,454 | A | 5/2000 | Gerlach et al. | |
| 6,128,277 | A | 10/2000 | Bruck et al. | |
| 6,175,571 | B1 | 1/2001 | Haddock et al. | |
| 6,192,472 | B1 | 2/2001 | Garay et al. | |
| 6,256,688 | B1 | 7/2001 | Suetaka et al. | |
| 6,272,658 | B1 | 8/2001 | Steele et al. | |
| 6,301,604 | B1 | 10/2001 | Nojima | |
| 6,356,949 | B1 | 3/2002 | Katsandres et al. | |
| 6,366,995 | B1 | 4/2002 | Vilkov et al. | |
| 6,374,336 | B1 | 4/2002 | Peters et al. | |
| 6,415,373 | B1 | 7/2002 | Peters et al. | |
| 6,418,539 | B1 | 7/2002 | Walker | |
| 6,449,688 | B1 | 9/2002 | Peters et al. | |
| 6,567,948 | B2 | 5/2003 | Steele et al. | |
| 6,571,282 | B1 | 5/2003 | Bowman-Amuah | |
| 6,609,223 | B1 | 8/2003 | Wolfgang | |
| 6,718,361 | B1 | 4/2004 | Basani et al. | |
| 6,760,808 | B2 | 7/2004 | Peters et al. | |
| 6,785,768 | B2 | 8/2004 | Peters et al. | |
| 6,785,783 | B2 | 8/2004 | Buckland | |
| 6,826,711 | B2 | 11/2004 | Moulton et al. | |
| 6,879,596 | B1 | 4/2005 | Dooply | |
| 7,003,688 | B1 | 2/2006 | Pittelkow et al. | |
| 7,024,451 | B2 | 4/2006 | Jorgenson | |
| 7,024,609 | B2 | 4/2006 | Wolfgang et al. | |
| 7,080,101 | B1 | 7/2006 | Watson et al. | |
| 7,103,824 | B2 | 9/2006 | Halford | |
| 7,103,915 | B2 | 9/2006 | Redlich et al. | |
| 7,111,115 | B2 | 9/2006 | Peters et al. | |
| 7,140,044 | B2 | 11/2006 | Redlich et al. | |
| 7,146,644 | B2 | 12/2006 | Redlich et al. | |
| 7,171,493 | B2 | 1/2007 | Shu et al. | |
| 7,222,133 | B1 | 5/2007 | Raipurkar et al. | |
| 7,240,236 | B2 | 7/2007 | Cutts et al. | |
| 7,272,613 | B2 | 9/2007 | Sim et al. | |
| 7,636,724 | B2 | 12/2009 | de la Torre et al. | |
| 8,086,911 | B1 * | 12/2011 | Taylor | 714/54 |
| 2002/0062422 | A1 | 5/2002 | Butterworth et al. | |
| 2002/0166079 | A1 | 11/2002 | Ulrich et al. | |
| 2003/0018927 | A1 | 1/2003 | Gadir et al. | |
| 2003/0037261 | A1 | 2/2003 | Meffert et al. | |
| 2003/0065617 | A1 | 4/2003 | Watkins et al. | |
| 2003/0084020 | A1 | 5/2003 | Shu | |
| 2004/0024963 | A1 | 2/2004 | Talagala et al. | |
| 2004/0122917 | A1 | 6/2004 | Menon et al. | |
| 2004/0215998 | A1 | 10/2004 | Buxton et al. | |
| 2004/0228493 | A1 | 11/2004 | Ma | |
| 2005/0100022 | A1 | 5/2005 | Ramprashad | |
| 2005/0114594 | A1 | 5/2005 | Corbett et al. | |
| 2005/0125593 | A1 | 6/2005 | Karpoff et al. | |
| 2005/0131993 | A1 | 6/2005 | Fatula, Jr. | |
| 2005/0132070 | A1 | 6/2005 | Redlich et al. | |
| 2005/0144382 | A1 | 6/2005 | Schmisseur | |
| 2005/0229069 | A1 | 10/2005 | Hassner | |
| 2006/0047907 | A1 | 3/2006 | Shiga et al. | |
| 2006/0136448 | A1 | 6/2006 | Cialini et al. | |
| 2006/0156059 | A1 | 7/2006 | Kitamura | |
| 2006/0224603 | A1 | 10/2006 | Correll, Jr. | |
| 2007/0079081 | A1 | 4/2007 | Gladwin et al. | |
| 2007/0079082 | A1 | 4/2007 | Gladwin et al. | |
| 2007/0079083 | A1 | 4/2007 | Gladwin et al. | |
| 2007/0088970 | A1 | 4/2007 | Buxton et al. | |
| 2007/0174192 | A1 | 7/2007 | Gladwin et al. | |
| 2007/0214285 | A1 | 9/2007 | Au et al. | |
| 2007/0234110 | A1 | 10/2007 | Soran et al. | |
| 2007/0283167 | A1 | 12/2007 | Venters, III et al. | |
| 2009/0094251 | A1 | 4/2009 | Gladwin et al. | |
| 2009/0094318 | A1 | 4/2009 | Gladwin et al. | |
| 2010/0023524 | A1 | 1/2010 | Gladwin et al. | |
| 2011/0029728 | A1 * | 2/2011 | Popovski et al. | 711/114 |
| 2011/0072210 | A1 * | 3/2011 | Dhuse | 711/114 |
| 2011/0107036 | A1 * | 5/2011 | Resch et al. | 711/154 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

DSTN module22

DST allocation info 242 data partition info 320: data ID; No. of partitions; Addr. info for each partition; format conversion indication

| task execution info 322 | | | | intermediate result info 324 | | | |
|---|---|---|---|---|---|---|---|
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

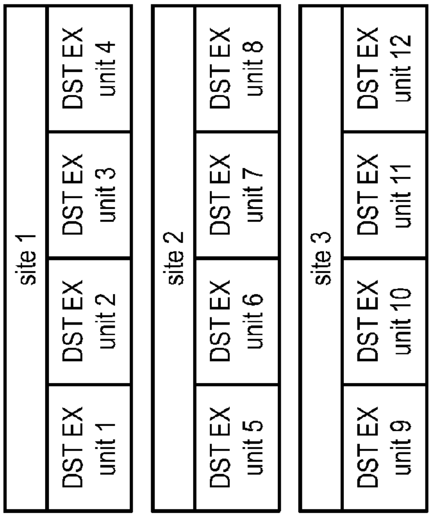

FIG. 46A

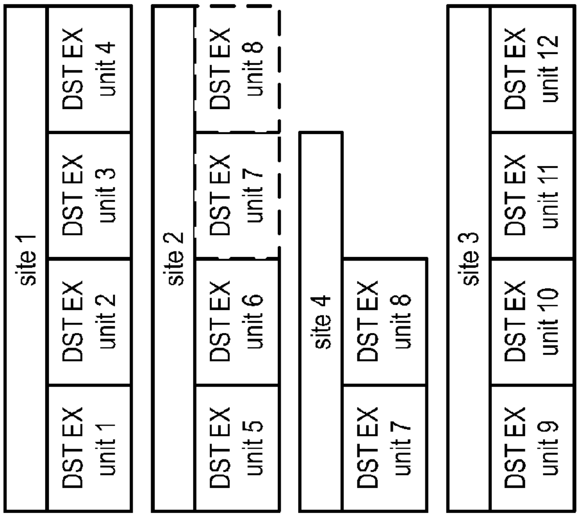

FIG. 46B

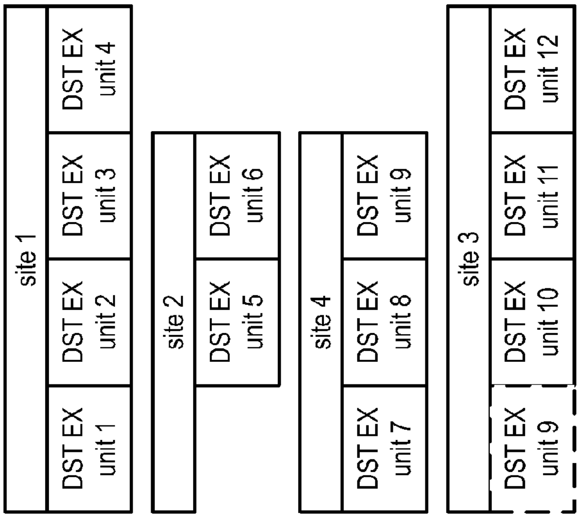

FIG. 46C

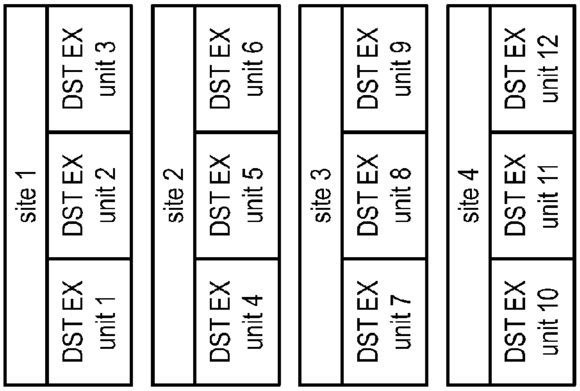

FIG. 46D

| site 1 | | | site 2 | | | site 3 | | |
|---|---|---|---|---|---|---|---|---|
| DST EX unit 1 | DST EX unit 2 | DST EX unit 3 | DST EX unit 4 | DST EX unit 5 | DST EX unit 6 | DST EX unit 7 | DST EX unit 8 | |

site 1: DST EX unit 1 | DST EX unit 2 | DST EX unit 3 | DST EX unit 4
site 2: DST EX unit 5 | DST EX unit 6 | DST EX unit 7 | DST EX unit 8
site 3: DST EX unit 9 | DST EX unit 10 | DST EX unit 11 | DST EX unit 12 site 1: DST EX unit 1 | DST EX unit 2 | DST EX unit 3 | DST EX unit 4
site 2: DST EX unit 5 | DST EX unit 6 | DST EX unit 7 | DST EX unit 8 (dashed)
site 4: DST EX unit 7 | DST EX unit 8
site 3: DST EX unit 9 | DST EX unit 10 | DST EX unit 11 | DST EX unit 12 site 1: DST EX unit 1 | DST EX unit 2 | DST EX unit 3 | DST EX unit 4
site 2: DST EX unit 5 | DST EX unit 6
site 4: DST EX unit 7 | DST EX unit 8 | DST EX unit 9
site 3: DST EX unit 9 (dashed) | DST EX unit 10 | DST EX unit 11 | DST EX unit 12 site 1: DST EX unit 1 | DST EX unit 2 | DST EX unit 3
site 2: DST EX unit 4 | DST EX unit 5 | DST EX unit 6
site 3: DST EX unit 7 | DST EX unit 8 | DST EX unit 9
site 4: DST EX unit 10 | DST EX unit 11 | DST EX unit 12

RESOLUTION OF A STORAGE ERROR IN A DISPERSED STORAGE NETWORK

CROSS REFERENCE TO RELATED PATENTS

This patent application is claiming priority under 35 USC §119(e) to a provisionally filed patent application entitled ESTABLISHING AN ADDRESS RANGE ASSIGNMENT IN A DISTRIBUTED STORAGE AND TASK NETWORK having a provisional filing date of Jun. 5, 2012, and a provisional Ser. No. 61/655,753, which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computer networks and more particularly to dispersed storage of data and distributed task processing of data.

2. Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

Figure 25:
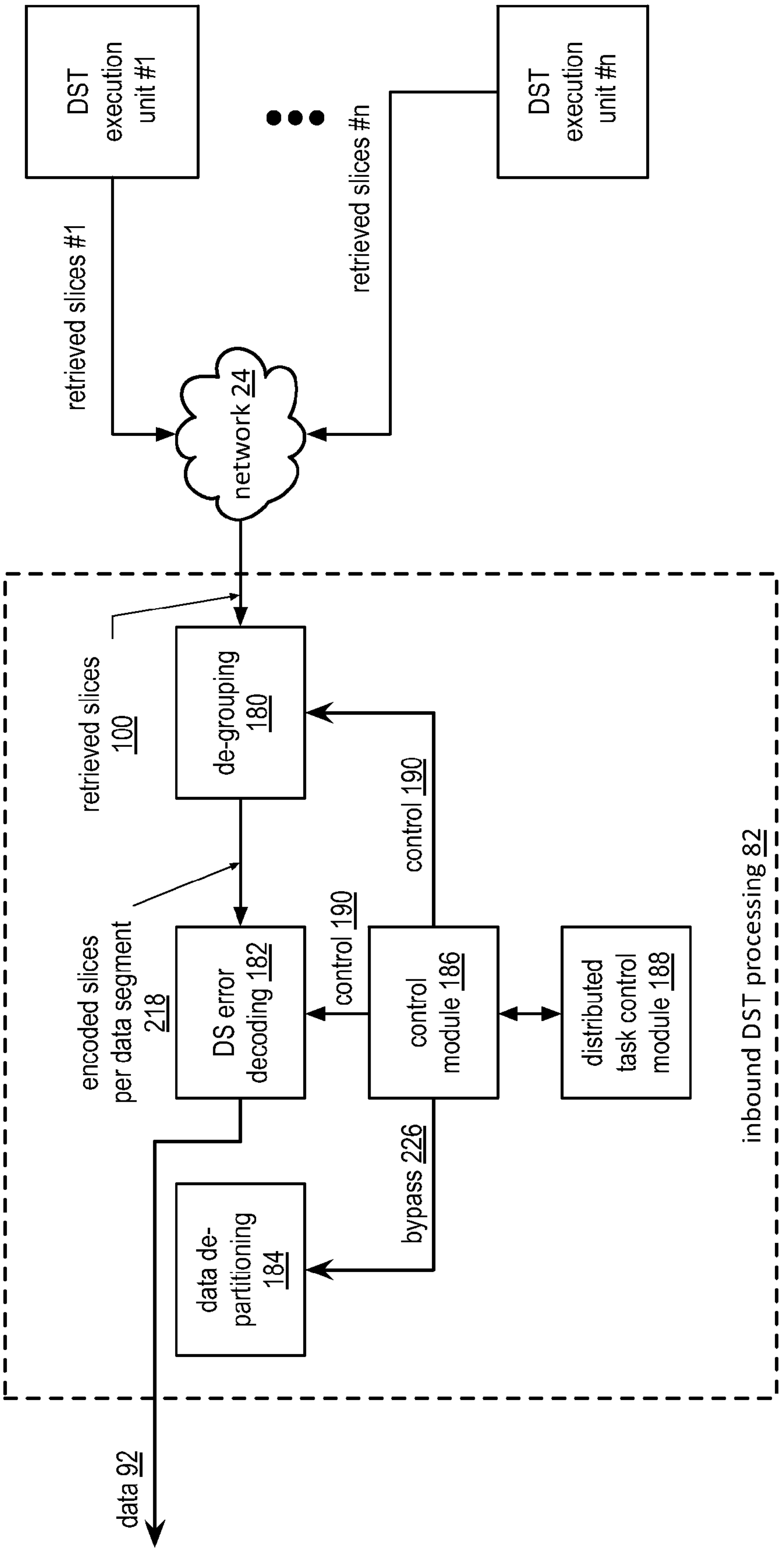
FIG. 25 is a schematic block diagram of an example of operation of inbound distributed storage and/or task (DST)
Figure 26:
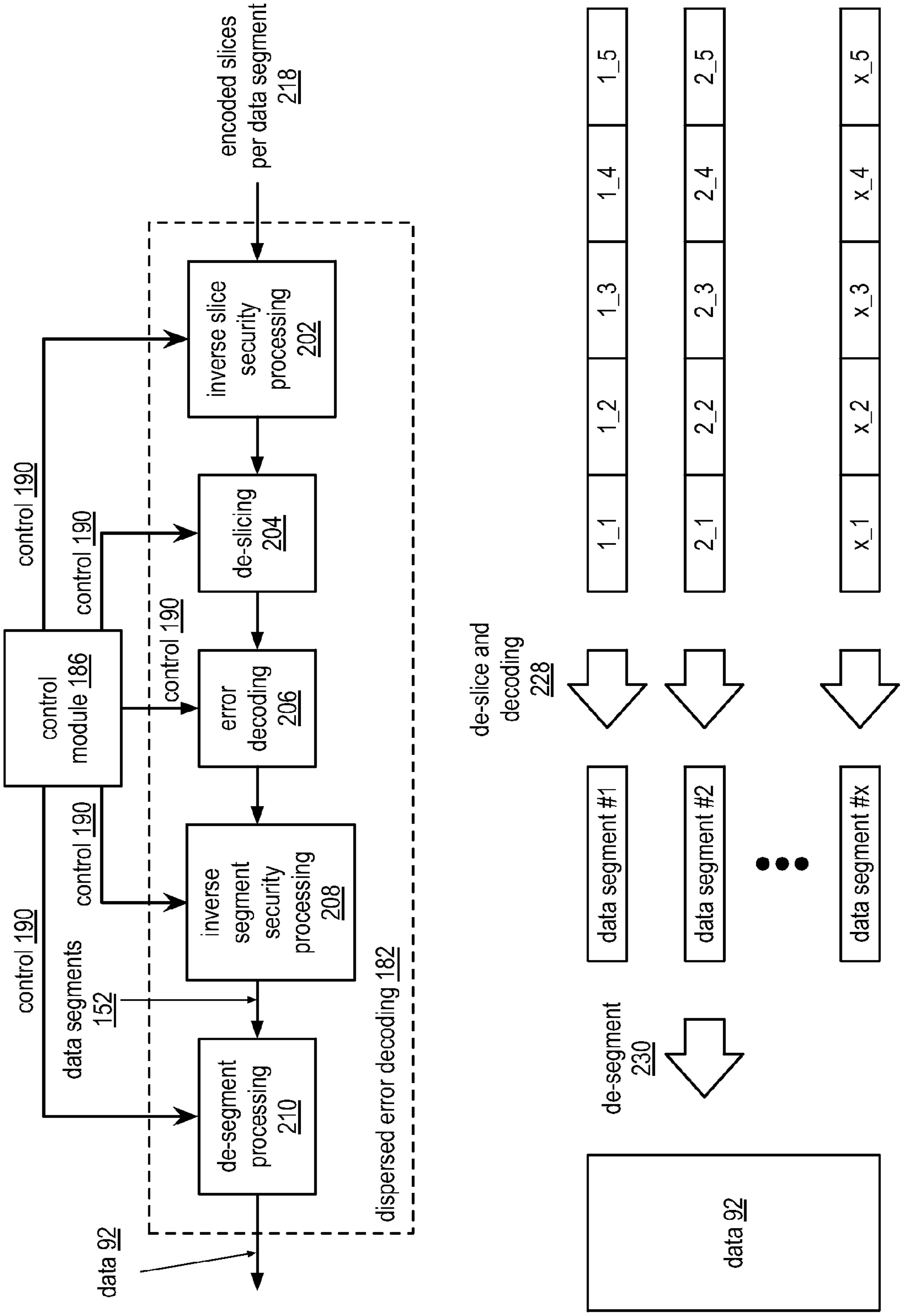
Figure 27:
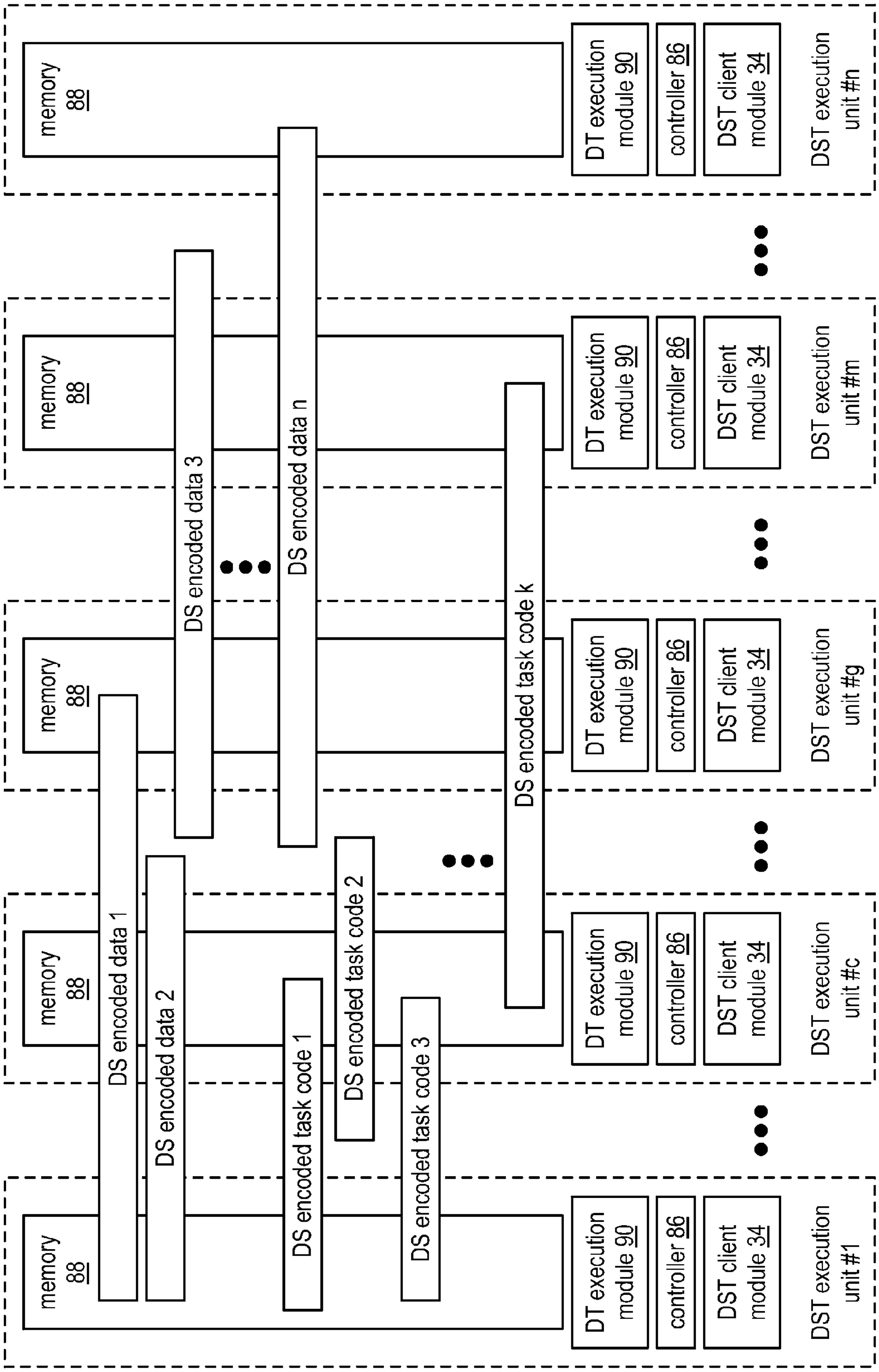
Figure 28:
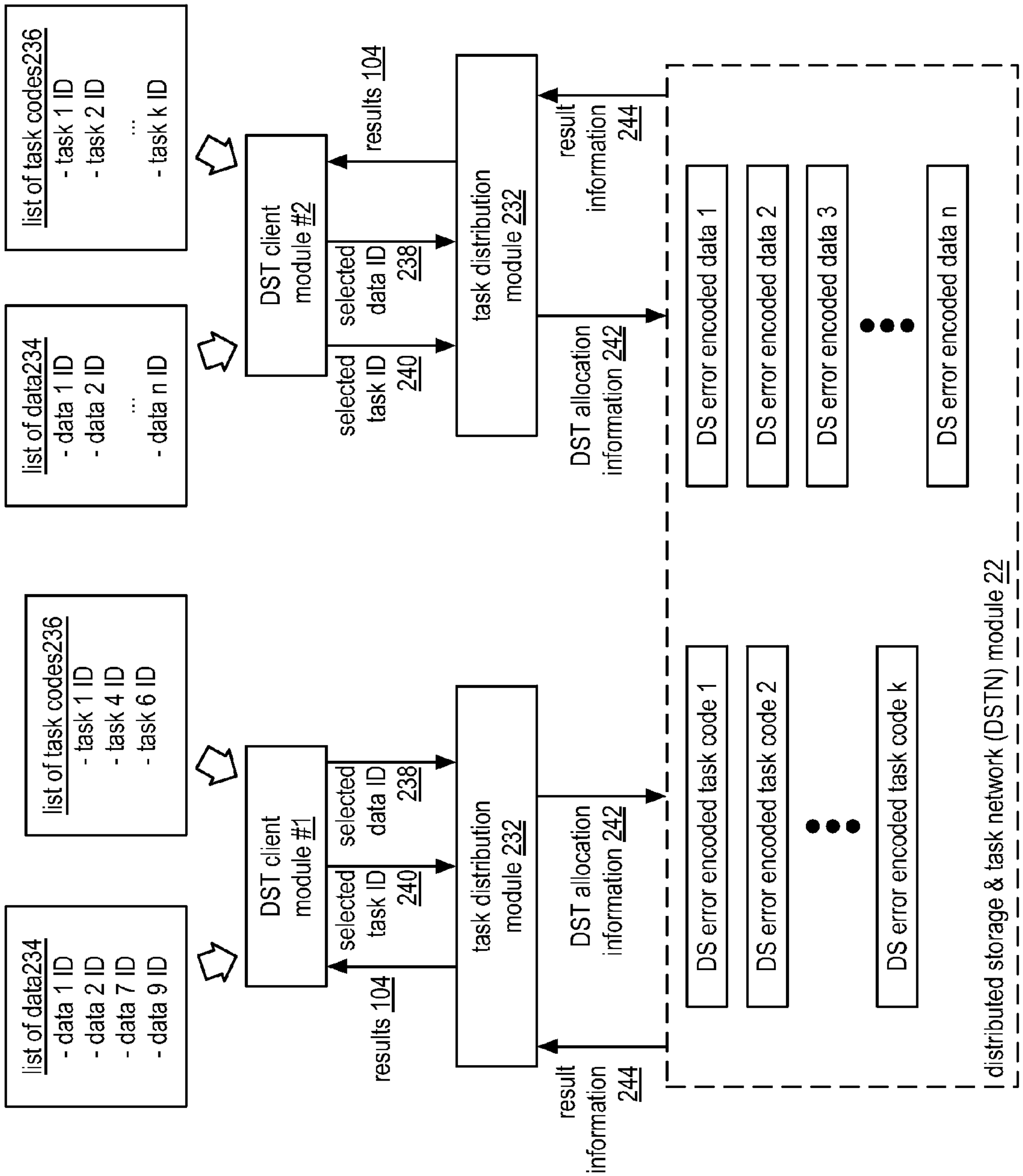
Figure 29:
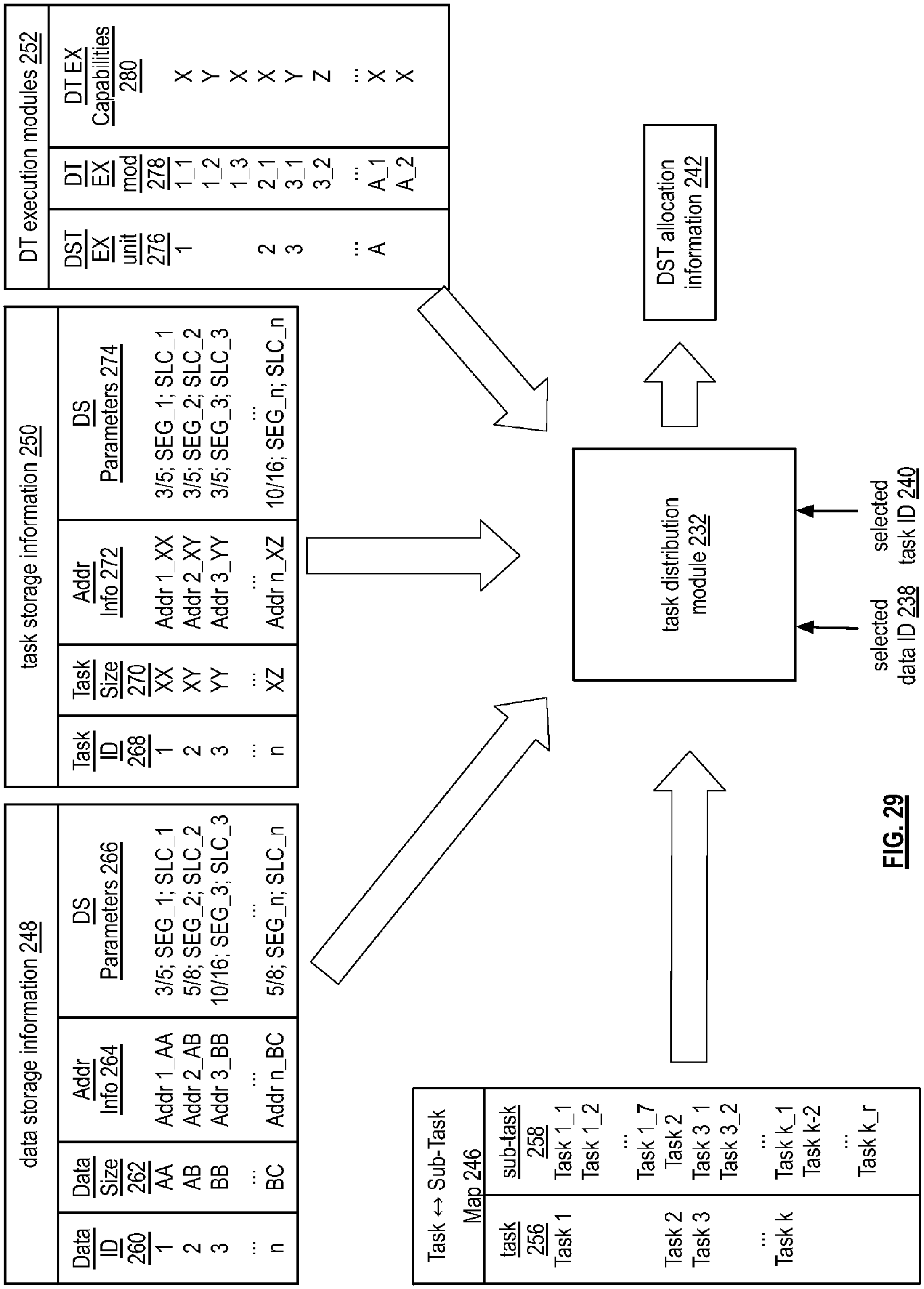
Figure 30:
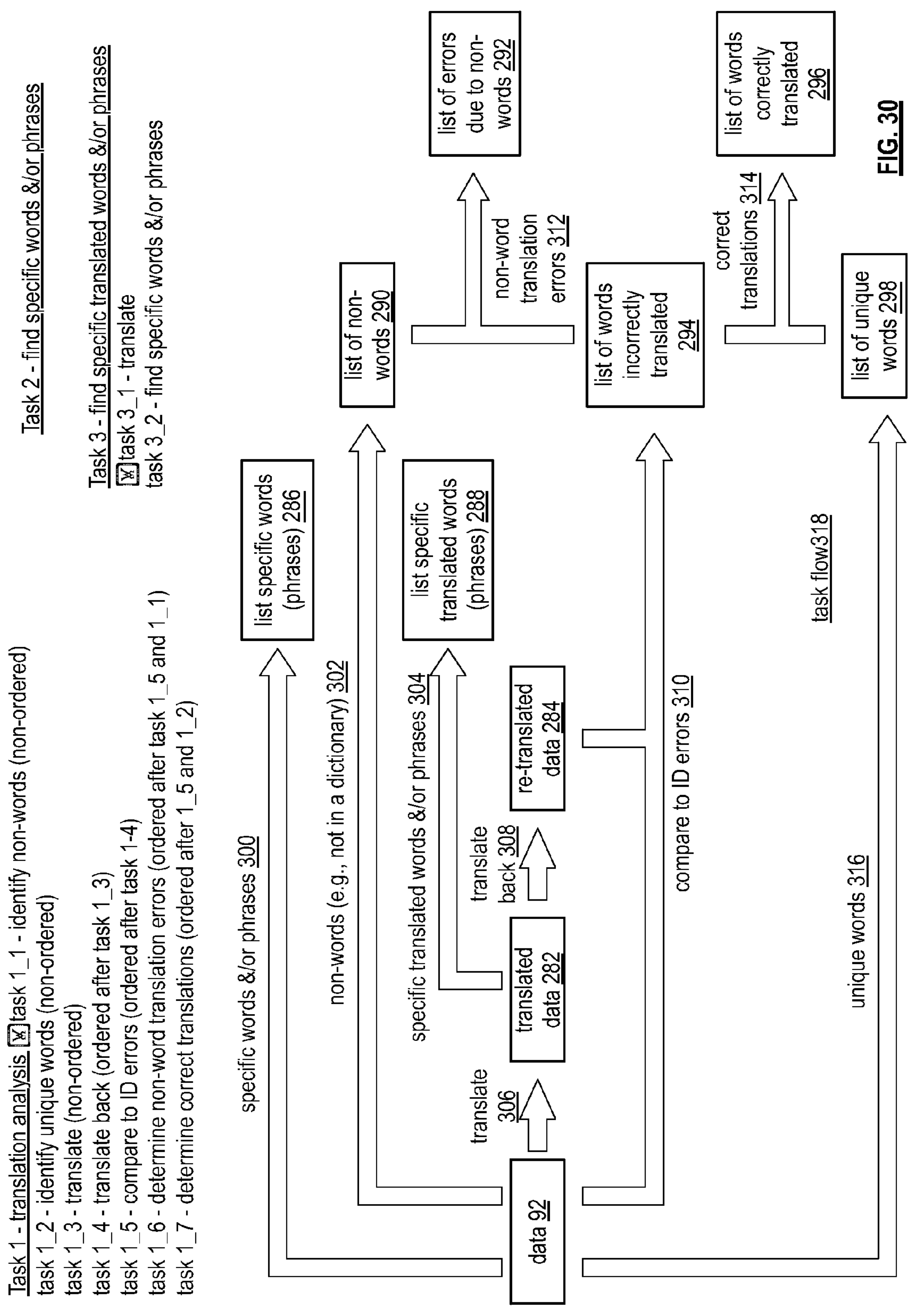
Figure 31:
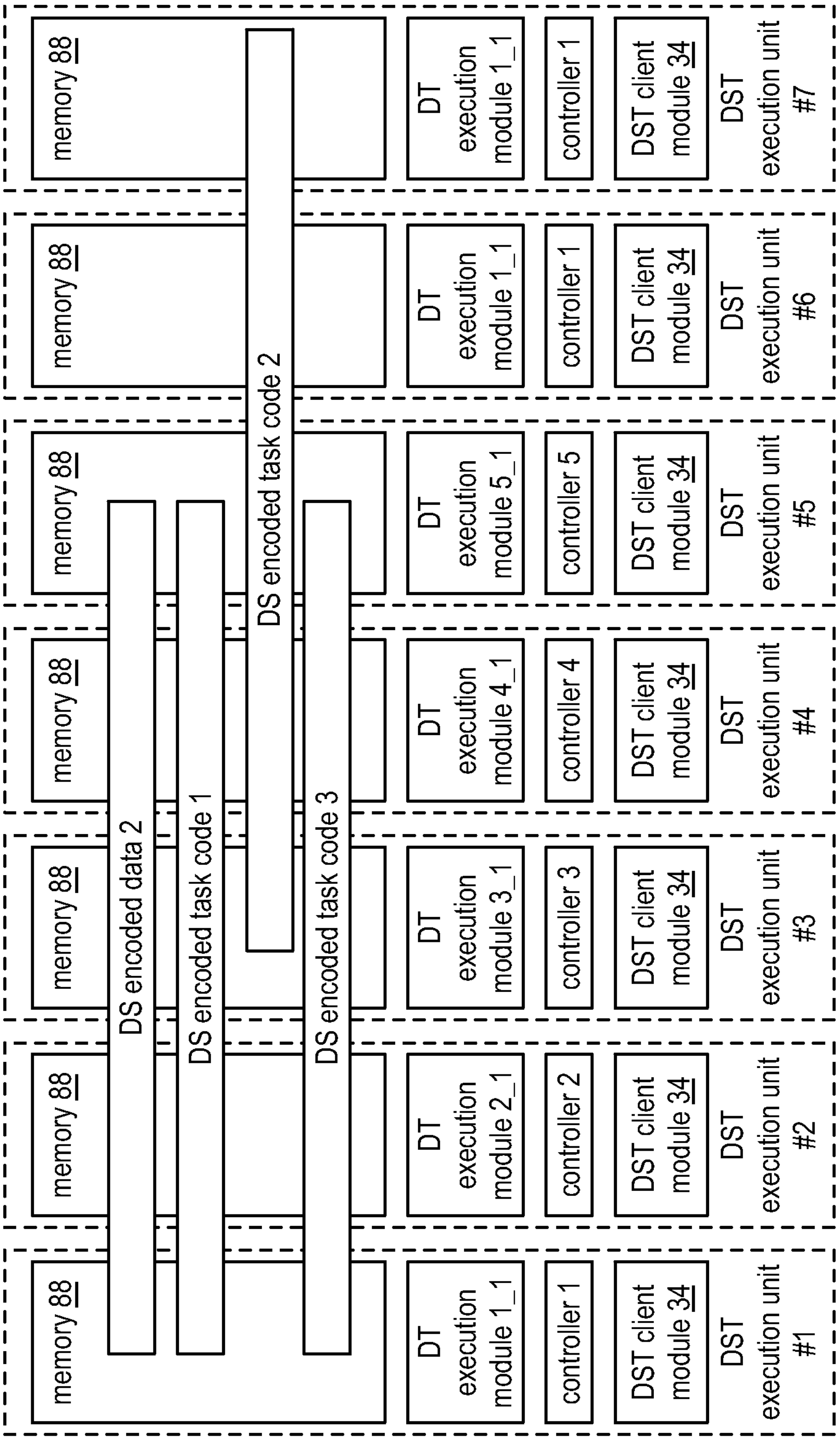
Figure 39:
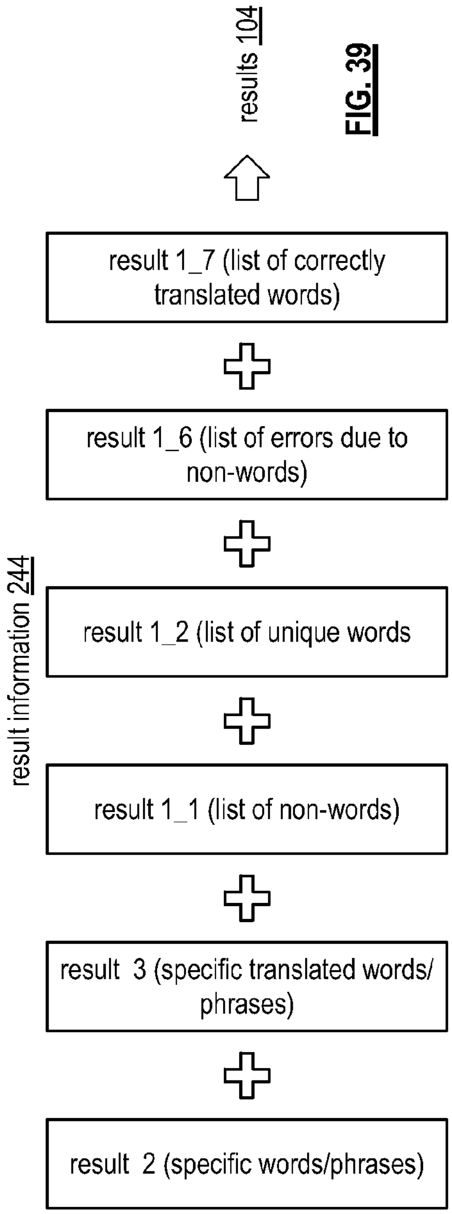
Figure 40A:
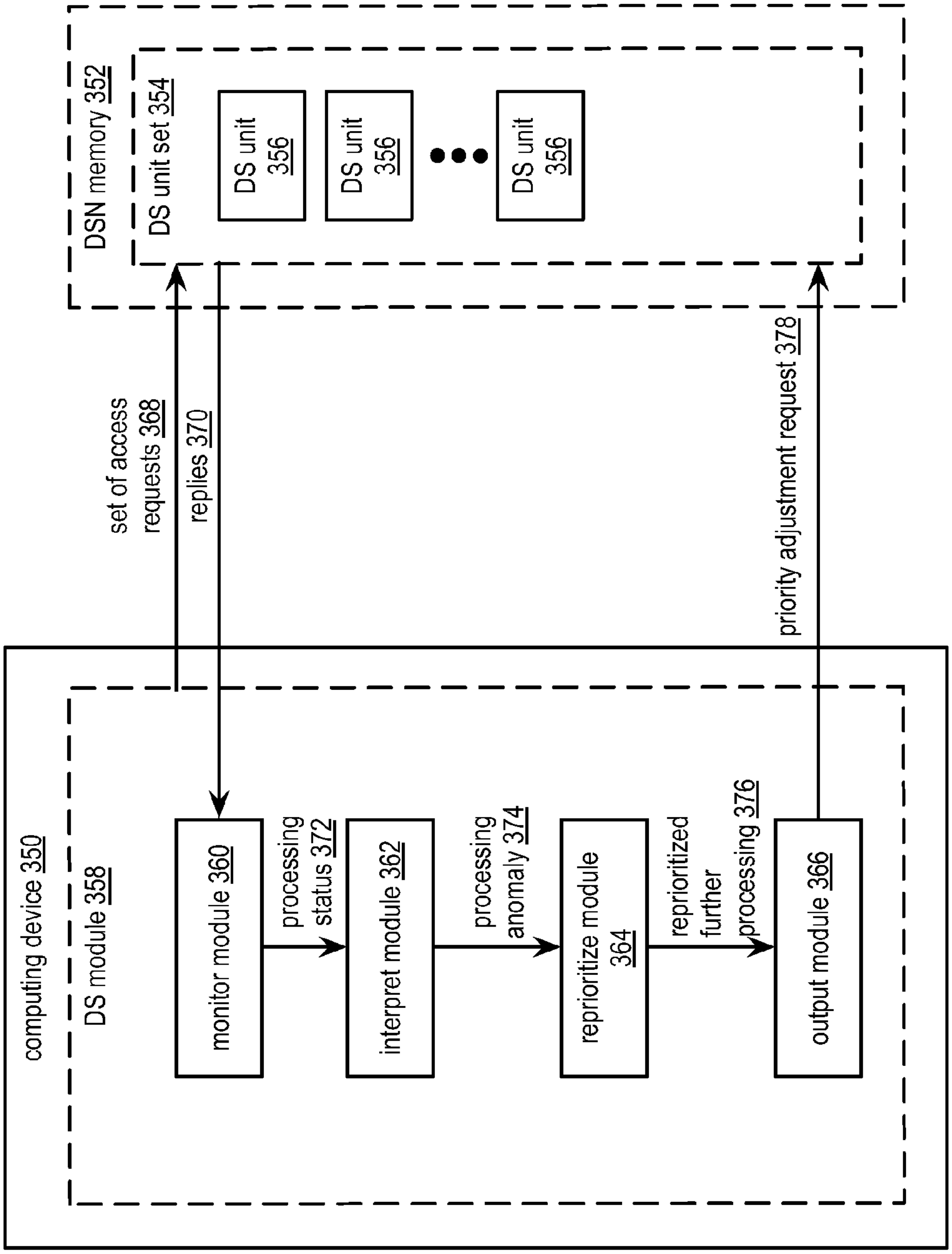
Figure 40B:
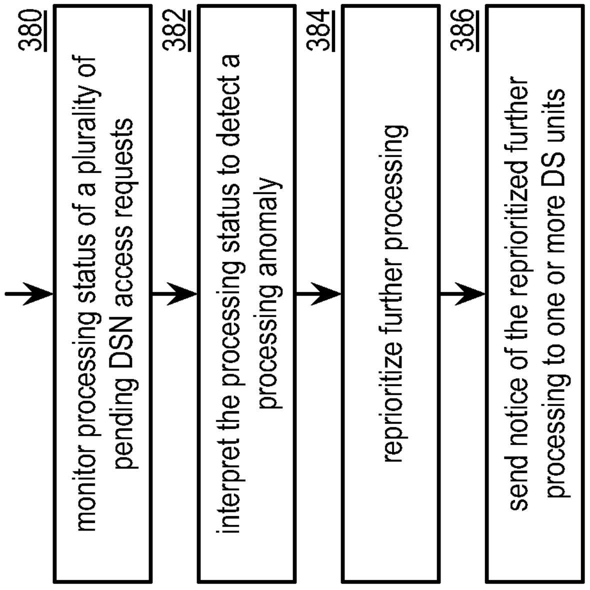
Figure 41A:
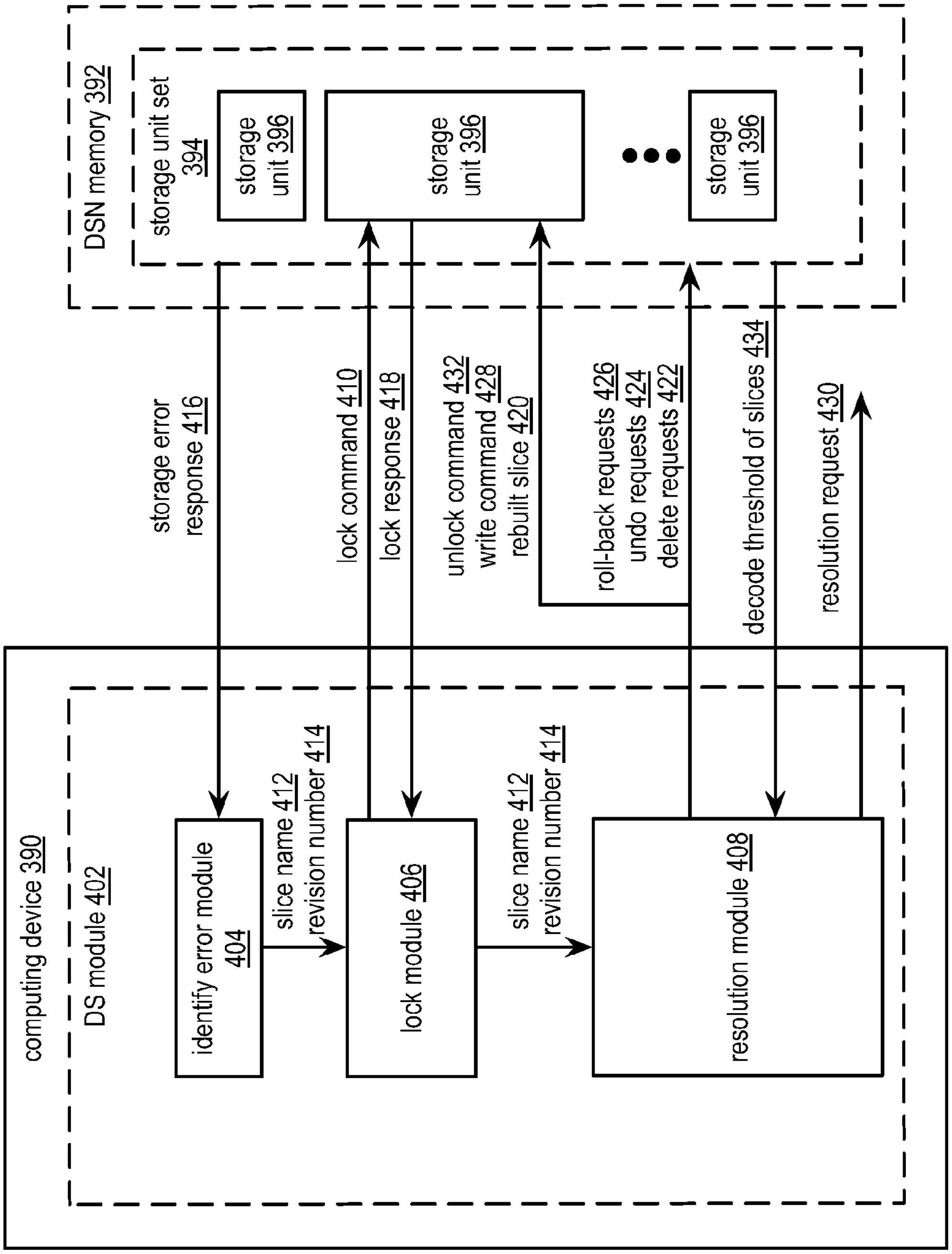
Figure 41B:
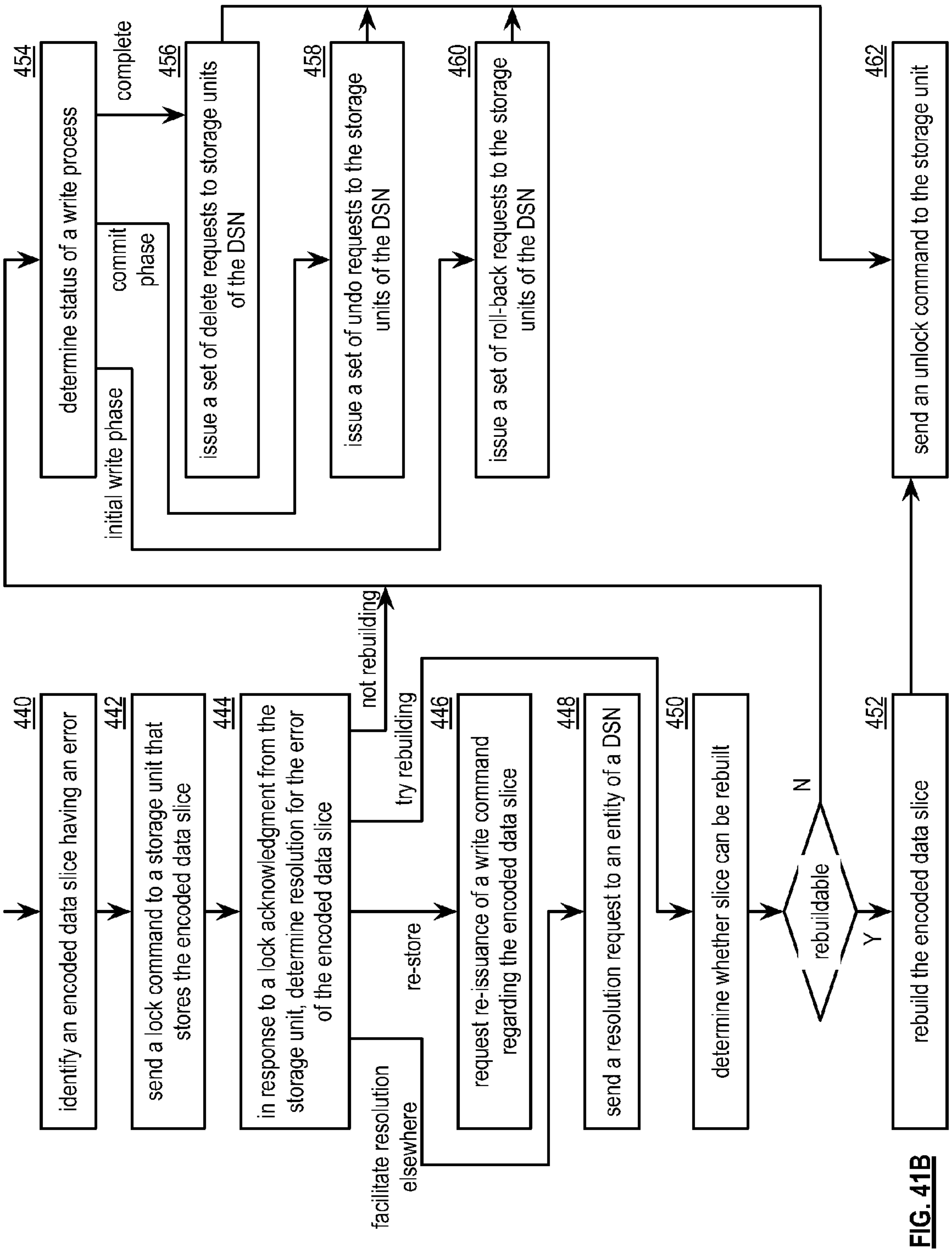
Figure 42:
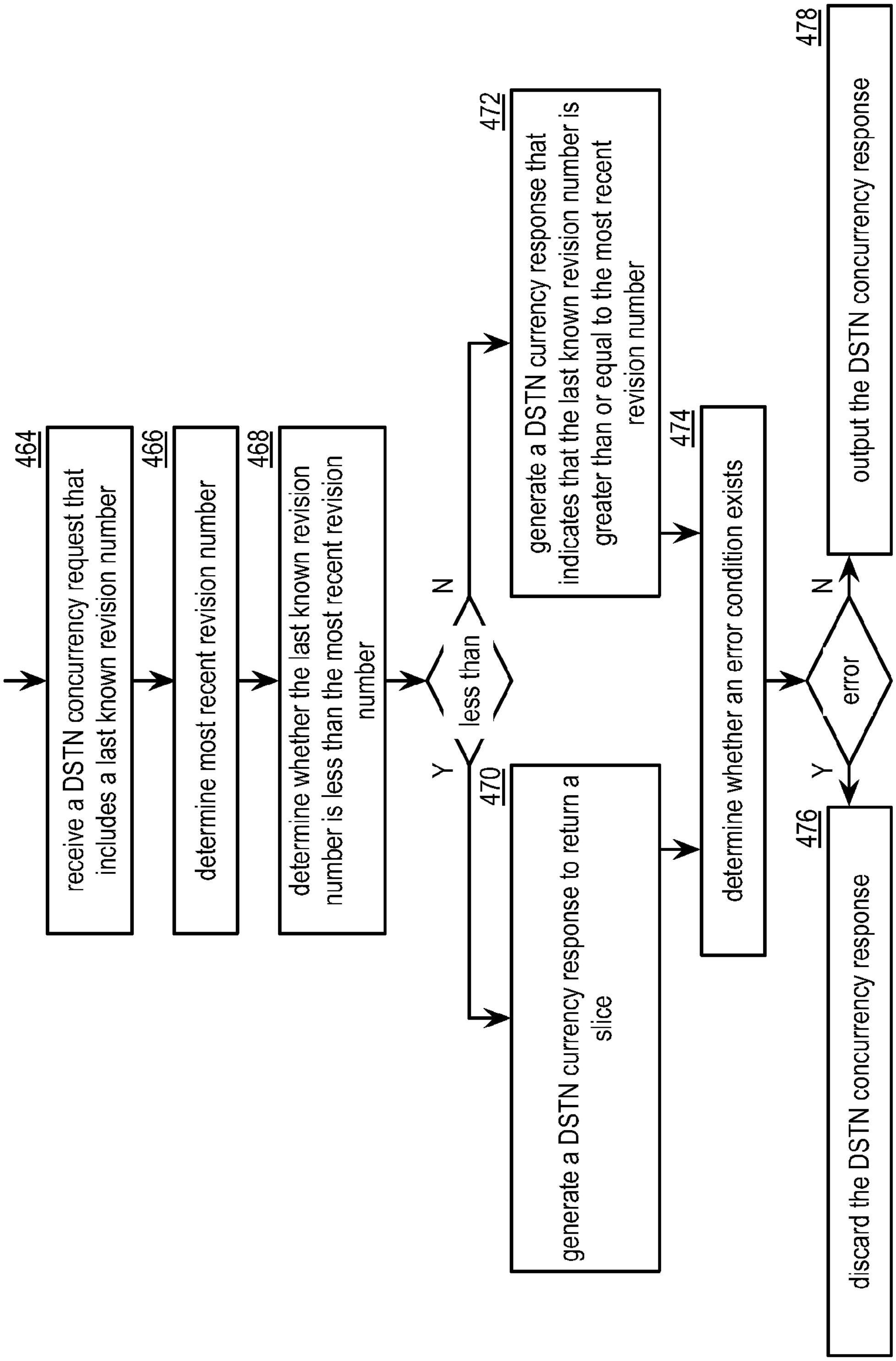
Figure 43:
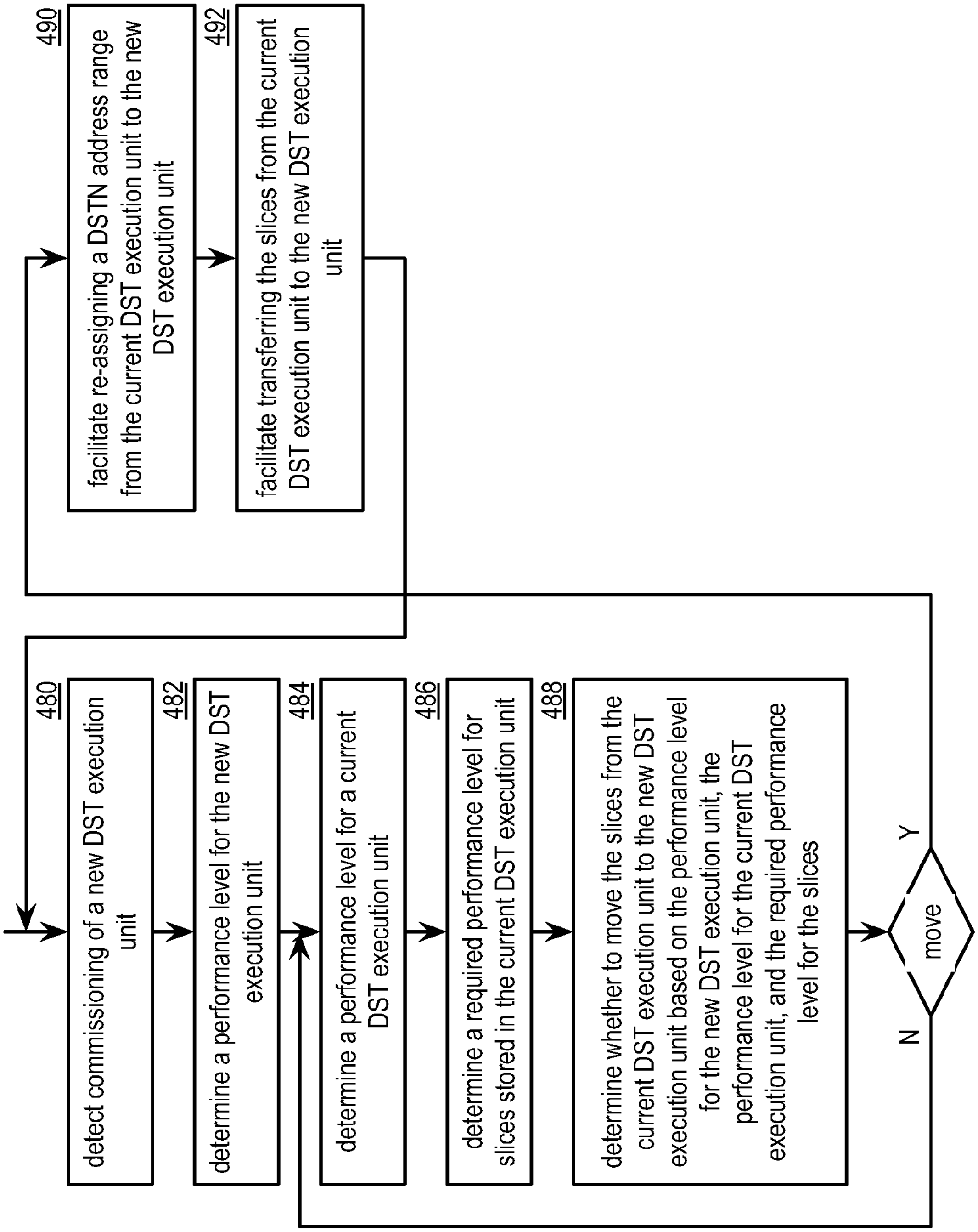
Figure 44A:
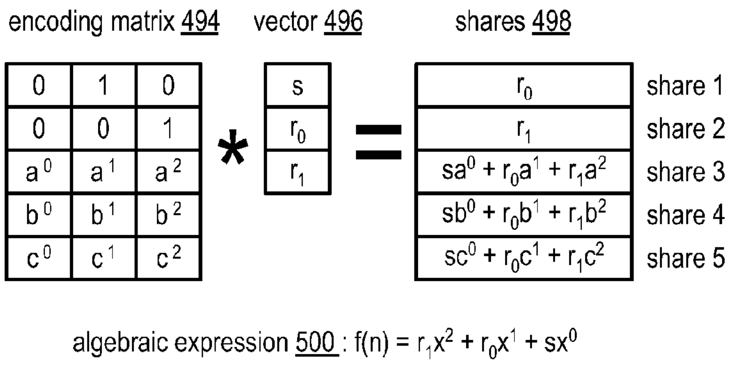
Figure 44B:
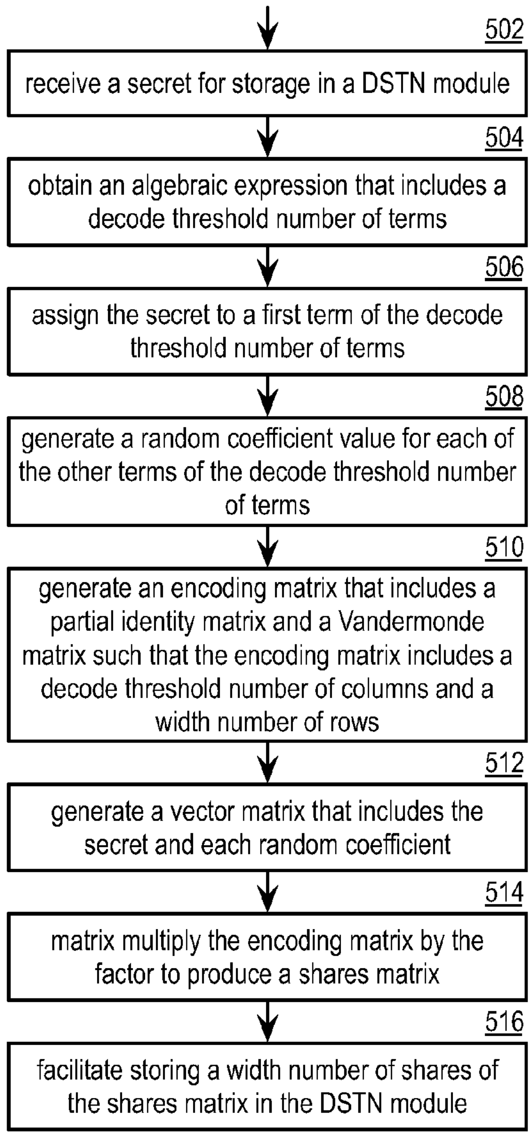
Figure 45:
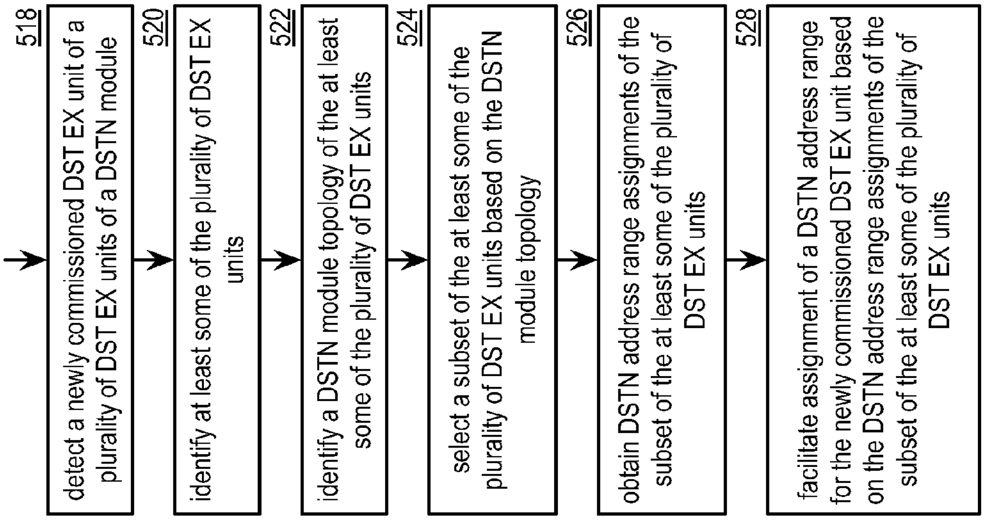
Figure 46E:
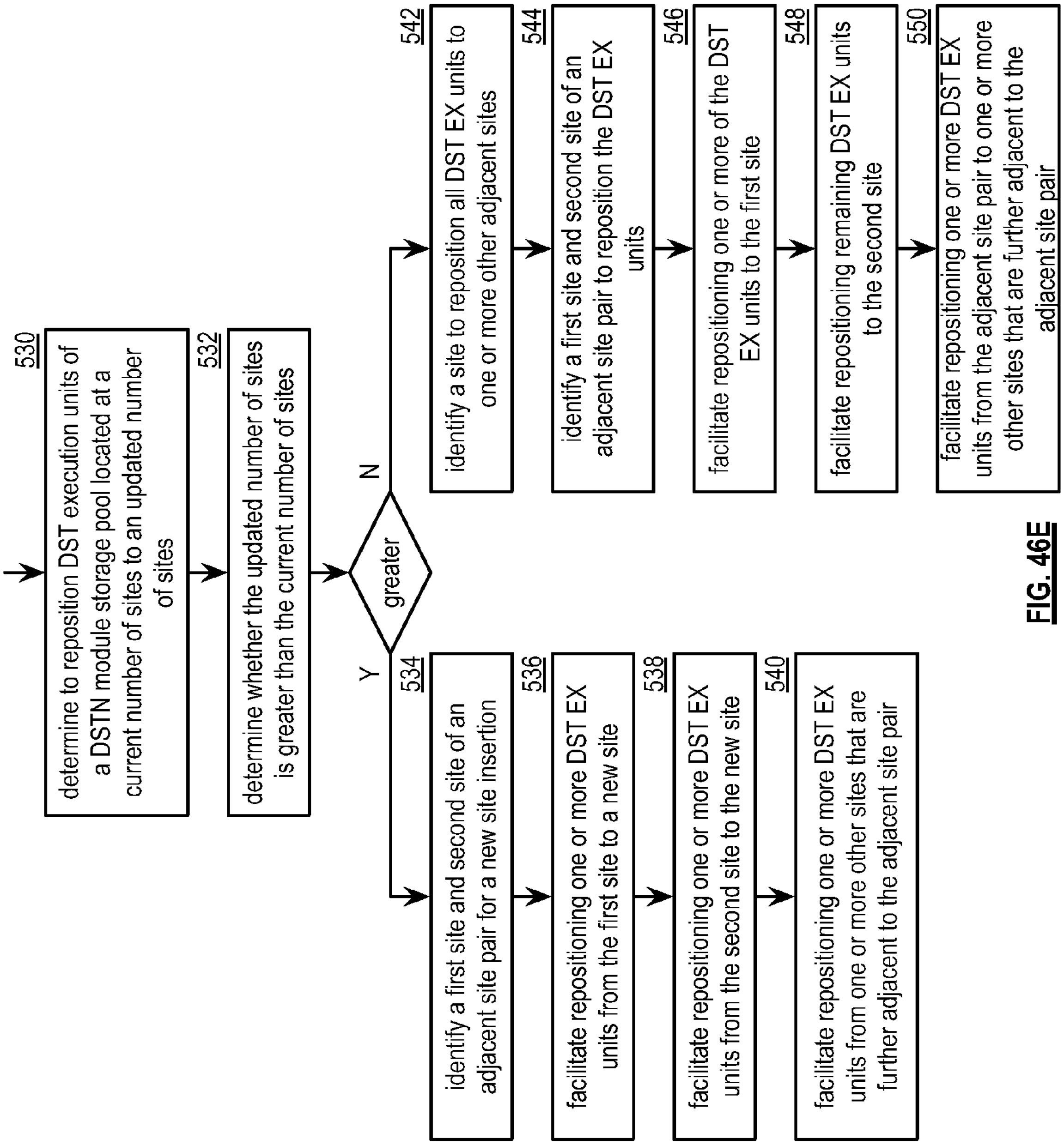
Figure 47A:
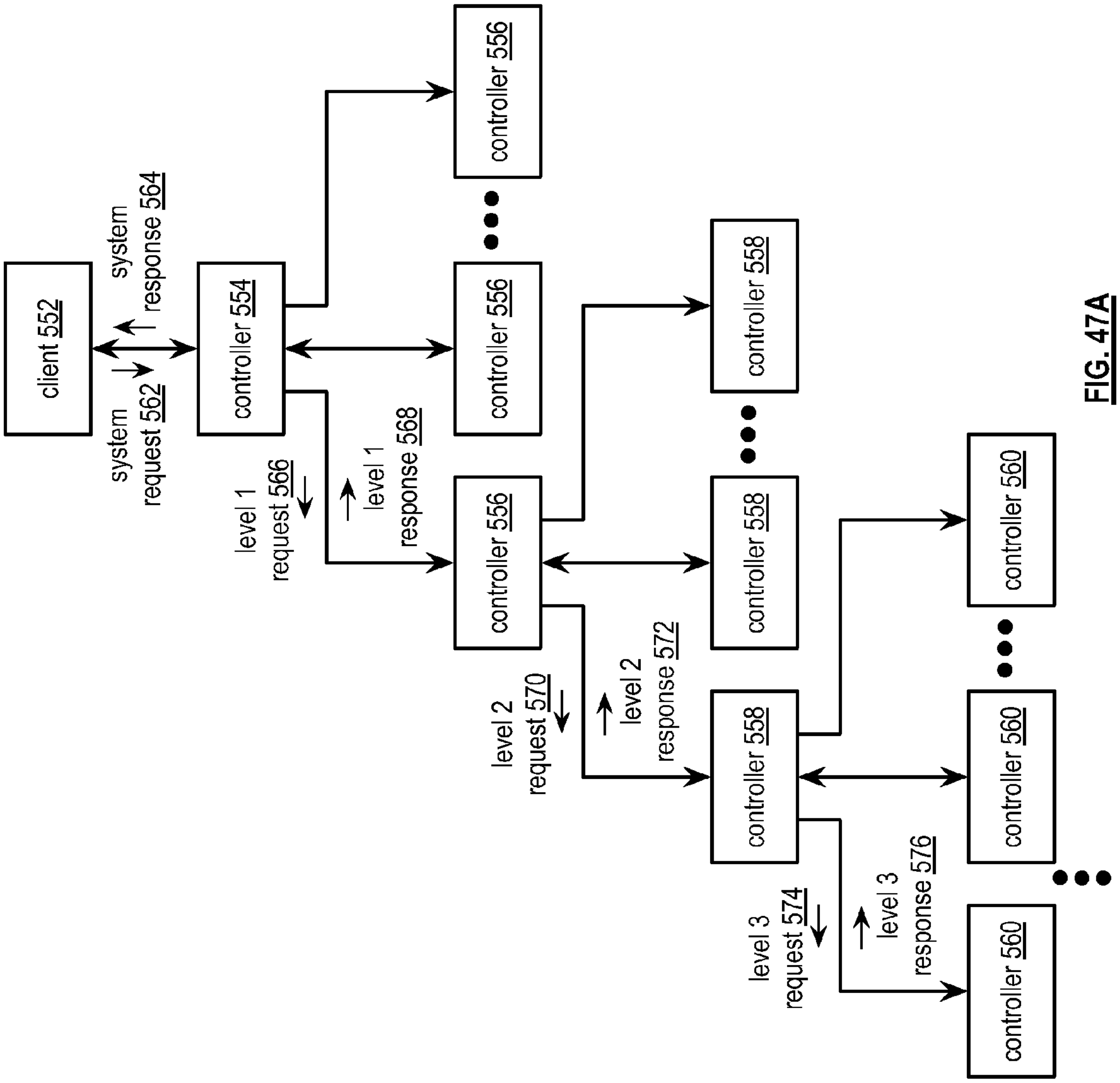
Figure 47B:
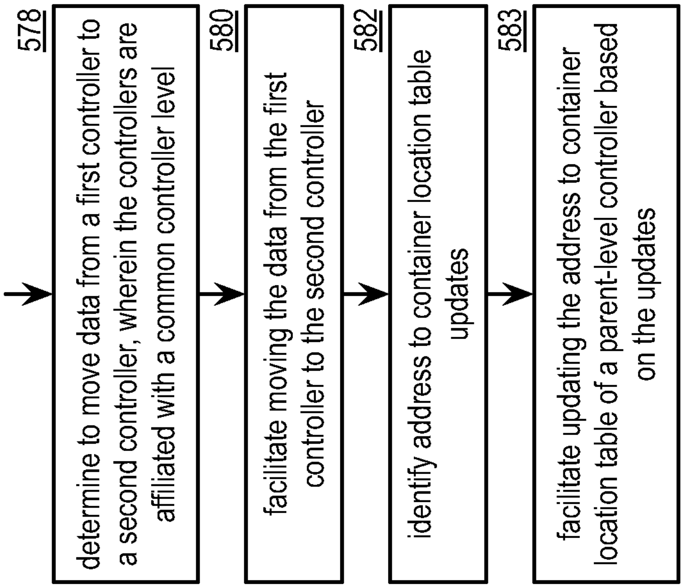
Figure 47C:
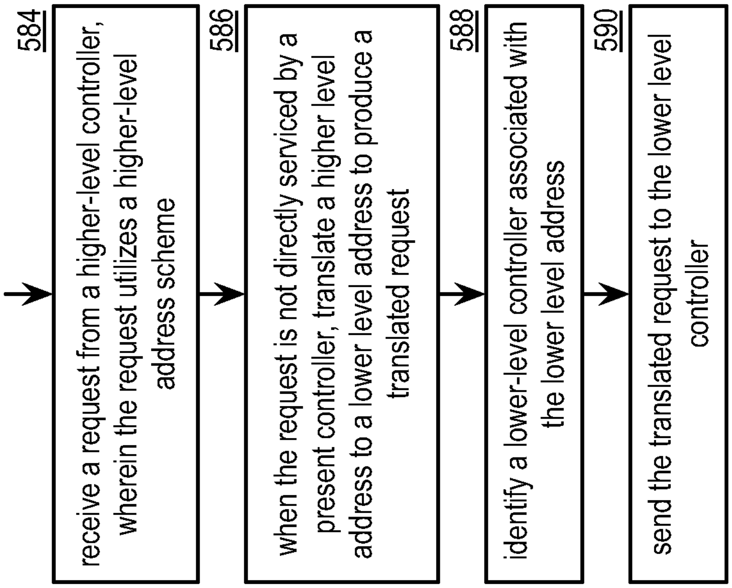
Figure 48A:
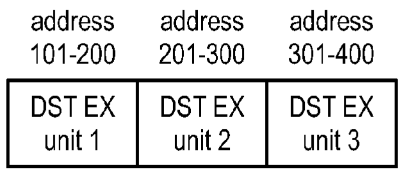
Figure 48B:
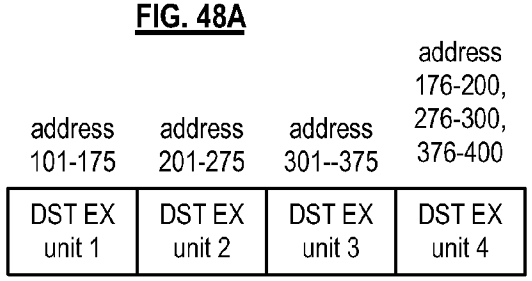
Figure 48C:
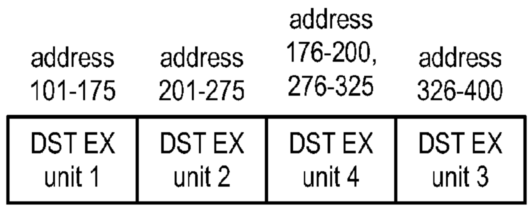
Figure 48D:
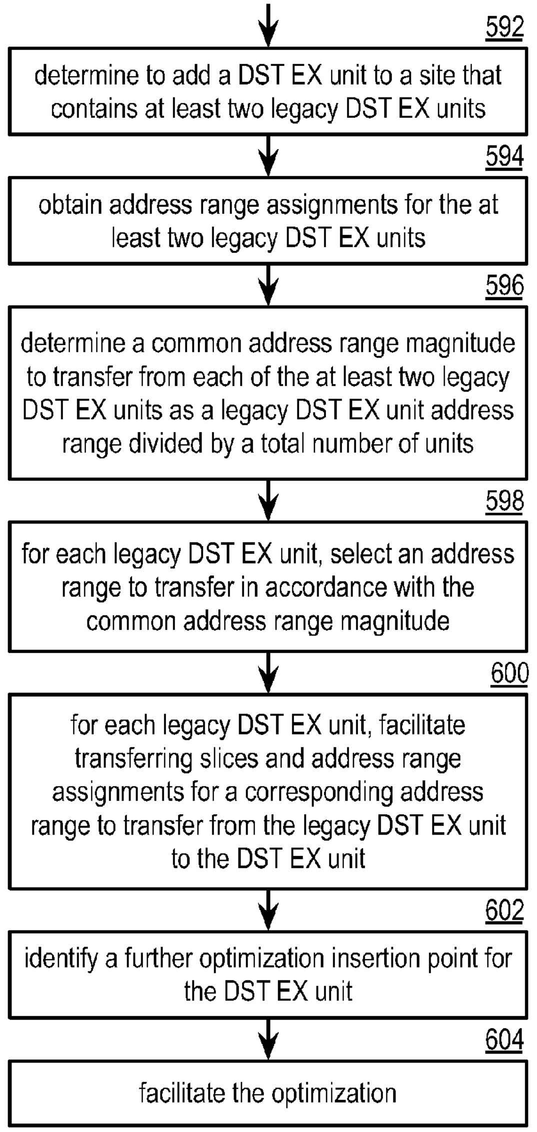
Figure 49A:
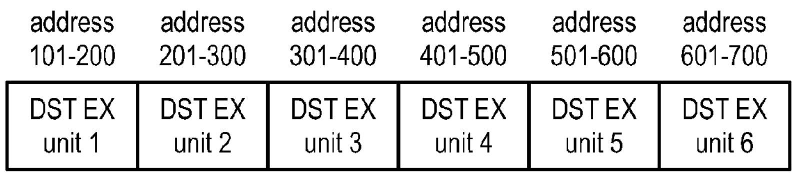
Figure 49B:
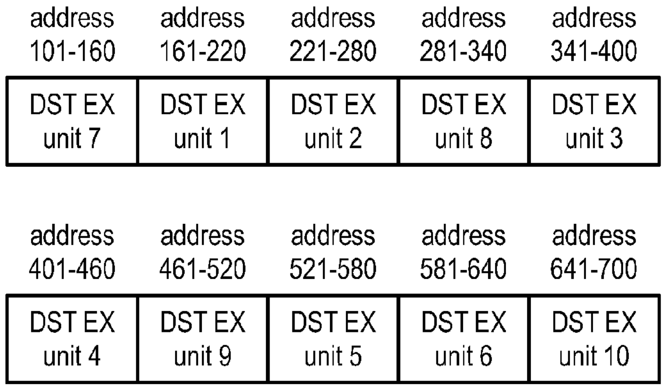
Figure 49C:
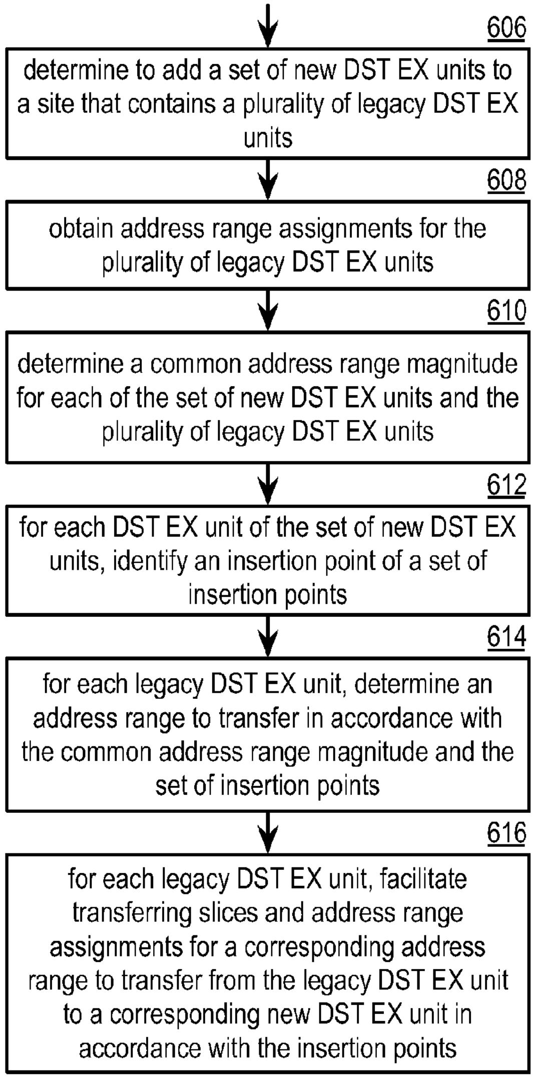

processing for retrieving dispersed error encoded data in accordance with the present invention;

FIG. 26 is a schematic block diagram of an example of a dispersed error decoding for the example of FIG. 25 in accordance with the present invention;

FIG. 27 is a schematic block diagram of an example of a distributed storage and task processing network (DSTN) module storing a plurality of data and a plurality of task codes in accordance with the present invention;

FIG. 28 is a schematic block diagram of an example of the distributed computing system performing tasks on stored data in accordance with the present invention;

FIG. 29 is a schematic block diagram of an embodiment of a task distribution module facilitating the example of FIG. 28 in accordance with the present invention;

FIG. 30 is a diagram of a specific example of the distributed computing system performing tasks on stored data in accordance with the present invention;

FIG. 31 is a schematic block diagram of an example of a distributed storage and task processing network (DSTN) module storing data and task codes for the example of FIG. 30 in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 40A is a schematic block diagram of an embodiment of a dispersed storage network in accordance with the present invention;

FIG. 40B is a flowchart illustrating an example of changing a request priority level in accordance with the present invention;

FIG. 41A is a schematic block diagram of another embodiment of a dispersed storage network in accordance with the present invention;

FIG. 41B is a flowchart illustrating an example of a adjusting slice access in accordance with the present invention;

FIG. 42 is a flowchart illustrating an example of synchronizing distributed storage and task (DSTN) network data in accordance with the present invention;

FIG. 43 is a flowchart illustrating an example of assigning an address range in accordance with the present invention;

FIG. 44A is a diagram illustrating an example of matrix multiplication to encode a secret in accordance with the present invention;

FIG. 44B is a flowchart illustrating an example of encoding a secret in accordance with the present invention;

FIG. 45 is a flowchart illustrating another example of assigning an address range in accordance with the present invention;

FIG. 46A is a diagram illustrating an example of a site mapping in accordance with the present invention;

FIG. 46B is a diagram illustrating another example of a site mapping in accordance with the present invention;

FIG. 46C is a diagram illustrating another example of a site mapping in accordance with the present invention;

FIG. 46D is a diagram illustrating another example of a site mapping in accordance with the present invention;

FIG. 46E is a flowchart illustrating an example of migrating distributed storage and task (DST) execution units in accordance with the present invention;

FIG. 47A is a schematic block diagram of another embodiment of a distributed computing system in accordance with the present invention;

FIG. 47B is a flowchart illustrating an example of migrating data in accordance with the present invention;

FIG. 47C is a flowchart illustrating an example of facilitating access of data in accordance with the present invention;

FIG. 48A is a diagram illustrating an example of an address range mapping in accordance with the present invention;

FIG. 48B is a diagram illustrating another example of an address range mapping in accordance with the present invention;

FIG. 48C is a diagram illustrating another example of an address range mapping in accordance with the present invention;

FIG. 48D is a flowchart illustrating an example of updating an address range assignment in accordance with the present invention;

FIG. 49A is a diagram illustrating another example of an address range mapping in accordance with the present invention;

FIG. 49B is a diagram illustrating another example of an address range mapping in accordance with the present invention; and FIG. 49C is a flowchart illustrating another example of updating an address range assignment in accordance with the present invention.

DETAILED DESCRIPTION OF THE INVENTION

Figure 1:
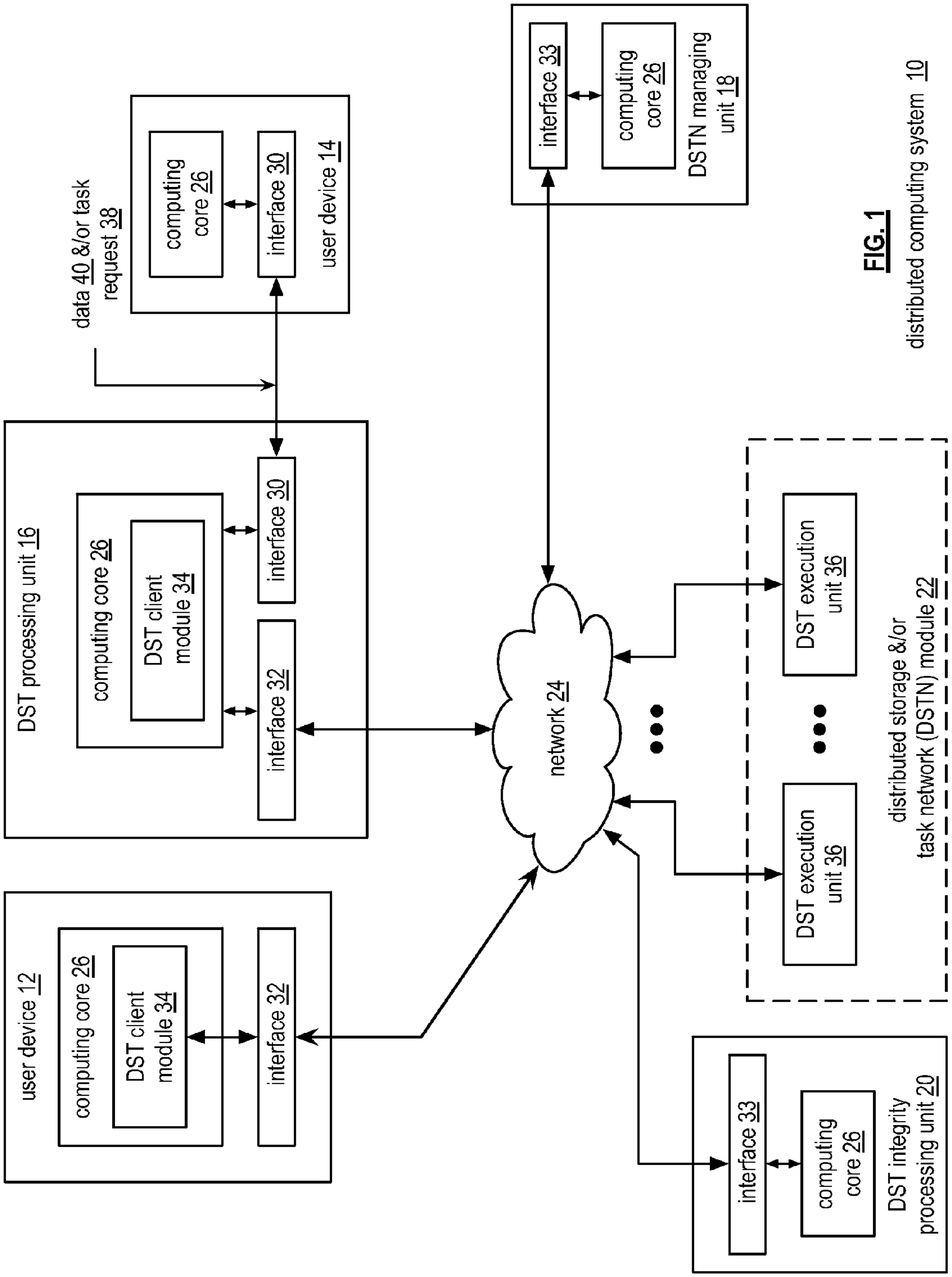
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interfaces 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
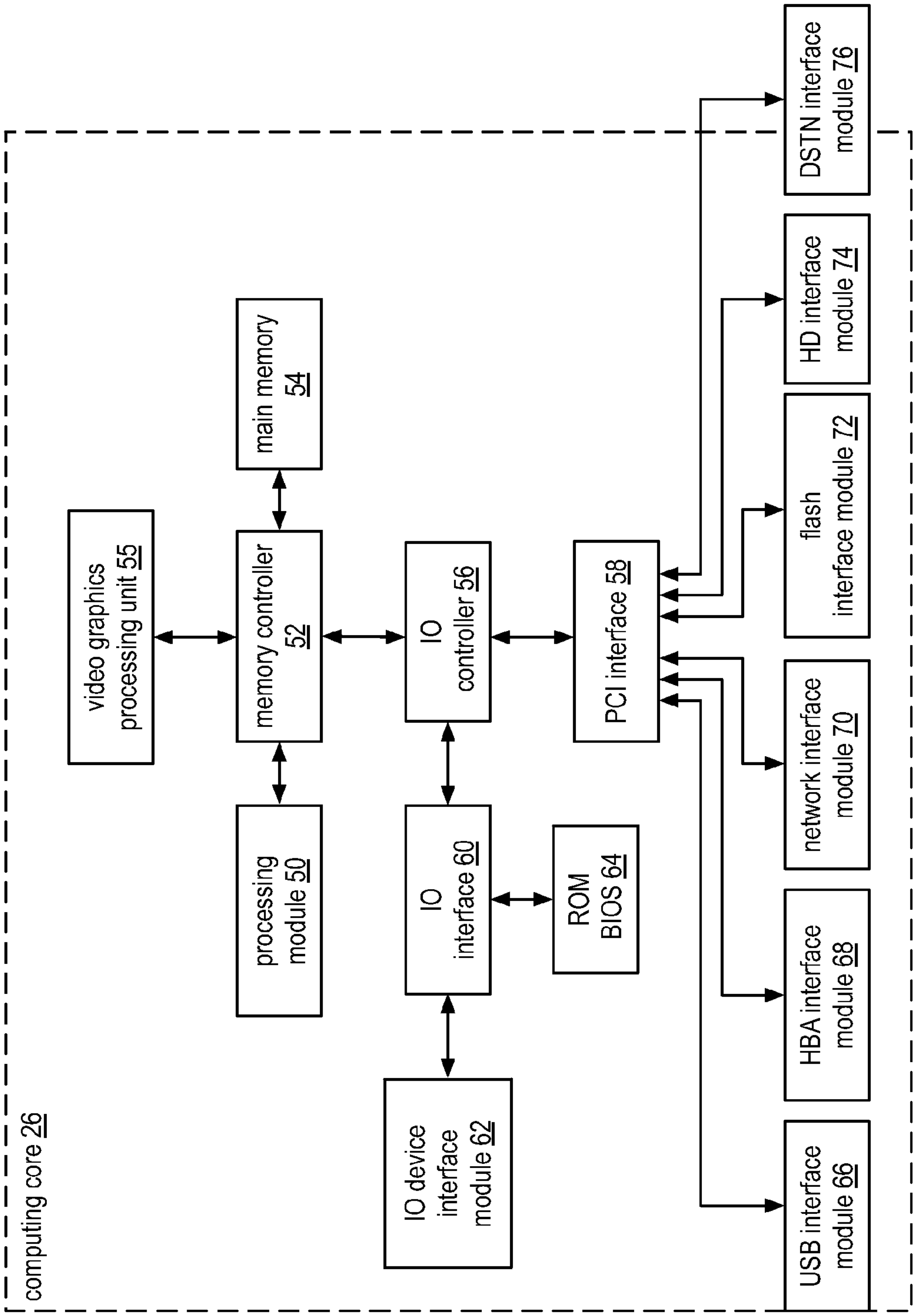
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
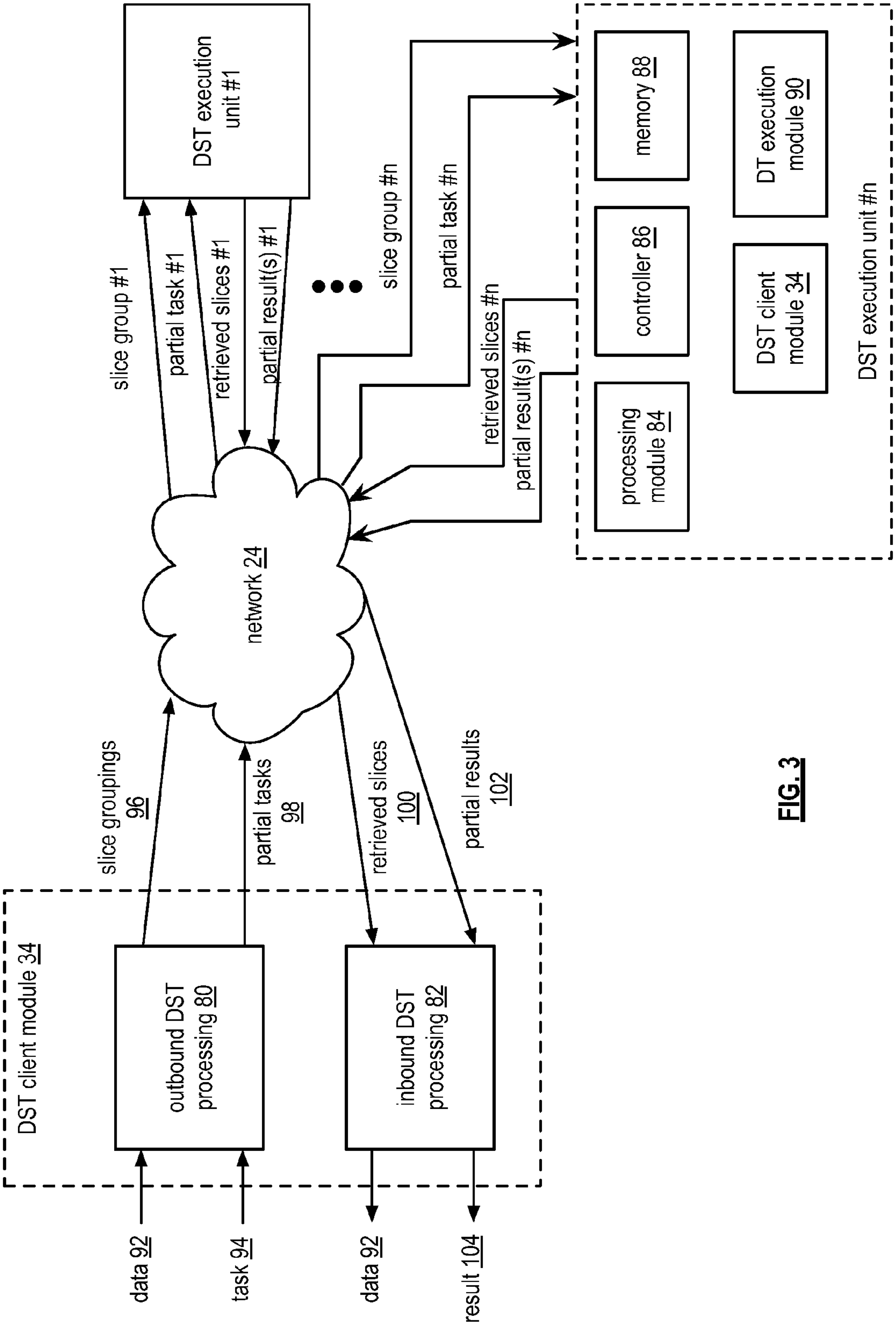
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
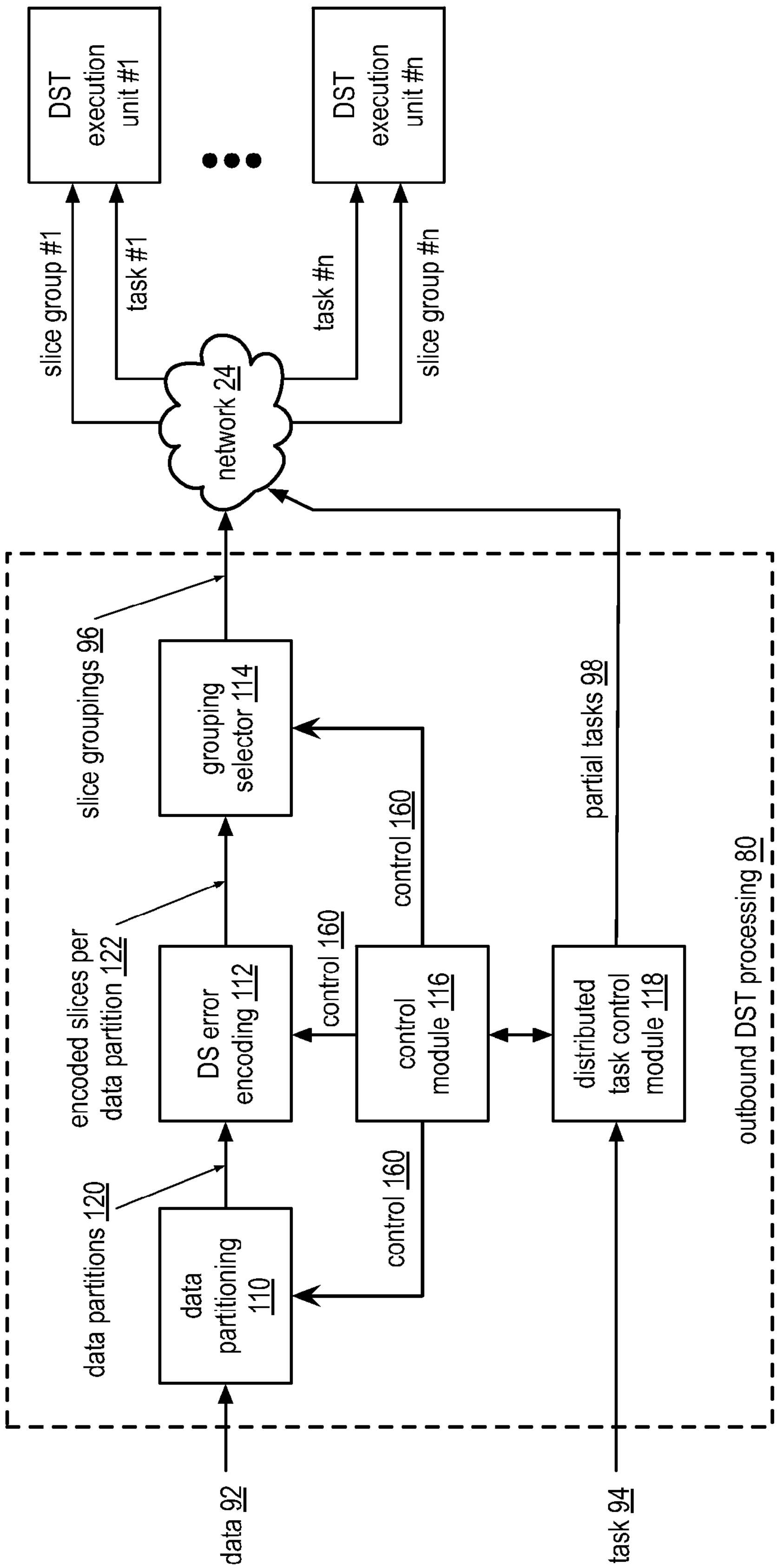
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terra-Bytes) into 100,000 data segments, each being 1 Giga-Byte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
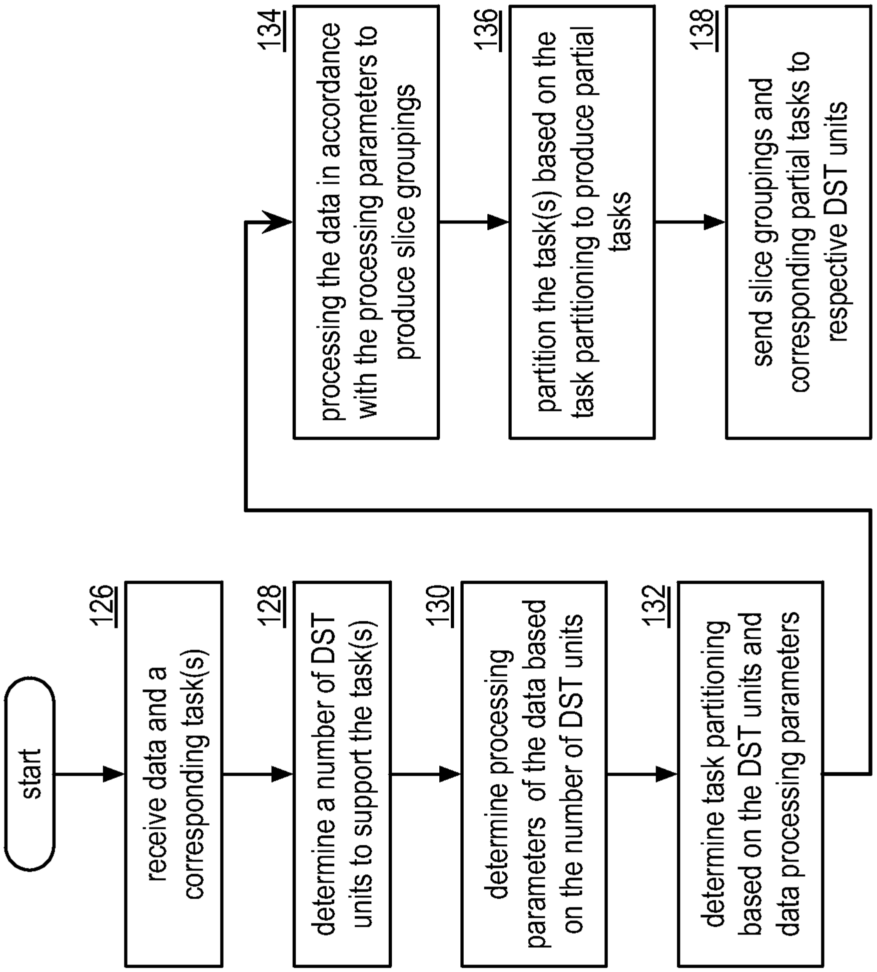
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
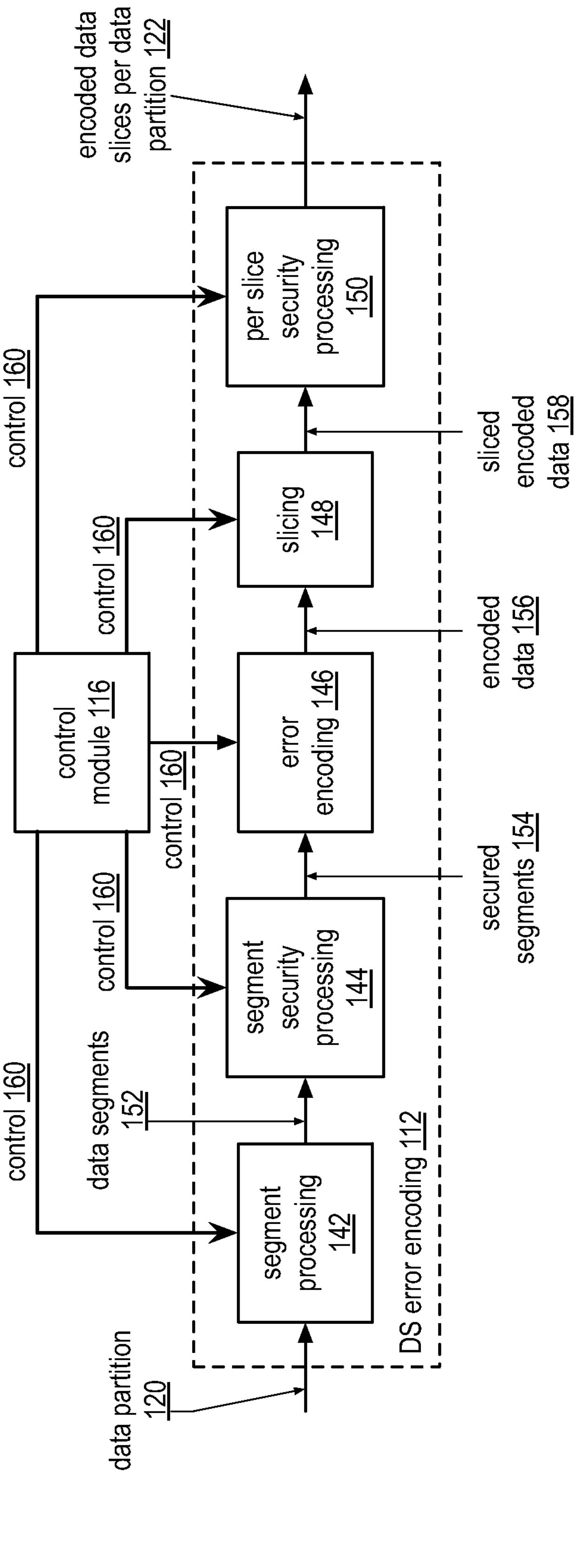
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
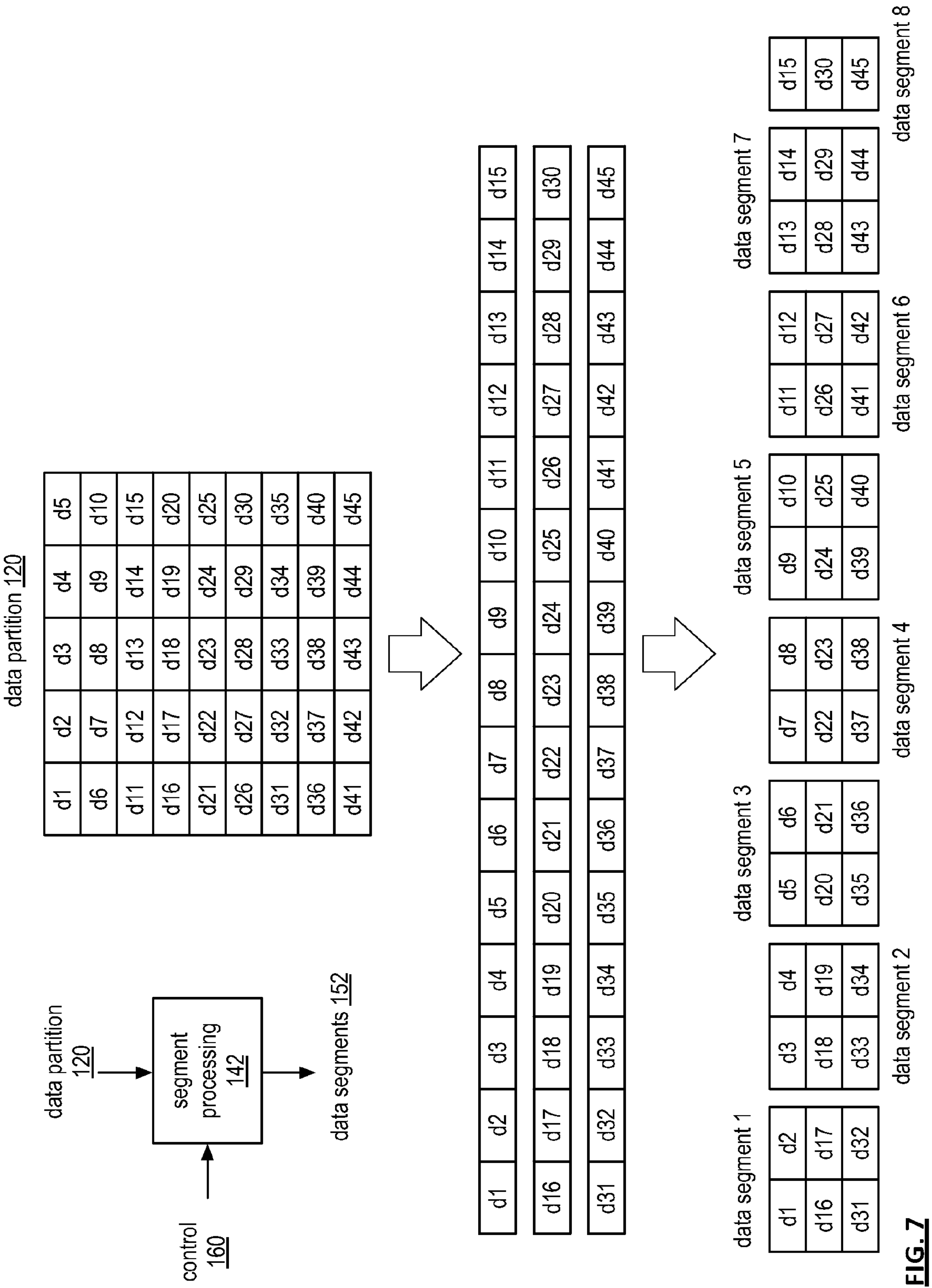
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
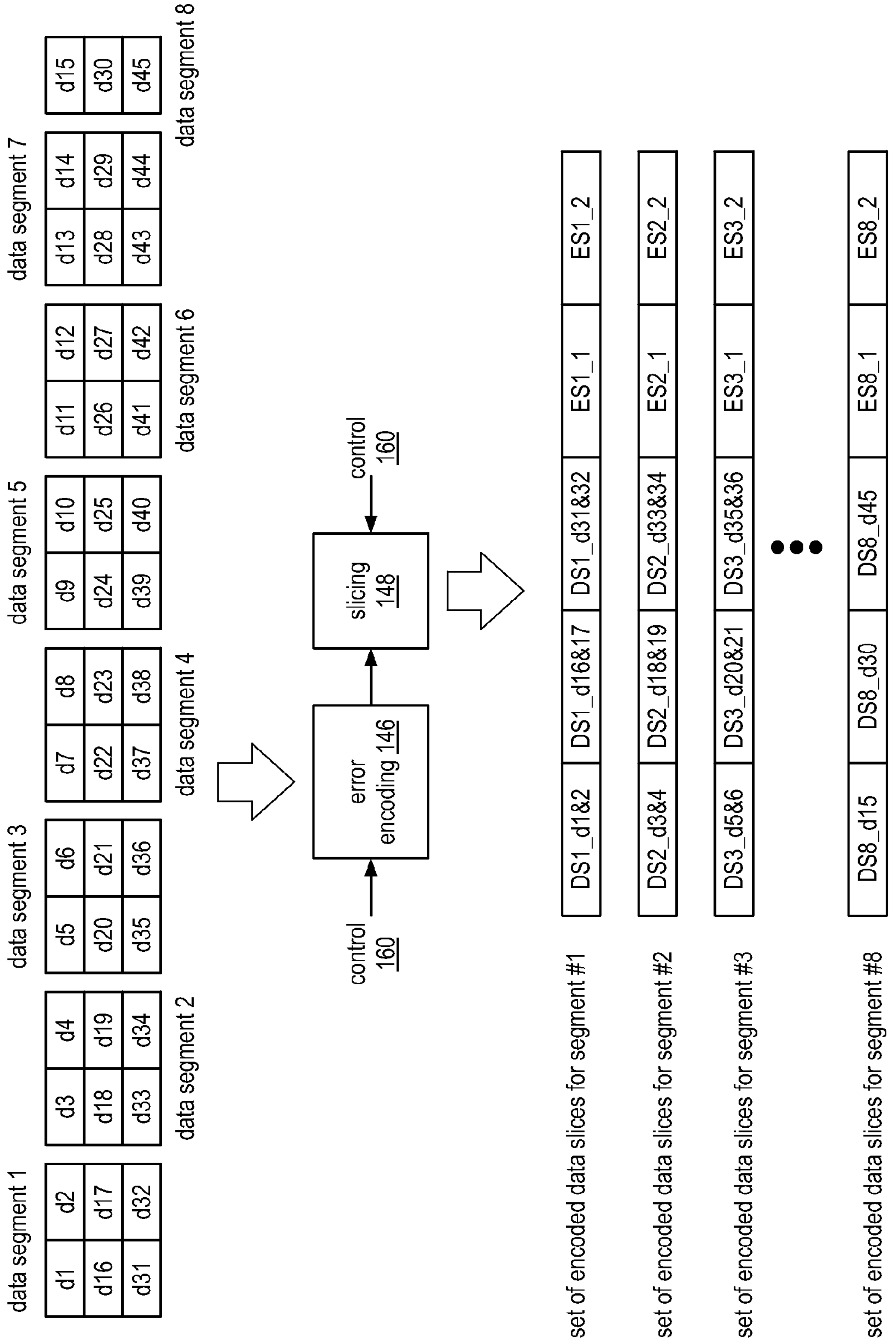
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1__1 and ES1__2) of the first set of encoded data slices include error correction data based on the first-third words of the first data segment. With such an encoding and slicing scheme, retrieving any three of the five encoded data slices allows the data segment to be accurately reconstructed.

The encoding and slices of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1__1 and ES1__2) of the second set of encoded data slices includes error correction data based on the first-third words of the second data segment.

Figure 9:
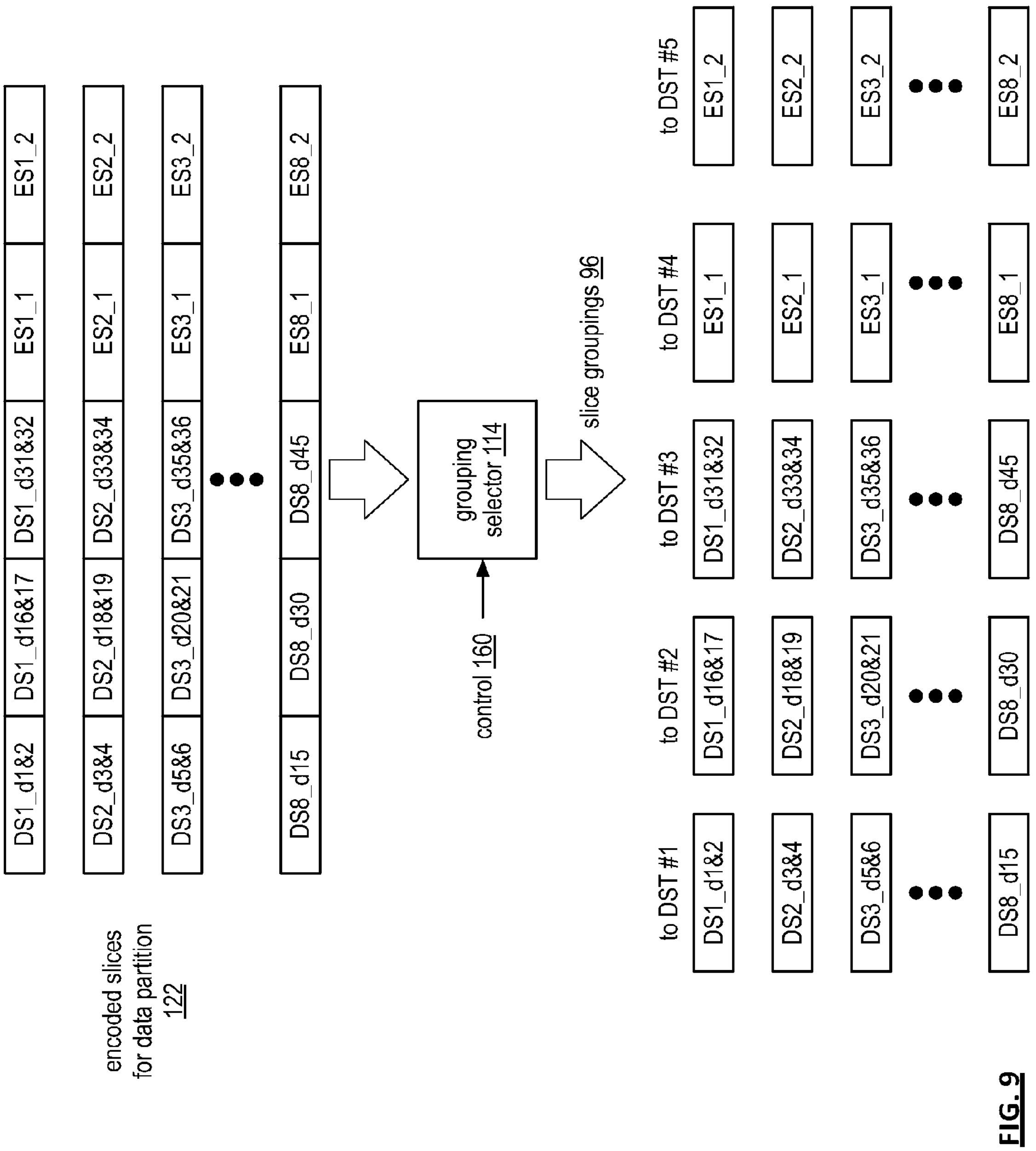
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selection module 114 organizes the encoded data slices into five slice groupings (e.g., one for each DST execution unit of a distributed storage and task network (DSTN) module). As a specific example, the grouping selection module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selection module 114 also creates a second slice grouping for a DST execution unit #2,which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45.

The grouping selection module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selection module 114 further creates a fifth slice grouping for DST execution unit #5,which includes fifth encoded slices of each of the sets of encoded slices. As such, the fifth DST execution unit receives encoded data slices corresponding to second error encoding information.

Figure 10:
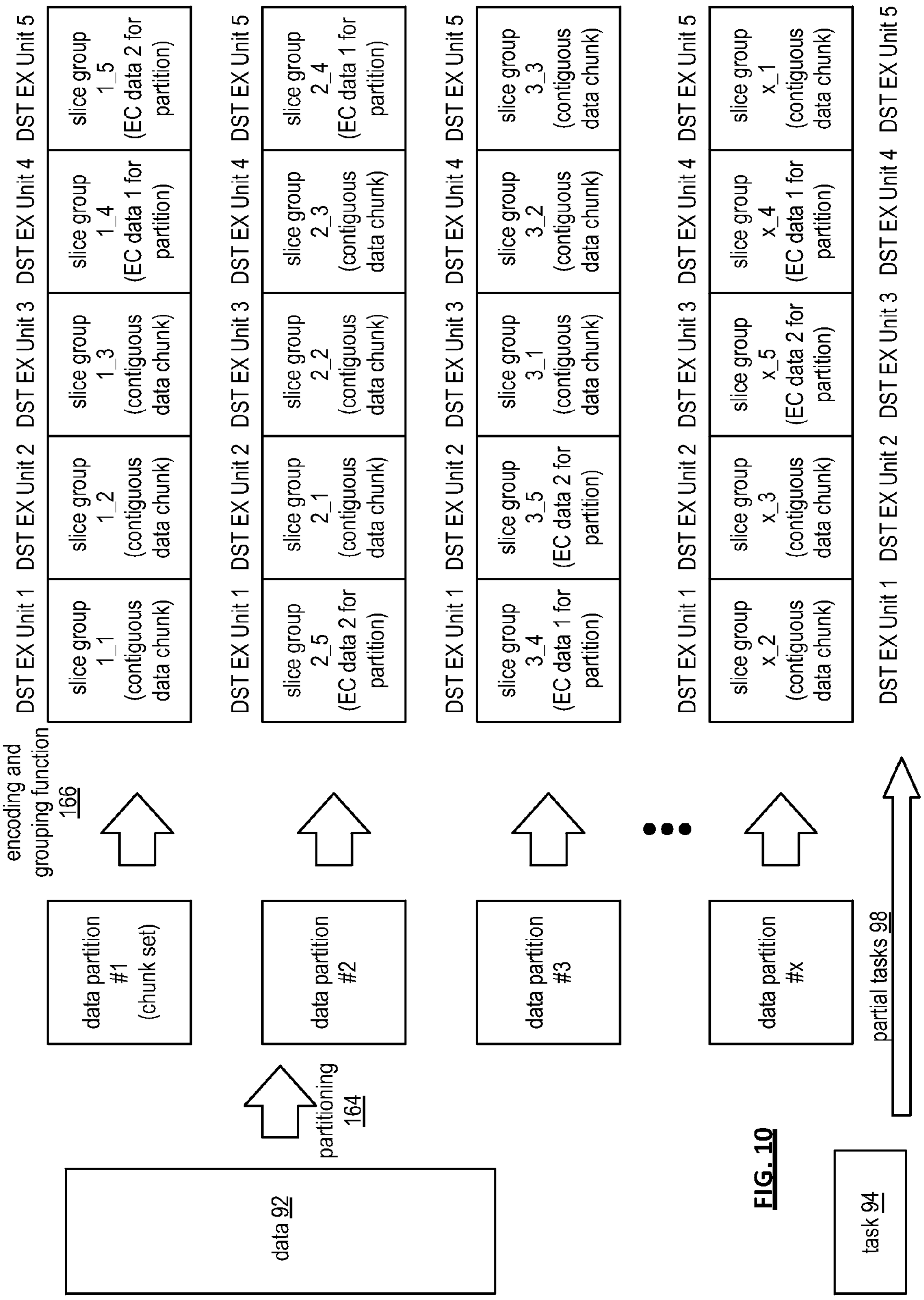
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2__1) is sent to the second DST execution unit; the second slice grouping of the second data partition (e.g., slice group 2__2) is sent to the third DST execution unit; the third slice grouping of the second data partition (e.g., slice group 2__3) is sent to the fourth DST execution unit; the fourth slice grouping of the second data partition (e.g., slice group 2__4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
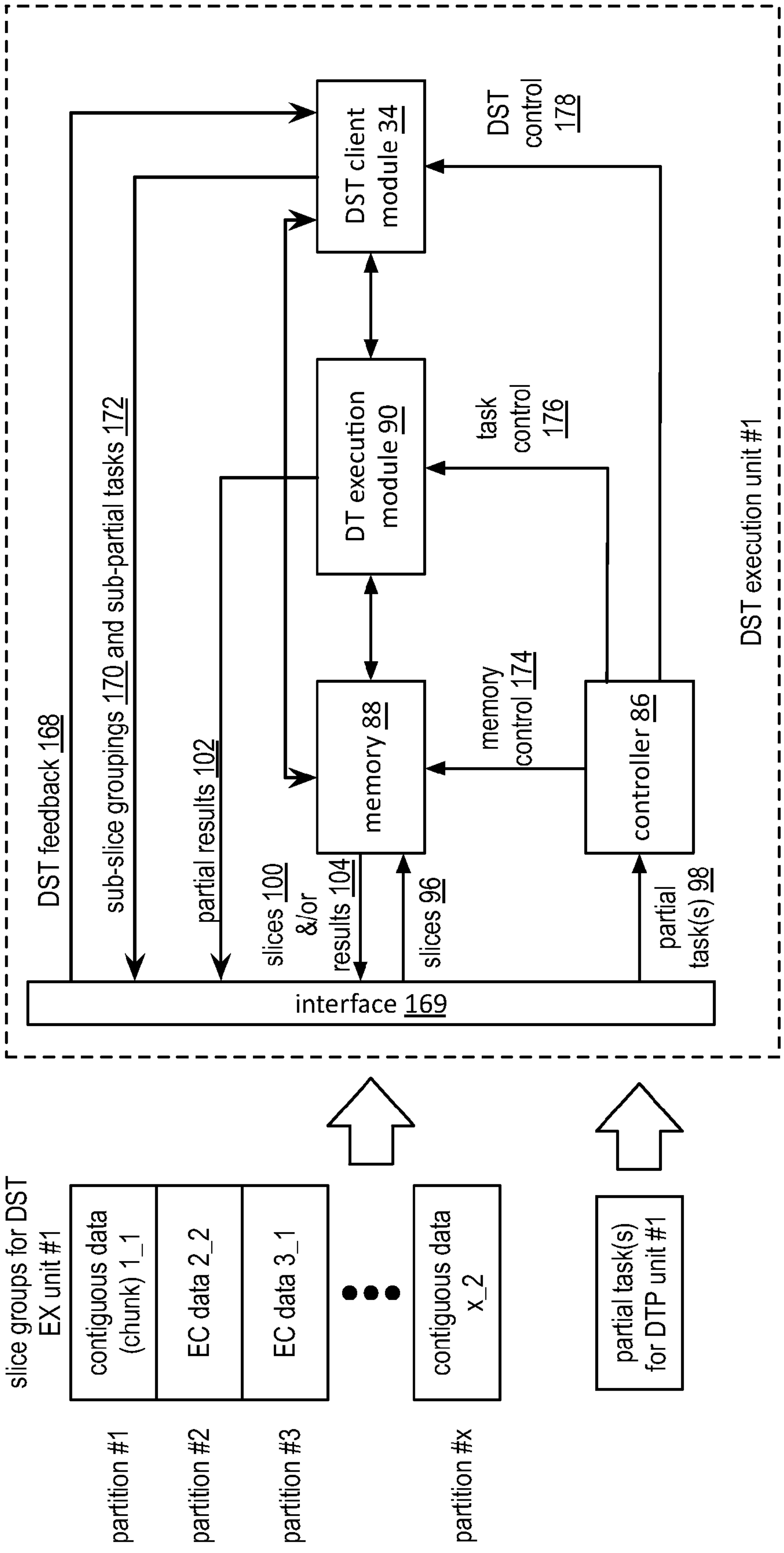
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 and the memory 88. For example, when the partial task 98 includes a retrieval request, the controller 86 outputs the memory control 174 to the memory 88 to facilitate retrieval of slices 100 and/or results 104.

Figure 12:
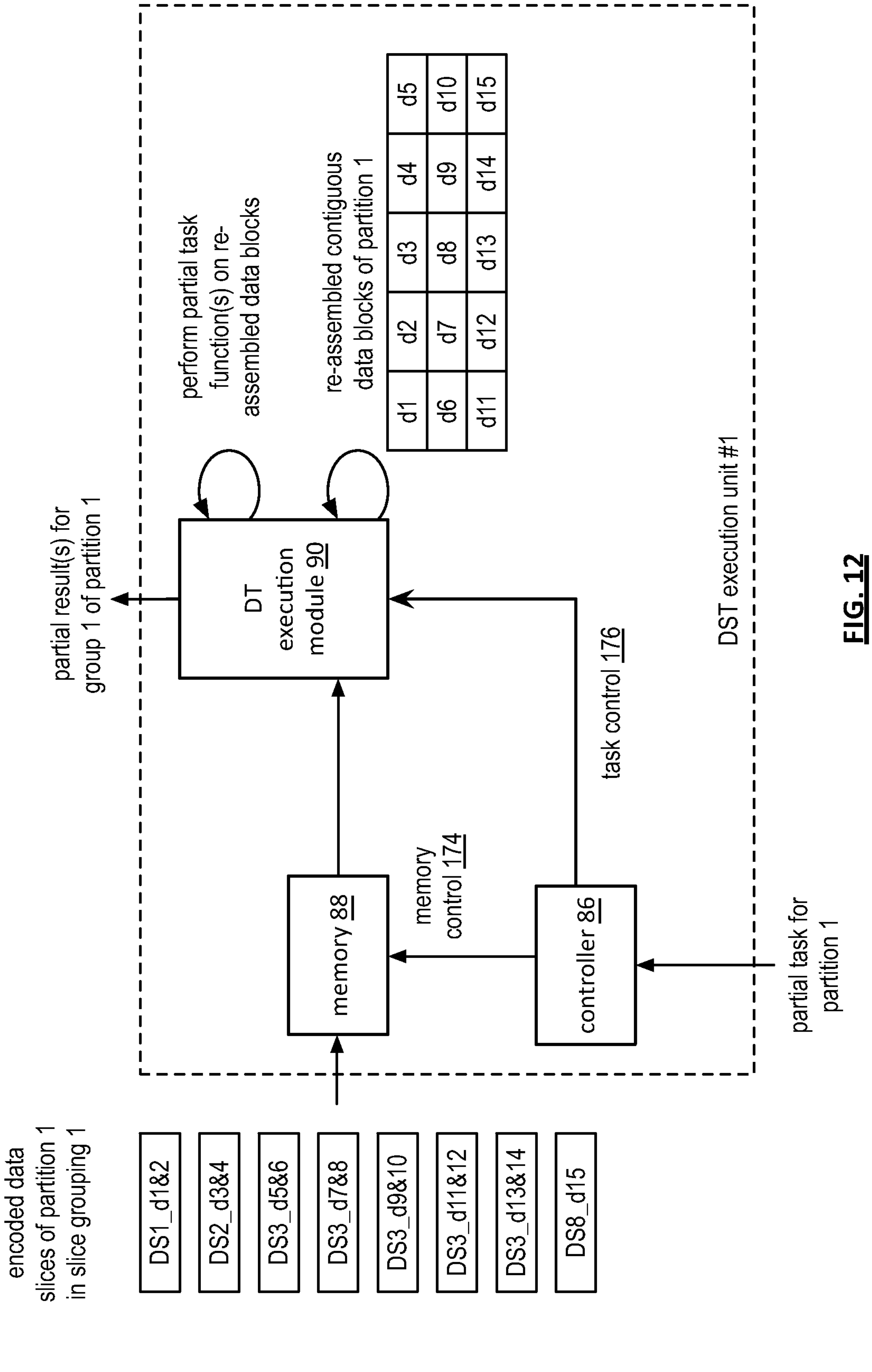
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
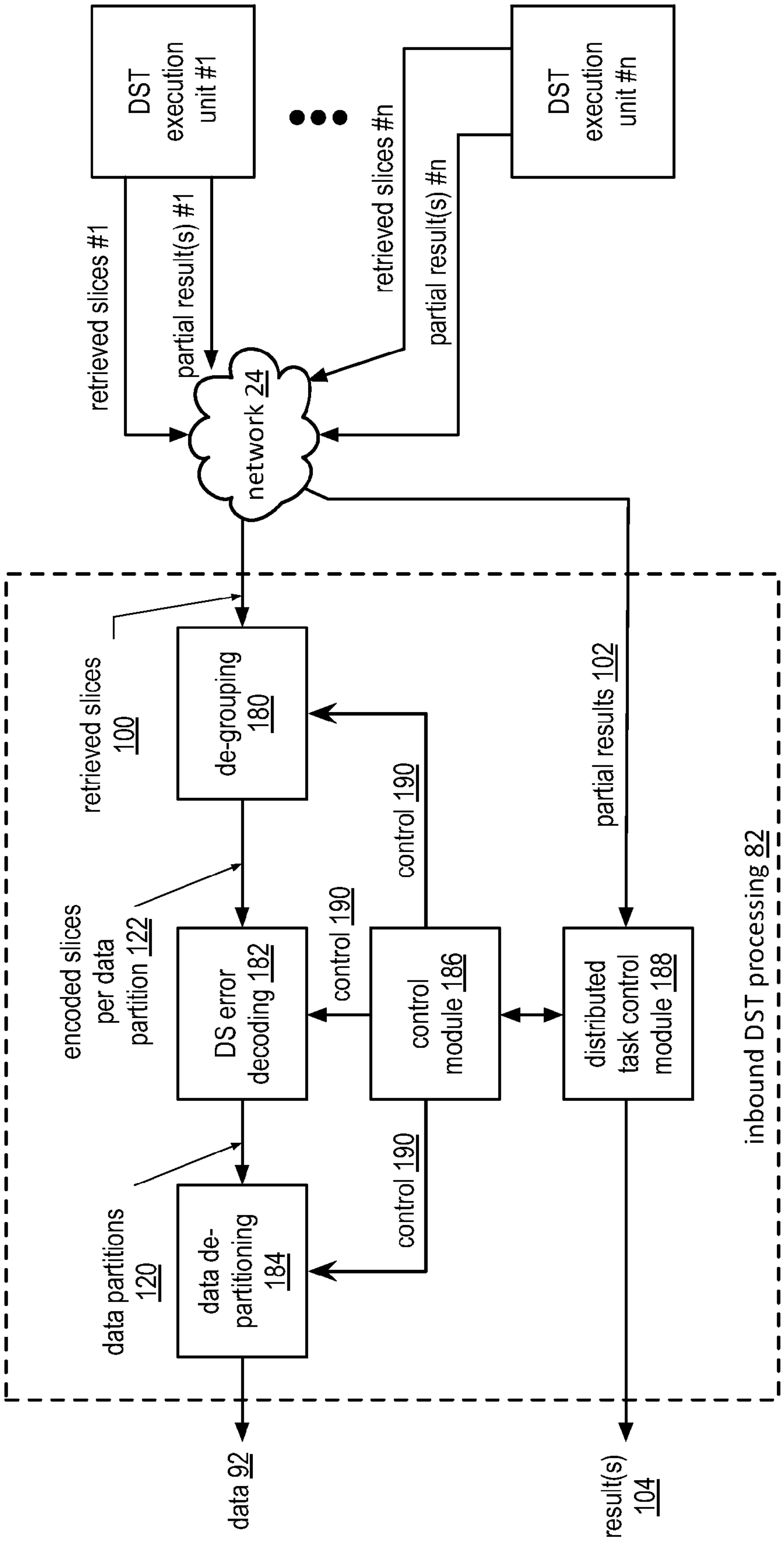
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieve slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
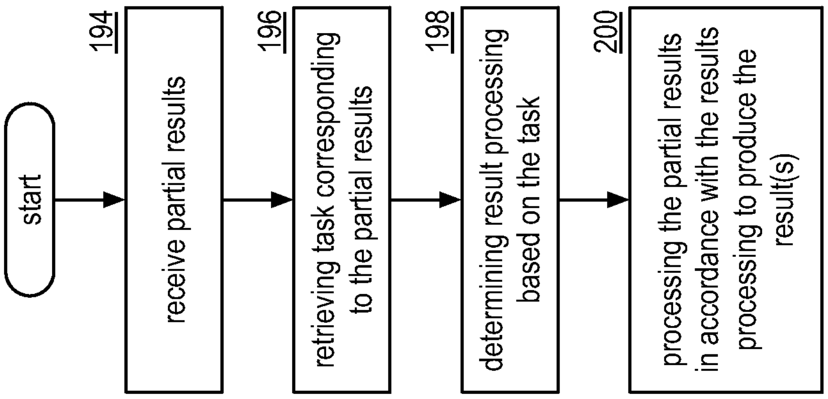
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
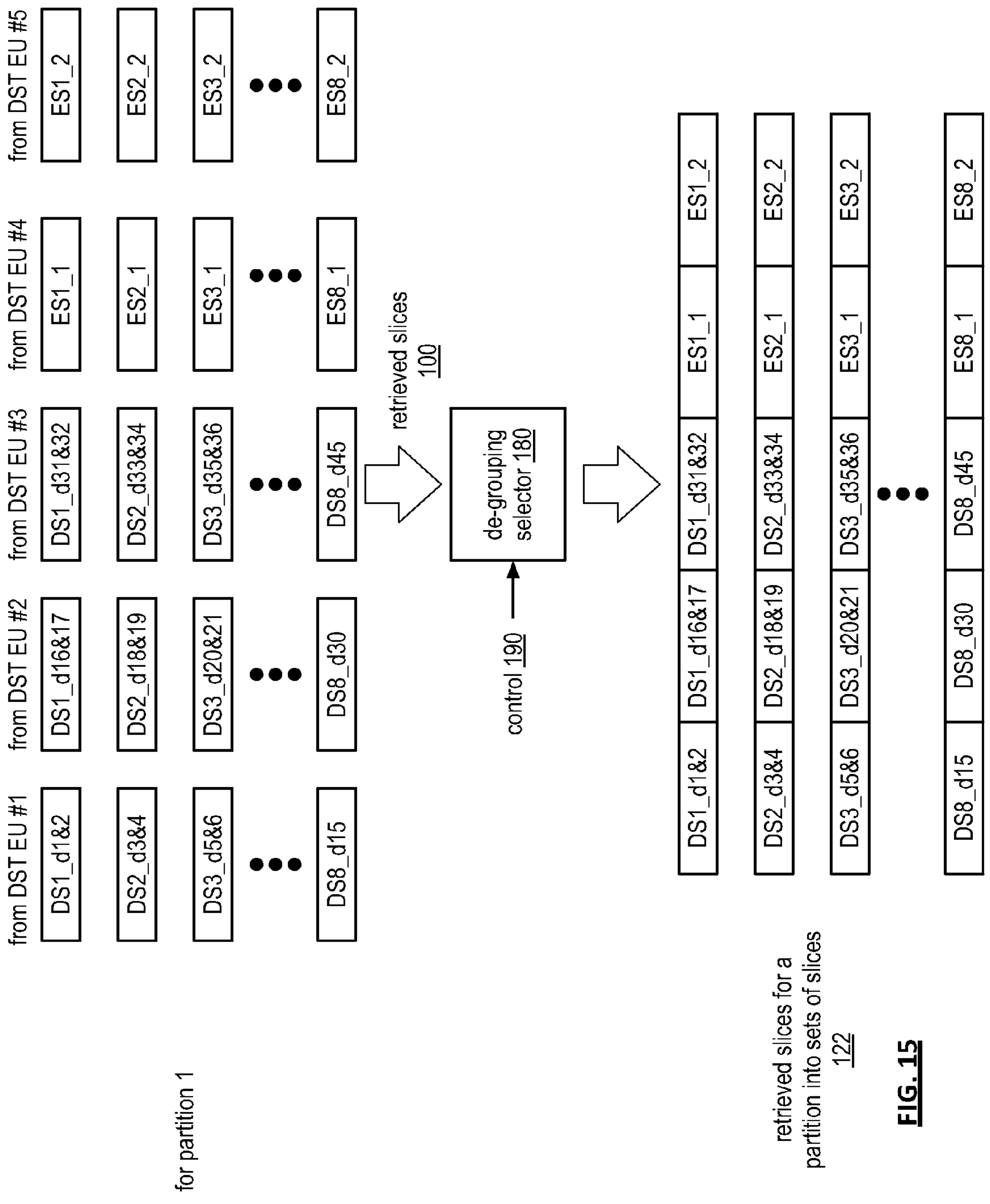
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
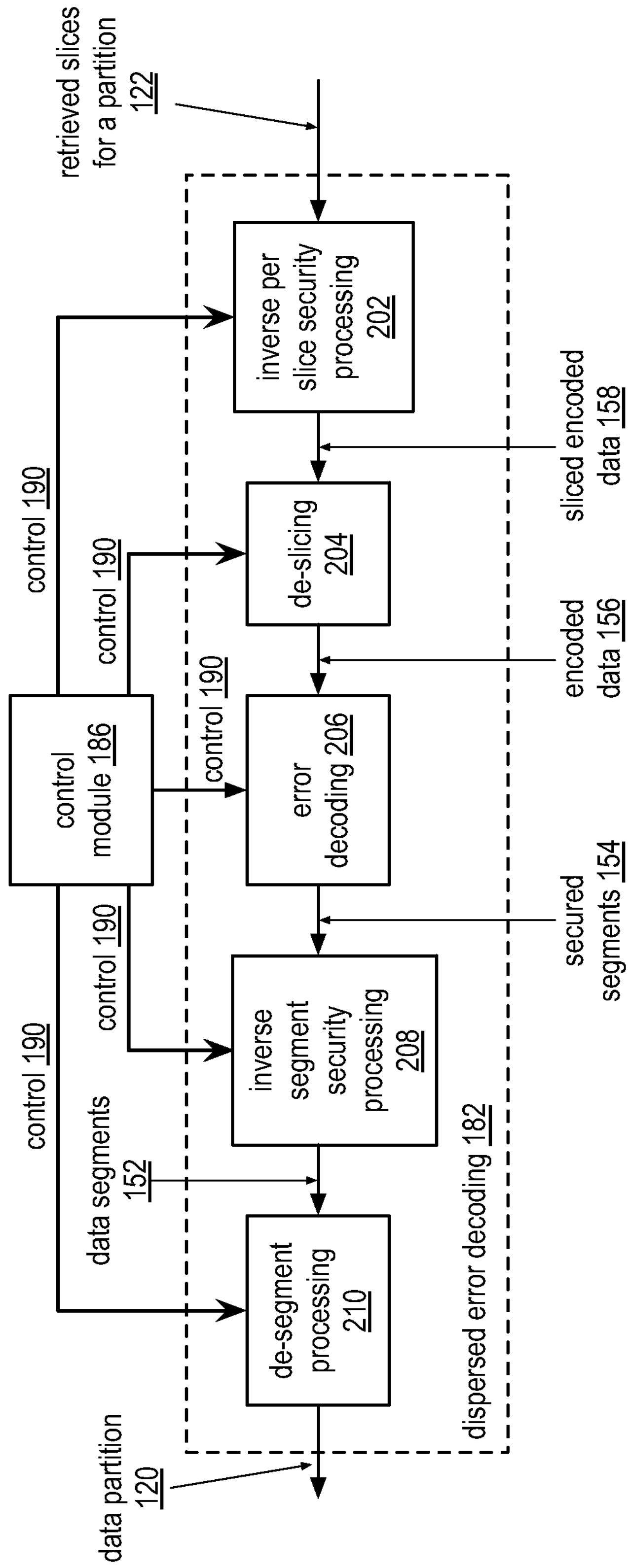
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
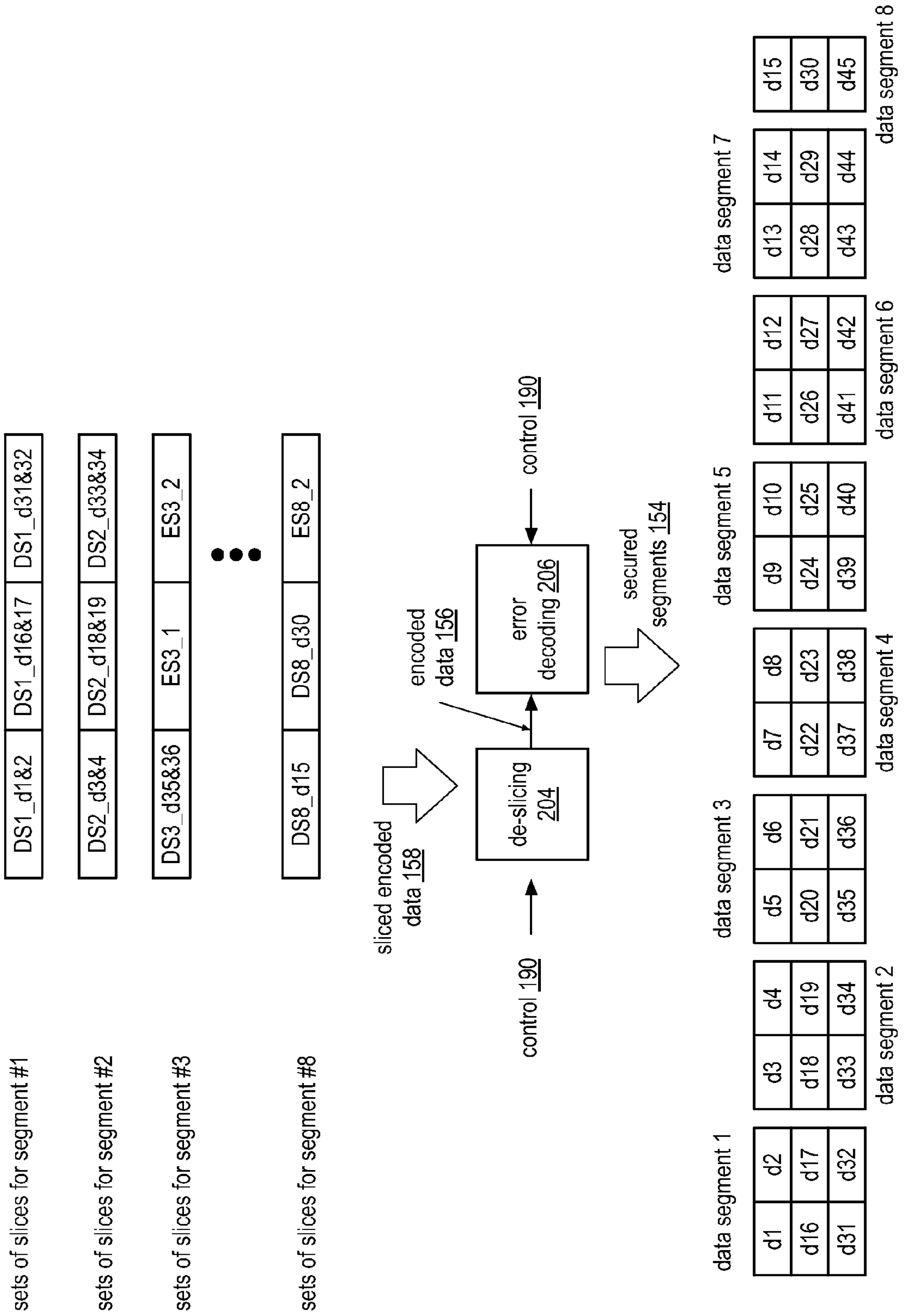
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3__1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
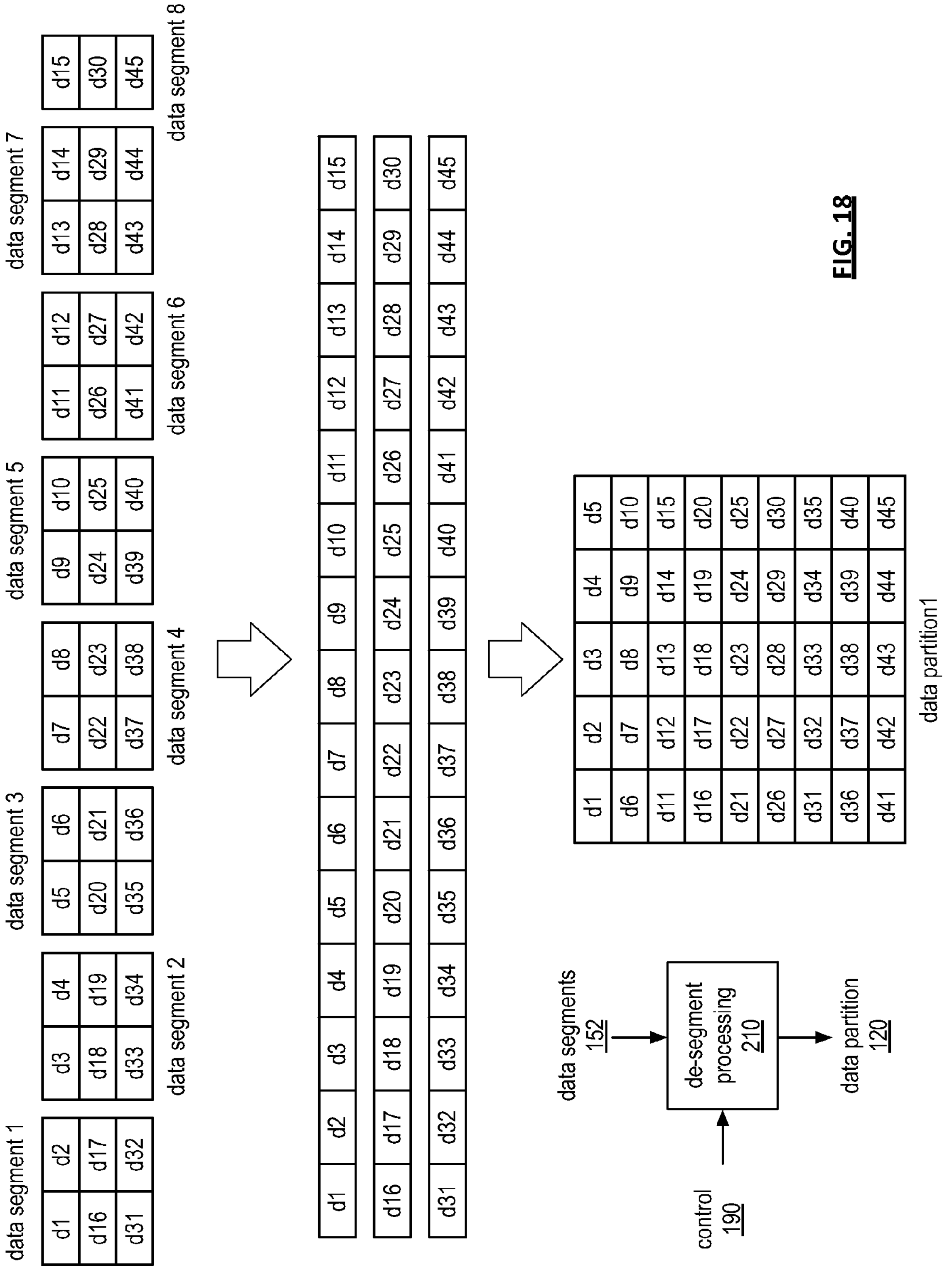
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
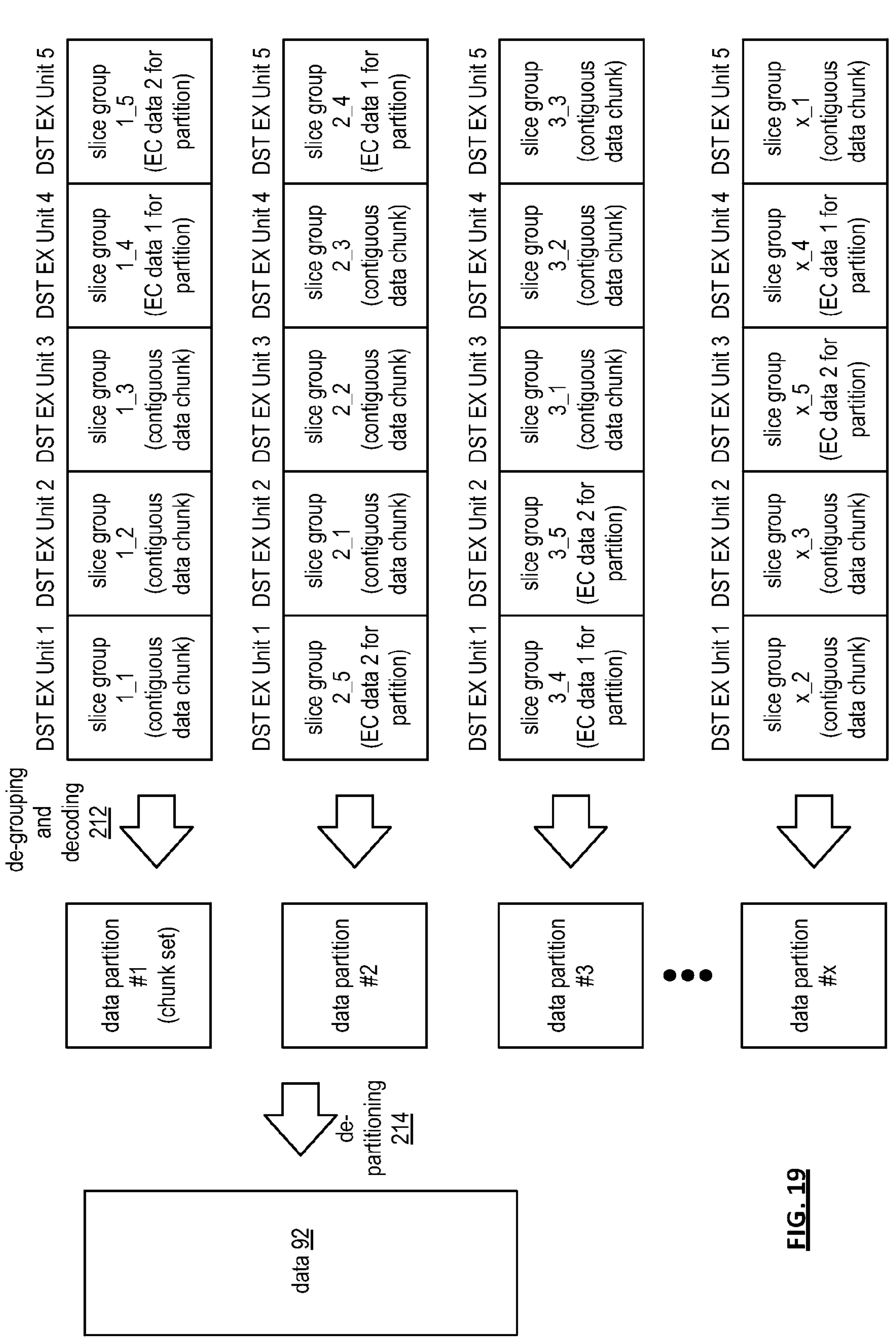
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
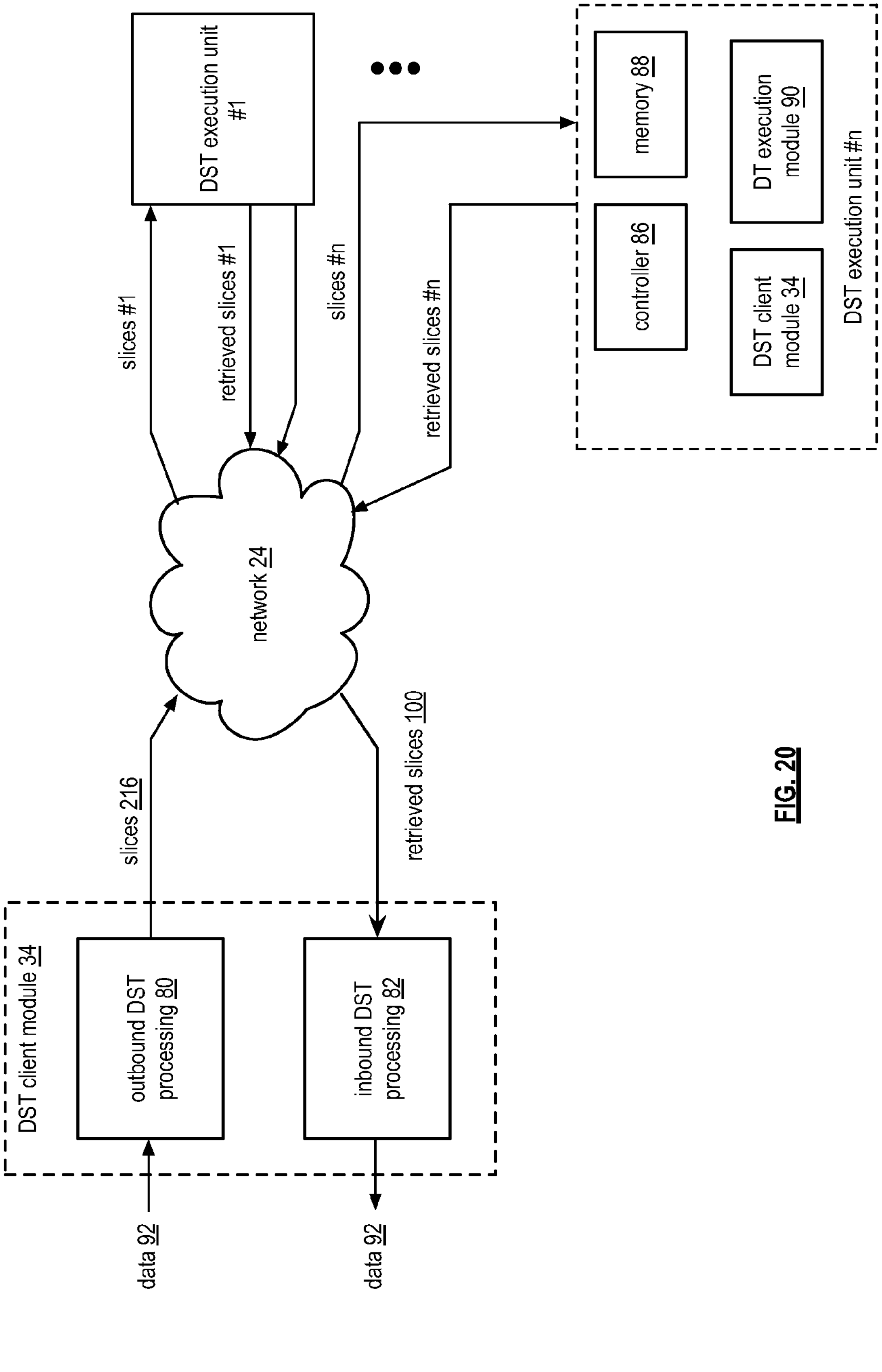
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
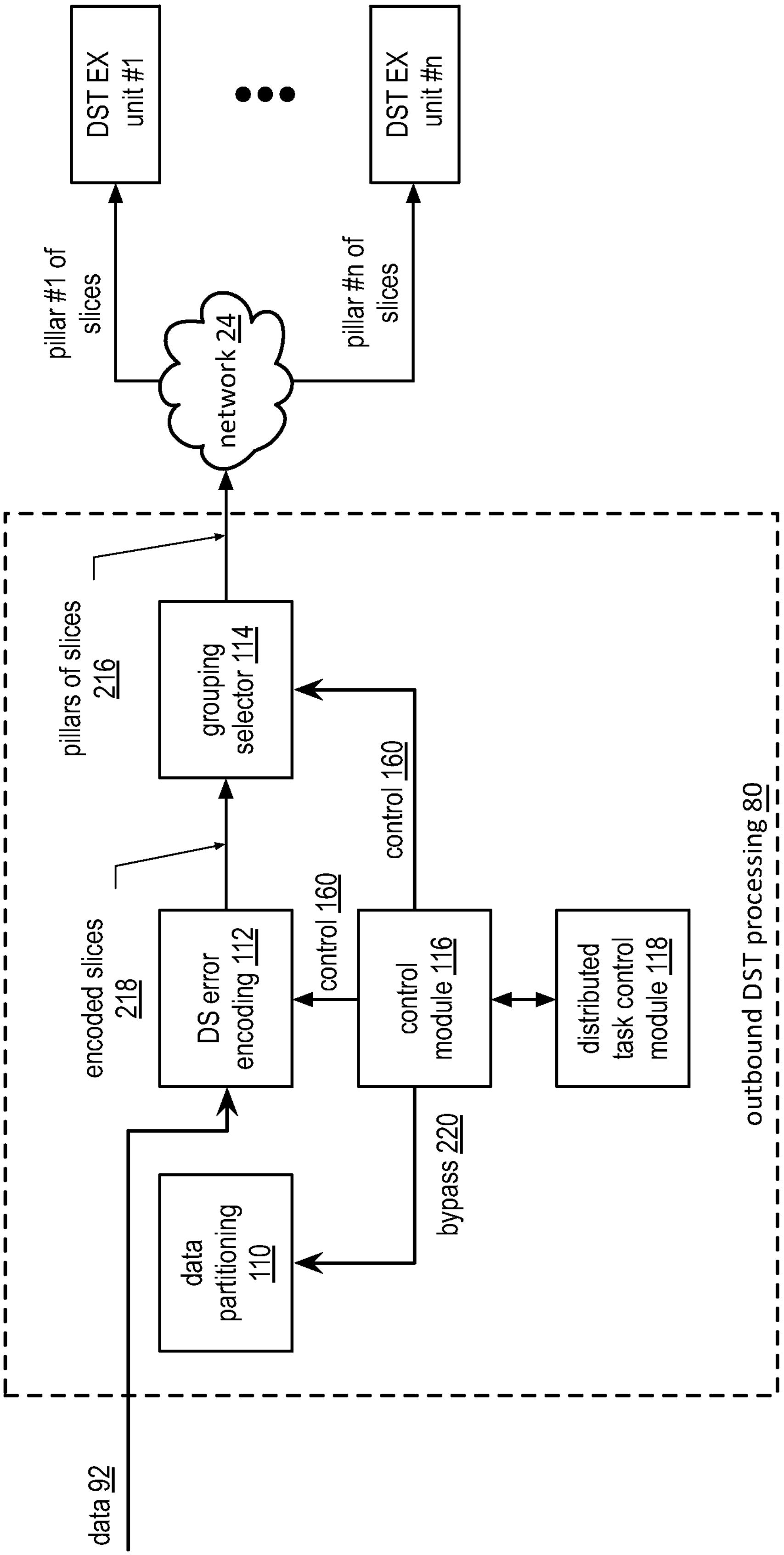
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
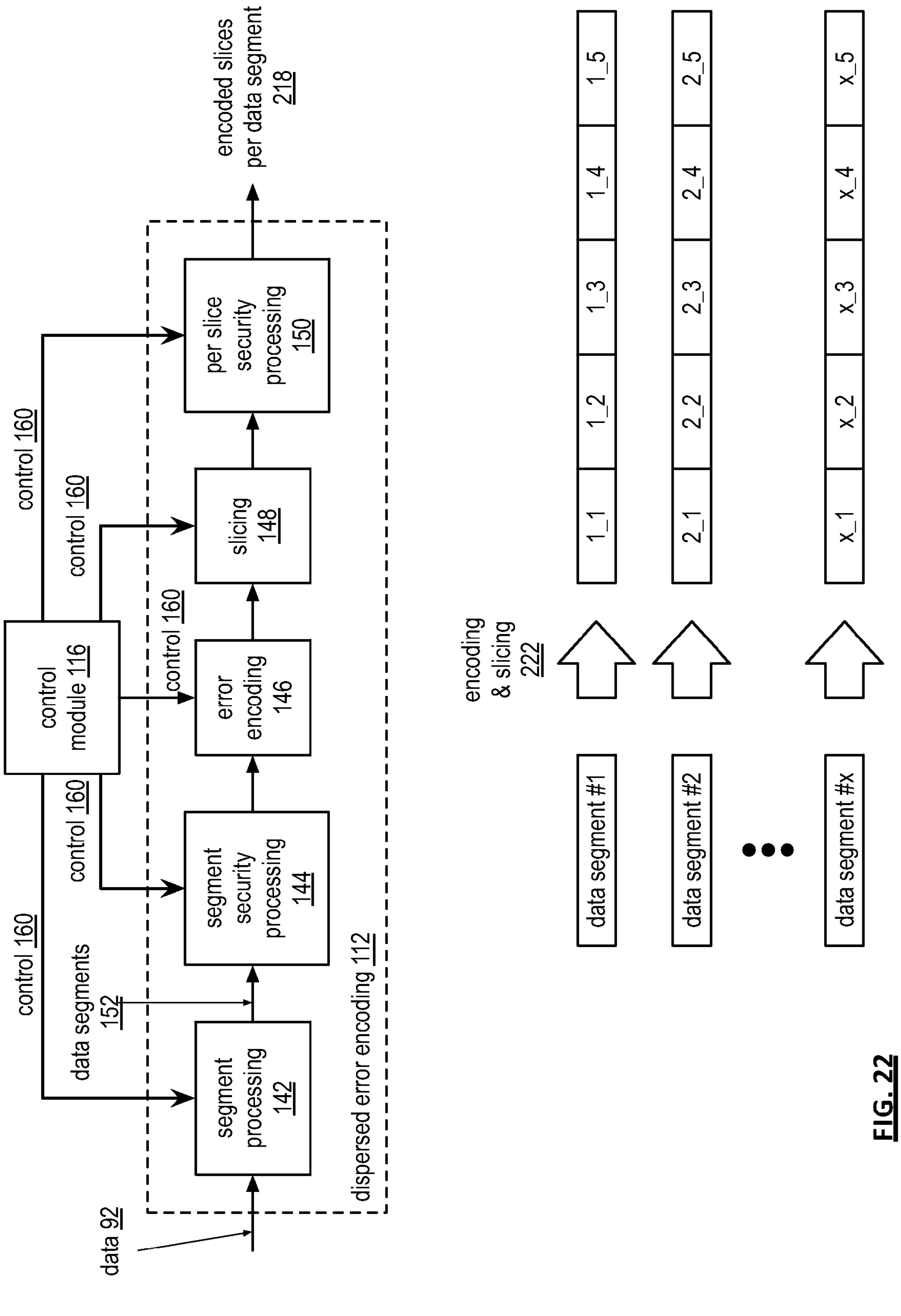
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
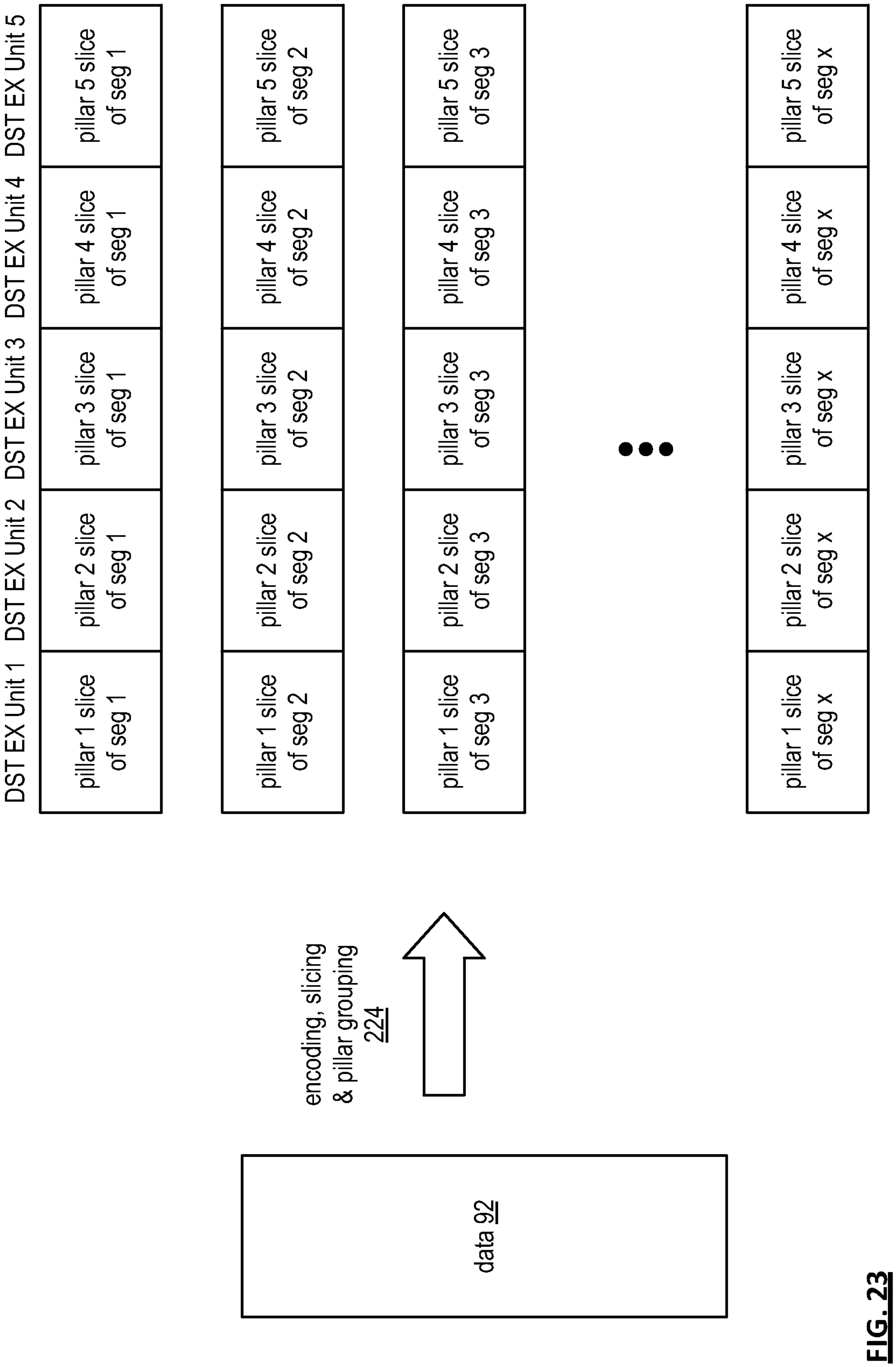
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

Figure 24:
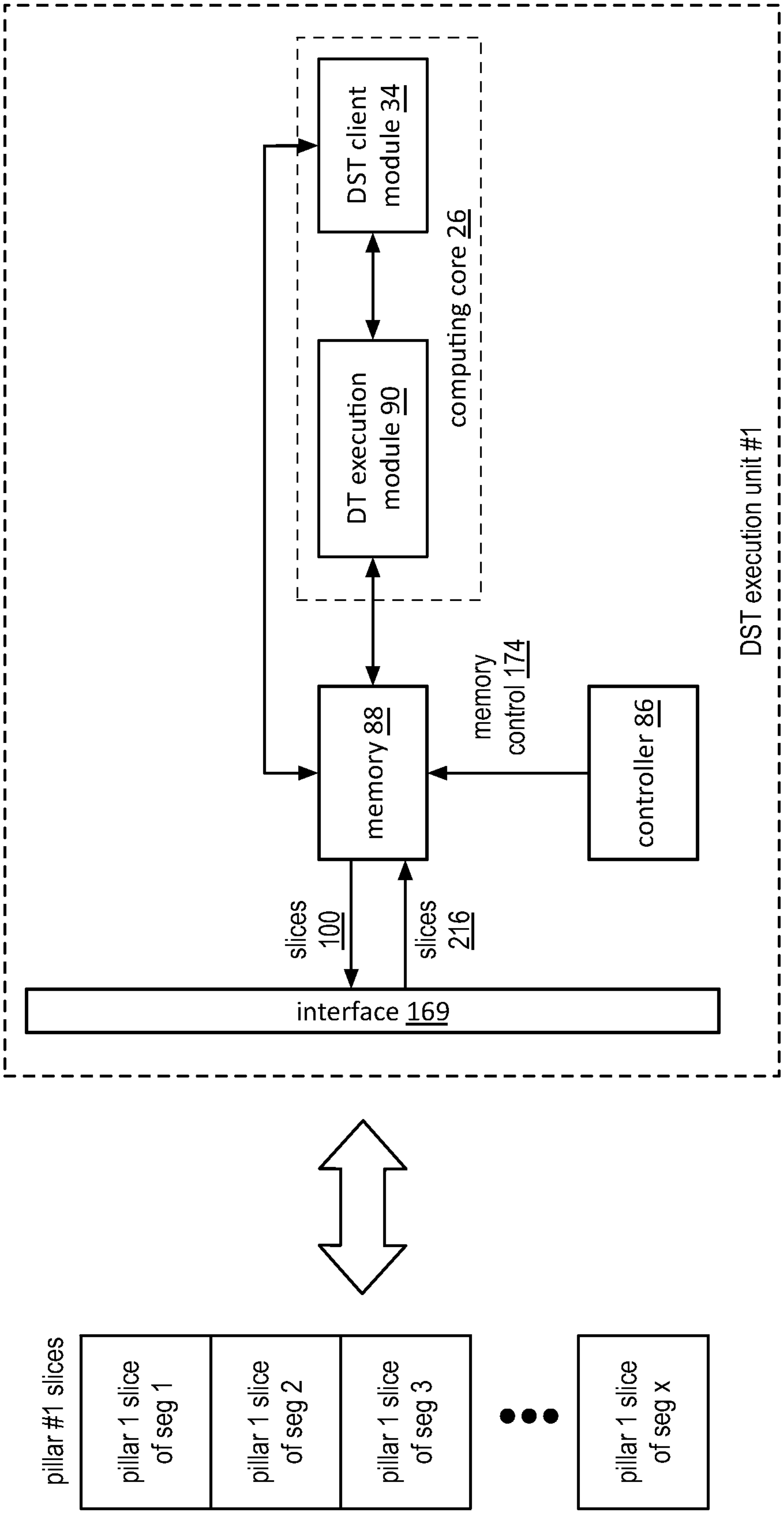
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned.

The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terra-bytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slices names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done the by DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

Figure 33:
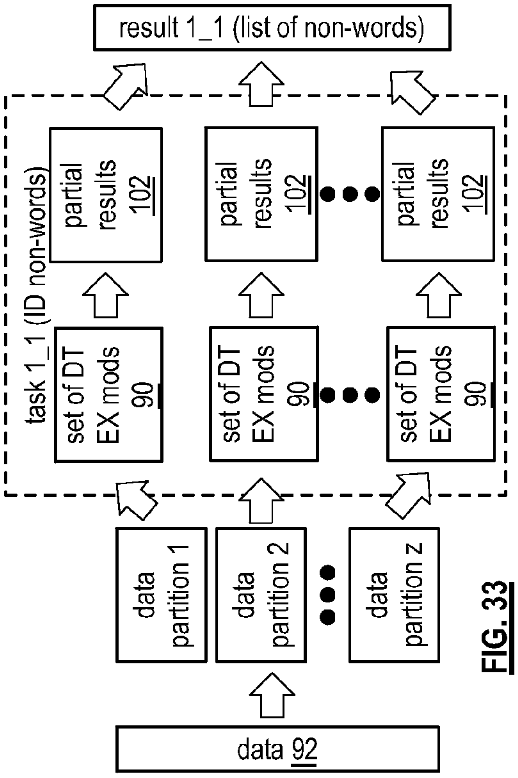

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 34:
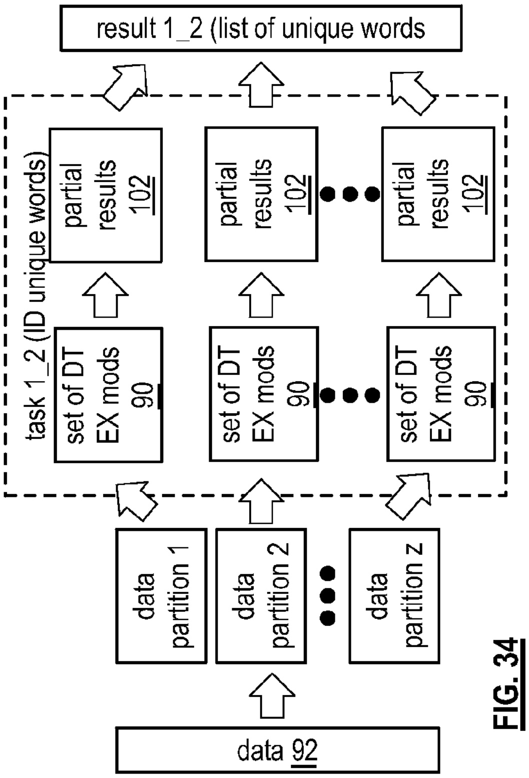

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1st through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 35:
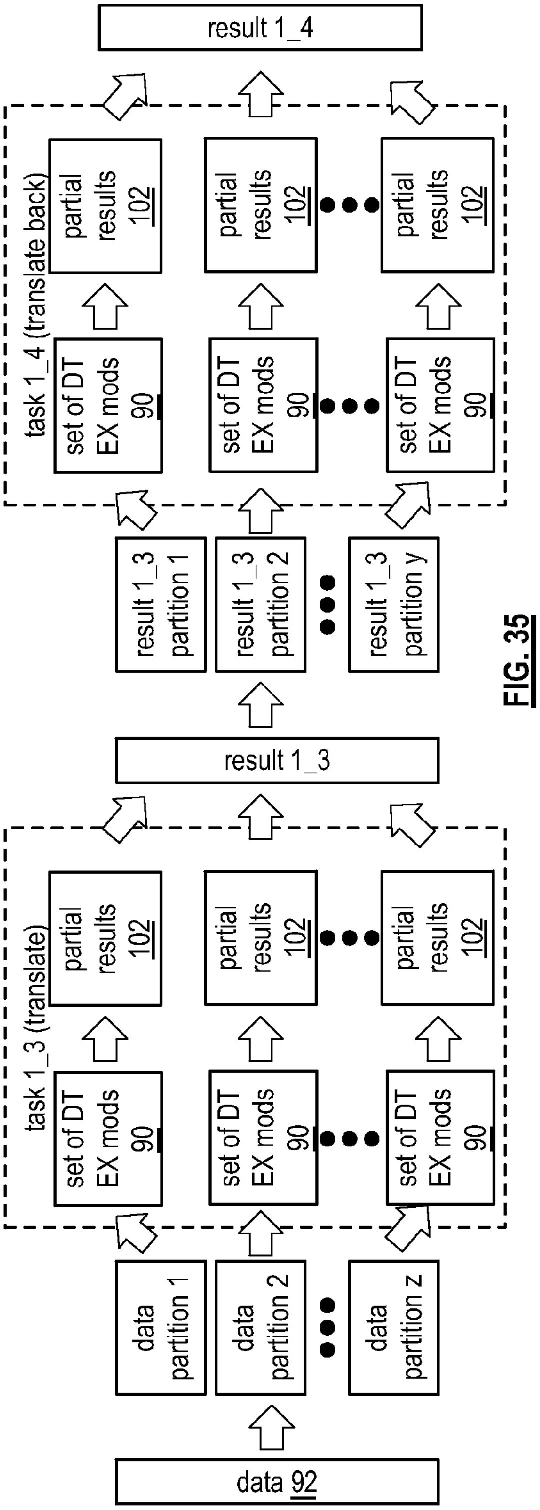

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1st through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1st through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
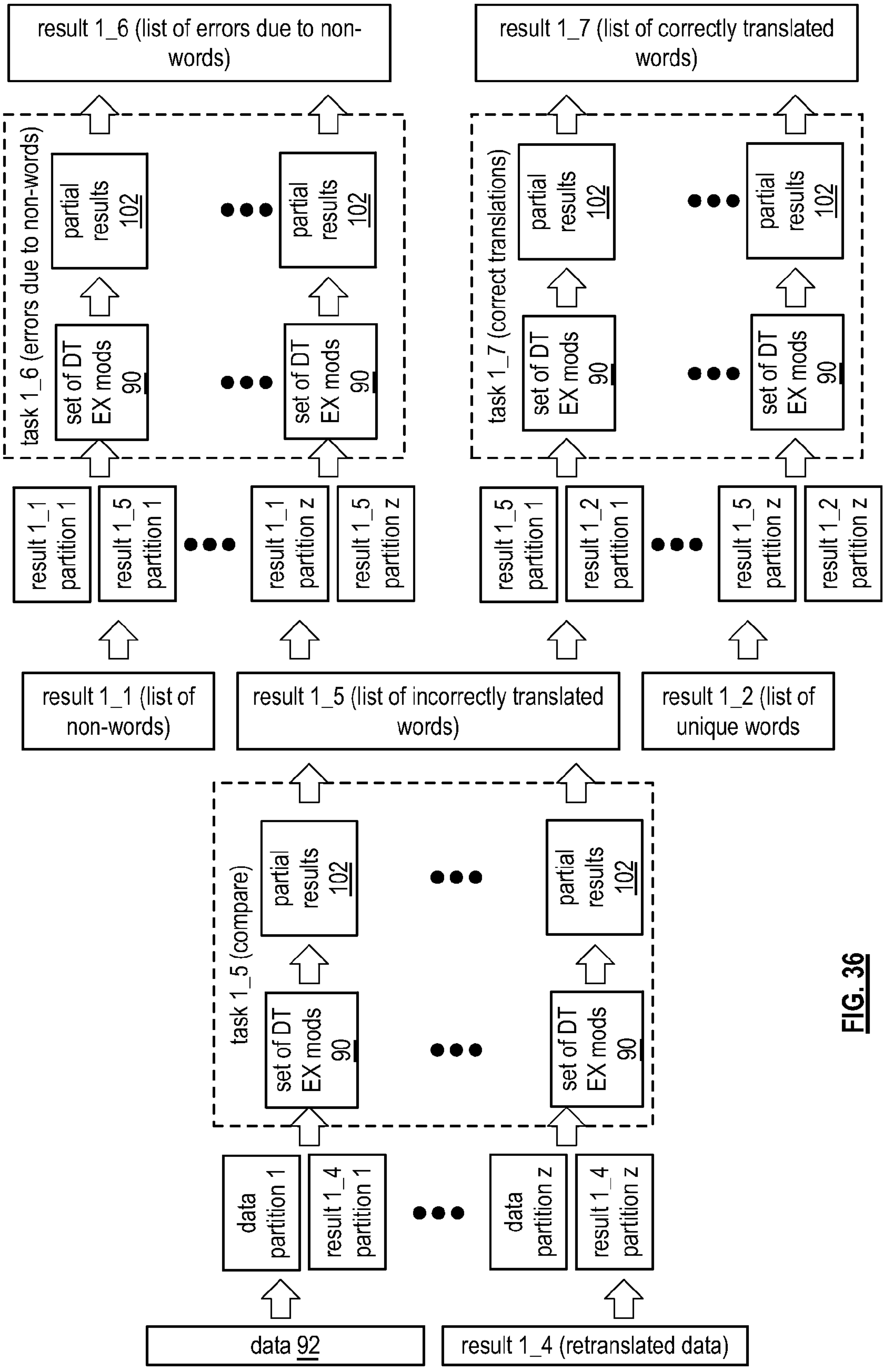

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1st through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1st through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1st through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 37:
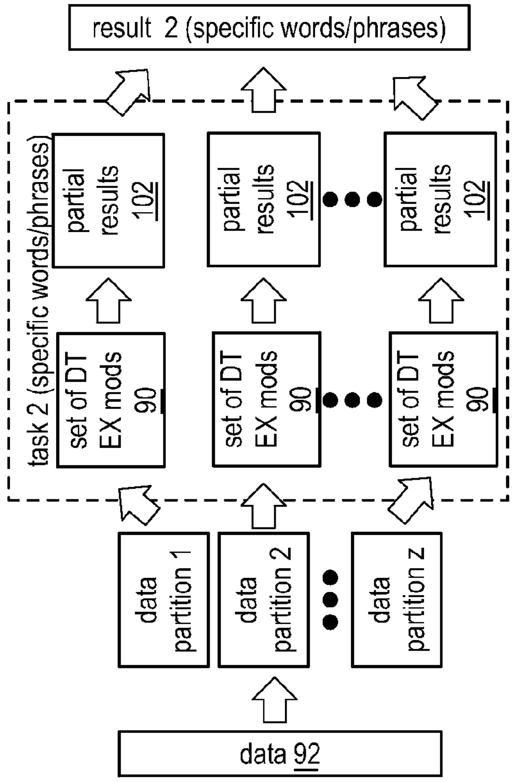

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1st through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

Figure 38:
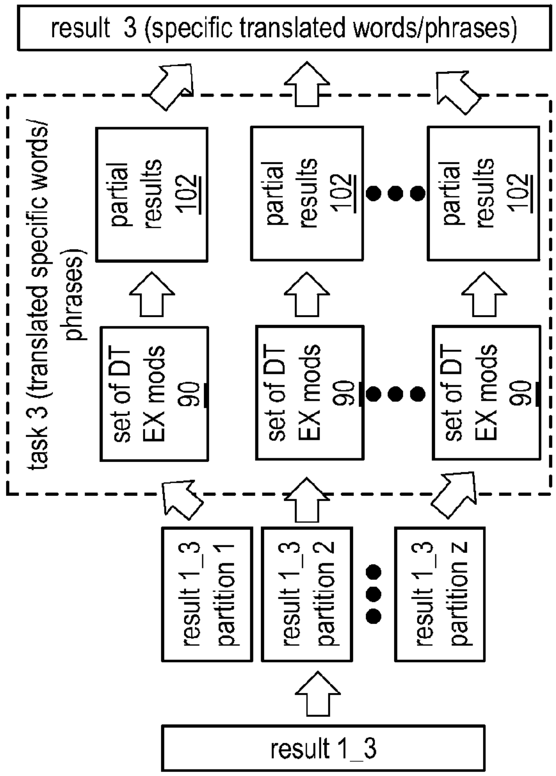

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., 1st through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

FIG. 40A is a schematic block diagram of an embodiment of a dispersed storage network that includes a computing device 350 and a dispersed storage network (DSN) memory 352. The DSN memory 352 may be implemented utilizing one or more of a distributed storage and task network (DSTN), a DSTN module, a plurality of storage nodes, one or more dispersed storage (DS) unit sets 354, and a plurality of dispersed storage (DS) units 356. Each DS unit 356 may be implemented utilizing at least one of a storage server, a storage unit, a storage module, a memory device, a memory, a distributed storage and task (DST) execution unit, a user device, a DST processing unit, and a DST processing module. The computing device 350 may be implemented utilizing at least one of a server, a storage unit, a DSTN managing unit, a DSN managing unit, a DS unit 356, a storage server, a storage module, a DS processing unit, a DST execution unit, a user device, a DST processing unit, and a DST processing module. For example, computing device 350 is implemented as the DS processing unit. The computing device 350 includes a dispersed storage (DS) module 358. The DS module 358 includes a monitor module 360, an interpret module 362, a reprioritize module 364, and an output module 366.

The system functions to monitor processing status 372 of access requests, interpret the processing status 372 to detect a processing anomaly 374, reprioritizes further processing access requests, and outputs notice of reprioritized further processing 376. With regards to the monitoring of the processing status 372 of the access requests, monitor module 360 monitors processing status 372 of a plurality of pending DSN access requests, where a pending DSN access request of the plurality of pending DSN access requests includes a set of access requests 368 regarding a set of encoded data slices. The set of access requests 368 is sent to DS units 356 (e.g., DS unit set 354) of the DSN memory 352, where less than a desired number of the DS units 356 have favorably responded to the set of access requests 368. The monitor module 360 monitors the processing status 372 by one or more of a variety of monitoring approaches.

A first monitoring approach includes the monitor module 360 determining a number of favorable replies of replies 370 received from the DS units 356 regarding the pending DSN access request. The DSN access request includes one or more of a read request, a request of a three-phase write commit process (e.g., a request of the three-phase write commit process includes at least one of a write request, a commit request, and a finalize request), a status request, a delete request, and an update request. The DSN access request may further include one or more of a requested priority level and a transaction number. The requested priority level may include a continuum from high to low, no priority level, and zero priority to cancel the DSN access request. The requested priority level may be determined based on one or more of a predetermination, a historical record, and a performance requirement. The replies 370 includes at least one of a read response and a write response. The read response and the write response may include one or more of a transaction number, a slice name, an encoded data slice for a read request, and a favorability indicator. A favorable read response indicates a favorable reply with regards to a corresponding pending DSN read access request. A favorable write response indicates a favorable reply with regards to a corresponding pending DSN write access request. The monitor module 360 may also determine a number of unfavorable replies received from the DS units regarding the pending DSN access request (e.g., responses including a unfavorable indicator).

A second monitoring approach includes the monitor module 360 determining a rate of receiving favorable replies from the DS units 356 regarding the pending DSN access request (e.g., quantity per unit of time). A third monitoring approach includes the monitor module 360 determining a priority of the pending DSN access request. The determining includes at least one of performing a lookup, interpreting a copy of the pending DSN access request, and issuing a query to a corresponding DS unit 356. A fourth monitoring approach includes the monitor module 360 determining a request type of the pending DSN access request. The determining includes at least one of performing a lookup, interpreting the copy of the pending DSN access request, and issuing a query to the corresponding DS unit 356. The DSN access requests of different request types may be prioritized differently in accordance with the request type. For example, a read request may be prioritized over a write request. As another example, a write request may be prioritized over a delete request. As yet another example, a delete request may be prioritized over a status request.

A fifth monitoring approach includes the monitor module 360 determining that at least a threshold number of favorable replies from the DS units 356 regarding the pending DSN access request have been received. The threshold number of favorable number of replies may correspond to a read request type. For example, a decode threshold number of favorable replies is utilized when the request type is a read request and a favorable reply includes a favorable read response. As another example, a write threshold number of favorable replies is utilized when the request type is a write or a commit write transaction request and a favorable reply includes a favorable write response. A sixth monitoring approach includes the monitor module 360 determining a duration of the pending DSN access request. The determining includes calculating a time difference between issuing of the pending DSN access request and a current time.

With regards to the interpreting the processing status 372 to detect the processing anomaly 374, the interpret module 362 interprets the processing status 372 of the plurality of pending DSN access requests to detect a processing anomaly 374 of one of the plurality of pending DSN access requests. The processing anomaly 374 includes one of a variety of anomalies. A first anomaly includes the processing of the pending DSN access request is exceeding a first desired processing level. For example, more than a decode threshold number of favorable replies has been received with regards to a read request. As another example, more than a write threshold number of favorable replies has been received with regards to a write request. A second anomaly includes the processing of the pending DSN access request is below a second desired processing level. The second desired processing level may be very close to the first desired processing level. For example, less than the decode threshold number of favorable replies has been received with regards to the read request. As another example, less than the write threshold number of favorable replies has been received with regards to the write request.

The interpret module 362 interprets the processing status 372 by at least one of a variety of interpreting approaches. A first interpreting approach includes the interpret module 362 indicating the processing anomaly 374 when a desired number of favorable replies from the DS units 356 regarding the one of the plurality of pending DSN access requests has not been received. For example, the interpret module 362 indicates the processing anomaly 374 when greater than a pillar width minus the decode threshold number of unfavorable read responses has been received indicating that a desired number (e.g., a decode threshold number) of favorable replies will never be received. As another example, the interpret module 362 indicates the processing anomaly 374 when greater than the pillar width minus the write threshold number of unfavorable write responses has been received indicating that a desired number (e.g., a write threshold number) of favorable replies will never be received. A second interpreting approach includes the interpret module 362 indicating the processing anomaly 374 when a desired rate of receiving favorable replies from the DS units 356 regarding the one of the plurality of pending DSN access requests is not achieved. For example, the interpret module 362 indicates the processing anomaly 374 when a rate of receiving favorable replies is less than the desired rate. As another example, the interpret module 362 indicates the processing anomaly 374 when the rate of receiving favorable replies is greater than the desired rate.

A third interpreting approach includes the interpret module 362 indicating the processing anomaly 374 when the one of the plurality of pending DSN access requests has been pending for longer than a desired duration. For example, the interpret module 362 indicates the processing anomaly 374 when the one of the plurality of pending DSN access requests is taking too long. A fourth interpreting approach includes the interpret module 362 indicating the processing anomaly 374 when a threshold number of favorable replies from the DS units 356 regarding the one of the plurality of pending DSN access requests have been received. For example, the interpret module 362 indicates the processing anomaly 374 when a decode threshold number of favorable replies has been received for a read request. As another example, interpret module 362 indicates the processing anomaly 374 when a write threshold number of favorable replies has been received for a write request or write commit write transaction request.

With regards to the reprioritizing the further processing access requests, the reprioritize module 364 reprioritizes further processing of at least one of the one of the plurality of pending DSN access requests having the processing anomaly 374 and another one or more of the plurality of pending DSN access requests to produce the reprioritized further processing 376. The reprioritize module 364 reprioritizes further processing by at least one of a variety of reprioritizing approaches. A first reprioritizing approach includes the reprioritize module 364 increasing priority of the one of the plurality of pending DSN access requests having the processing anomaly 374, when the processing anomaly 374 is indicative of the processing of the one of the plurality of pending DSN access requests being below a second desired processing level. For example, increasing priority of a pending read request when the decode threshold number of favorable replies has not been received. As another example, increasing priority of a pending write request when the write threshold number of favorable replies has not been received. A second reprioritizing approach includes the reprioritize module 364 decreasing priority of the other one or more of the plurality of pending DSN access requests when the processing of the other one or more of the plurality of pending DSN access requests is above a first desired processing level. For example, decreasing priority to cancel a pending read request when the decode threshold number of favorable read replies has been received. As another example, decreasing priority of a pending write request when the write threshold number of favorable write replies has been received.

A third reprioritizing approach includes the reprioritize module 364 increasing priority of the one of the plurality of pending DSN access requests having the processing anomaly 374. For example, increasing priority of a pending read request when a request to speed up the operation is received. As another example, increasing priority of a pending write request when receiving a DS unit shutdown message. A fourth reprioritizing approach includes the reprioritize module 364 decreasing priority of the other one or more of the plurality of pending DSN access requests. For example, decreasing priority to cancel a pending write request when greater than the pillar width minus the write threshold number of unfavorable write or write commit replies has been received. As another example, decreasing priority to cancel a pending read request when greater than the pillar width minus the decode threshold number of unfavorable read replies has been received.

With regards to the outputting the notice of the reprioritized further processing 376, the output module 366 sends notice of the reprioritized further processing 376 to one or more of the DS units 356. The output module 366 sends notice of the reprioritized further processing 376 by identifying the one or more of the DS units 356 as units of the DS units 356 that have not provided a reply to the one of the plurality of pending DSN access requests or to the other one of the plurality of pending DSN access requests. The sending of the notice further includes generating a priority adjustment request 378 that includes one or more of the transaction number, an updated priority level of the reprioritizing further processing, and the slice name. The sending of the notice further includes outputting the priority adjustment request 378 to the identified one or more of the DS units 356.

FIG. 40B is a flowchart illustrating an example of changing a request priority level. The method begins at step 380 where a processing module (e.g., of a dispersed storage (DS) processing unit) monitors processing status of a plurality of pending dispersed storage network (DSN) access requests. A pending DSN access request of the plurality of pending DSN access requests includes a set of access requests regarding a set of encoded data slices. The set of access requests is sent to DS units of a DSN when less than a desired number of the DS units have favorably responded to the set of access requests. The monitoring the processing status includes one or more of a variety of monitoring approaches. A first monitoring approach includes determining a number of favorable replies received from the DS units regarding the pending DSN access request. A second monitoring approach includes determining a rate of receiving favorable replies from the DS units regarding the pending DSN access request. A third monitoring approach includes determining a priority of the pending DSN access request. A fourth monitoring approach includes determining a request type of the pending DSN access request. A fifth monitoring approach includes determining that at least a threshold number of favorable replies from the DS units regarding the pending DSN access request have been received. A sixth monitoring approach includes determining a duration of the pending DSN access request.

The method continues at step 382 where the processing module interprets the processing status of the plurality of pending DSN access requests to detect a processing anomaly of one of the plurality of pending DSN access requests. The interpreting the processing status includes at least one of a variety of interpreting approaches. A first interpreting approach includes indicating the processing anomaly when a desired number of favorable replies from the DS units regarding the one of the plurality of pending DSN access requests has not been received. A second interpreting approach includes indicating the processing anomaly when a desired rate of receiving favorable replies from the DS units regarding the one of the plurality of pending DSN access requests is not achieved. A third interpreting approach includes indicating the processing anomaly when the one of the plurality of pending DSN access requests has been pending for longer than a desired duration. A fourth interpreting approach includes indicating the processing anomaly when a threshold number of favorable replies from the DS units regarding the one of the plurality of pending DSN access requests have been received.

The method continues at step 384 where the processing module reprioritizes further processing of at least one of the one of the plurality of pending DSN access requests having the processing anomaly and another one or more of the plurality of pending DSN access requests. The reprioritizing further processing includes at least one of a variety of reprioritizing approaches. A first reprioritizing approach includes increasing priority of the one of the plurality of pending DSN access requests having the processing anomaly, when the processing anomaly is indicative of the processing of the one of the plurality of pending DSN access requests being below a second desired processing level. A second reprioritizing approach includes decreasing priority of the other one or more of the plurality of pending DSN access requests when the processing of the other one or more of the plurality of pending DSN access requests is above a first desired processing level. A third reprioritizing approach includes increasing priority of the one of the plurality of pending DSN access requests having the processing anomaly. A fourth reprioritizing approach includes decreasing priority of the other one or more of the plurality of pending DSN access requests.

The method continues at step 386 where the processing module sends notice of the reprioritized further processing to one or more of the DS units. The sending notice of the reprioritized further processing includes identifying the one or more of the DS units as units of the DS units that have not provided a reply to the one of the plurality of pending DSN access requests or to the other one of the plurality of pending DSN access requests. The sending notice further includes outputting the notice of the reprioritize further processing to the identified one or more of the DS units.

FIG. 41A is a schematic block diagram of another embodiment of a dispersed storage network (DSN) that includes a computing device 390 and a dispersed storage network (DSN) memory 392. The DSN memory 392 includes one or more storage unit sets 394. Each storage unit set 394 includes a set of storage units 396. Alternatively, the DSN memory 392 may be implemented utilizing one or more of a distributed storage and task network (DSTN), a DSTN module, a plurality of storage nodes, a plurality of DS units, a plurality of DST execution units, and a plurality of storage units 396. Each storage unit 396 may be implemented utilizing at least one of a storage server, a storage module, a memory device, a memory, a plurality of memory devices, a distributed storage and task (DST) execution unit, a DS unit, a user device, a DST processing unit, and a DST processing module. The computing device 390 may be implemented utilizing at least one of a server, a storage unit 396, a rebuilding unit, a plurality of computers, a storage integrity processing unit, a DSTN managing unit, a DSN managing unit, a DS unit, a storage server, a storage module, a DS processing unit, a DST execution unit, a user device, a DST processing unit, and a DST processing module. For example, computing device 390 is implemented as the rebuilding unit. The computing device 390 includes a dispersed storage (DS) module 402. The DS module 402 includes an identify error module 404, a lock module 406, and a resolution module 408.

The system functions to identify an encoded data slice having an error, send a lock command 410 to a storage unit 396 associated with the encoded data slice having the error, and determine resolution for the error of the encoded data slice. With regards to identifying the encoded data slice having the error, the identify error module 404 identifies the encoded data slice having the error. The encoded data slice has a slice name 412 and a revision number 414, both of which may be included in identification of the error. The storage unit 396 of the DSN stores the encoded data slice. The identify error module 404 identifies the encoded data slice having the error by at least one of a variety of identifying approaches. A first identifying approach includes the identify error module 404 identifying the encoded data slice via a rebuilding detection process. The rebuilding detection process includes issuing a set of list requests to two or more storage units 396 of the storage unit set 394 over a slice name range that includes the slice name 412 and issuing a set of list digest requests over a slice name range that includes the slice name 412. The rebuilding detection process further includes comparing one or more storage error responses 416, received as list and/or list digest responses, to identify the encoded data slice. A second identifying approach includes the identify error module 404 receiving a message indicating the error. For example, receiving an unfavorable write response and/or an unfavorable commit write response as the storage error response 416. A third identifying approach includes the identify error module 404 receiving a response to a query regarding the encoded data slice as the storage error response 416. The response to the query may include one or more of the slice name 412 and the revision number 414.

With regards to sending the lock command 410 to the storage unit 396 associated with the encoded data slice having the error, the lock module 406 sends the lock command 410 to the storage unit 396. The lock command 410 instructs the storage unit 396 to ignore access requests (e.g., read, write, delete, etc.) regarding the encoded data slice from other entities (e.g., a user device, a DS processing unit, etc.) of the DSN and to ignore write-related requests and delete-related requests regarding other encoded data slices from the other entities of the DSN. The write-related requests includes at least one of a write request, a commit request, a finalize request, a delete request, an overwrite request, and a modify request. The other encoded data slices have the slice name but different revision numbers than the encoded data slice. The sending of the lock command 410 includes generating the lock command 410 to include the slice name 412, identifying the storage unit 396 (e.g., a lookup, a query response), and outputting the lock command 410 to the storage unit 396.

With regards to determining resolution for the error of the encoded data slice, the resolution module 408, in response to a lock acknowledgement 418 (e.g., a favorable acknowledgment indicating that the lock command 410 has been executed) from the storage unit 396, determines resolution for the error of the encoded data slice. The resolution includes one or more of rebuilding the encoded data slice to produce a rebuilt slice 420, issuing a set of delete requests 422 to storage units 396 (e.g., the storage unit set 394) of the DSN regarding a set of encoded data slices, issuing a set of undo write requests 424 to the storage units 396 (e.g., the storage unit set 394) of the DSN regarding the set of encoded data slices, and issuing a set of roll-back write requests 426 to the storage units (e.g., the storage unit set 394) of the DSN regarding the set of encoded data slices. The set of encoded data slices includes the encoded data slice. The storage units 396 (e.g., the storage unit set 394) of the DSN includes the storage unit 396. The resolution module 408, may, when the resolution for of the error of the encoded data slice has been executed, send an unlock command 432 to the storage unit 396. The resolution module 408 may determine the resolution by requesting re-issuance of a write command 428 regarding the encoded data slice. For example, issuing a retry of a write request as the write command 428 when the encoded data slice is available from a local memory. Alternatively, or in addition to, the resolution module 408 may send a resolution request 430 regarding the resolution to at least one of the other entities of the DSN for execution of the resolution.

The resolution module 408 further functions to determine to rebuild the encoded data slice by a series of rebuilding determining steps. A first rebuilding determining step includes the resolution module 408 determining whether at least a threshold number of encoded data slices of the set of encoded data slices is stored in the DSN, where a data segment is dispersed storage error encoded to produce the set of encoded data slices, and where the set of encoded data slices includes the encoded data slice. The determining includes one or more of receiving an error message, initiating a query, receiving responses from storage units 396 of the DSN, and comparing the responses. The query includes issuing a set of list requests that includes the set of slice names associated with the encoded data slice. The resolution module 408 determines not to rebuild the encoded data slice when the at least a threshold number of encoded data slices of the set of encoded data slices is not stored in the DSN. A second rebuilding determining step includes the resolution module 408, when the at least a threshold number of encoded data slices is stored in the DSN, rebuilding the encoded data slice using at least one of a partial rebuilding process and a rebuilding process. The rebuilding includes at least one of direct rebuilding and indirect rebuilding. The direct rebuilding includes retrieving a decode threshold number of encoded data slices 434 of the revision number from the storage units 396 of the DSN, decoding the decode threshold number of encoded data slices 434 to reproduce a data segment, re-encoding the data segment to reproduce the encoded data slice as the rebuilt slice 420. The indirect rebuilding includes issuing a rebuilding request to a rebuilding entity, where the rebuilding request includes the slice name 412 and the revision number 414.

The resolution module 408 further functions to determine to issue the set of delete requests 422 by a series of deleting determining steps. A first deleting determining step includes the resolution module 408, when a determination is made not to rebuild the encoded data slice, determining status of a write process. The status of the write process includes an initial write phase, a commit phase, and complete. The initial write phase corresponds to write requests sent and awaiting receipt of a write threshold number of write responses. The commit phase corresponds to commit requests sent and awaiting receipt of a write threshold number of commit responses. Complete corresponds to finalize requests sent and write process complete. The determining the status of the write process includes at least one of performing a lookup, accessing a write processing state table, initiating a query, receiving a response, and receiving an error message. A second deleting determining step includes the resolution module 408, when the status of the write process is complete, issuing the set of delete requests 422 to storage units 396 (e.g., the storage unit set 394) of the DSN to delete the set of encoded data slices, which includes the encoded data slice. The set of delete requests 422 includes a set of slice names of the set of encoded data slices and the revision number.

The resolution module 408 further functions to determine to issue the set of undo write requests 424 by a series of undoing determining steps. A first undoing determining step includes the resolution module 408, when the determination is made not to rebuild the encoded data slice, determining the status of the write process. A second undoing determining step includes the resolution module 408, when the status of the write process is at the commit phase, issuing the set of undo requests 424 to storage units 396 (e.g., the storage unit set 394) of the DSN to undo storing the set of encoded data slices, which includes the encoded data slice. The set of undo requests 424 includes a transaction number associated with the storing the set of encoded data slices.

The resolution module 408 further functions to determine to issue the set of roll-back write requests 426 by a series of rolling back determining steps. A first rolling back determining step includes the resolution module 408, when the determination is made not to rebuild the encoded data slice, determining the status of the write process. A second rolling back determining step includes the resolution module 408, when the status of the write process is at the initial write phase, issuing the set of roll-back requests 426 to storage units 396 (e.g., the storage unit set 394) of the DSN to retract the initial write phase regarding storing the set of encoded data slices, which includes the encoded data slice. The set of roll-back requests 426 includes the transaction number associated with the storing the set of encoded data slices (e.g., the initial write phase regarding the storing the set of encoded data slices).

FIG. 41B is a flowchart illustrating an example of a adjusting slice access. The method begins at step 440 where a processing module (e.g., of a rebuilding module, of a dispersed storage (DS) processing unit) within a dispersed storage network (DSN) identifies an encoded data slice having an error, where the encoded data slice has a slice name and a revision number. A storage unit of the DSN stores the encoded data slice. The identifying the encoded data slice having the error includes at least one of a variety of identifying approaches. A first identifying approach includes identifying the encoded data slice via a rebuilding detection process (e.g., use of a slice listing procedure and/or a slice digest listing procedure across a set of storage units that includes the storage unit). A second identifying approach includes receiving a message indicating the error. A third identifying approach includes receiving a response to a query regarding the encoded data slice.

The method continues at step 442 where the processing module sends a lock command to the storage unit, where the lock command instructs the storage unit to ignore access requests regarding the encoded data slice from other entities of the DSN and to ignore write-related requests and delete-related requests regarding other encoded data slices from the other entities of the DSN. The other encoded data slices have the slice name but different revision numbers than the encoded data slice. The sending of the lock command includes generating the lock command to include the slice name, identifying the storage unit, and outputting the lock command to the storage unit.

The method continues at step 444 where, in response to a lock acknowledgement from the storage unit, the processing module determines resolution for the error of the encoded data slice. The resolution may include one or more of a requesting re-issuance of a write command regarding the encoded data slice, sending a resolution request to another entity of the DSN, and rebuilding the encoded data slice when determining that the encoded data slice can be rebuilt. When the encoded data slice can't be rebuilt, the resolution may include at least one of issuing a set of delete requests to storage units of the DSN regarding a set of encoded data slices, issuing a set of undo write requests to the storage units of the DSN regarding the set of encoded data slices, and issuing a set of roll-back write requests to the storage units of the DSN regarding the set of encoded data slices. The set of encoded data slices includes the encoded data slice and the storage units (e.g., a set of storage units associated with the set of encoded data slices) of the DSN includes the storage unit.

The method branches to step 454 when the processing module determines not to rebuild the encoded data slice. The processing module may determine not to rebuild the encoded data slice based on one or more of receiving a message, a predetermination, identifying a status of a write process error, and identifying a performance issue. For example, the processing module determines not to rebuild the encoded data slice when detecting that a write process failed when a write threshold number of write acknowledgment responses were not received within a desired timeframe. The method branches to step 450 when the processing module determines to rebuild the encoded data slice (e.g., to attempt to rebuild the encoded data slice). The determining to rebuild the encoded data slice may be based on one or more of a predetermination, identifying an error message pattern, and a data storage priority indicator.

The method branches to step 448 when the processing module determines to send a resolution request to the other entity of the DSN. The processing module may determine to send a resolution request based on one or more of a loading indicator, an unfavorable access rights pattern, a request, a predetermination, and a rebuilding resource availability indicator. For example, the processing module determines to send a resolution request to the other entity when the loading indicator indicates that a loading level is greater than a high loading threshold level. The method continues to step 446 when the processing module determines to re-issue the write command. The determining to re-issue the write command may be based on one or more of availability of encoded data slice and a local memory, a performance requirement, a rebuilding resource availability indicator, and the status of the write process. For example, the processing module determines to re-issue the write command when the encoded data slice is available in the local memory.

When the encoded data slice is available in the local memory, the method continues at step 446 where the processing module determines the resolution further to include requesting re-issuance of the write command regarding the encoded data slice. For example, the processing module issues a retry of a write request associated with the encoded data slice. When rewriting is complete, the processing module may branch to step 462. When the resolution includes sending the resolution request to the other entity of the DSN, the method continues at step 448 where the processing module sends the resolution request regarding the resolution to at least one of the entities of the DSN for execution of the resolution.

When the resolution includes determining to rebuild the encoded data slice, the method continues at step 450 where the processing module determines whether at least a threshold number of encoded data slices of the set of encoded data slices is stored in the DSN (e.g., A decode threshold number). A data segment is dispersed storage error encoded to produce the set of encoded data slices. The set of encoded data slices includes the encoded data slice. The processing module indicates that the encoded data slice can't be rebuilt when the at least a threshold number of encoded data slices of the set of encoded data slices is not stored in the DSN. The method branches to step 454 when less than the at least a threshold number of encoded data slices of the set of encoded data slices is stored in the DSN. The method continues to step 452 when the at least a threshold number of encoded data slices of the set of encoded data slices is stored in the DSN.

When the at least a threshold number of encoded data slices is stored in the DSN, the method continues at step 452 where the processing module rebuilds the encoded data slice using at least one of a partial rebuilding process and a rebuilding process. When utilizing the partial rebuilding process, the processing module obtains at least a decode threshold number of partial rebuilt slices from the DSN and decodes (e.g., performs an exclusive OR function) the at least a decode threshold number of partial rebuilt slices to reproduce the encoded data slice. A storage unit of the DSN produces an associated partial rebuilt slice by obtaining an encoding matrix utilized to generate the encoded data slice to be rebuilt, reducing the encoding matrix to produce a square matrix that exclusively includes rows associated with the decode threshold number of storage units, inverting the square matrix to produce an inverted matrix, matrix multiplying the inverted matrix by an encoded data slice (e.g., of the set of encoded data slices) associated with the storage unit to produce a vector, and matrix multiplying the vector by a row of the encoding matrix corresponding to the encoded data slice to be rebuilt to produce the partial rebuilt slice.

When utilizing the rebuilding process, the processing module obtains at least a decode threshold number of encoded data slices from the DSN and decodes the at least a decode threshold number of encoded data slices using a dispersed storage error coding function to reproduce a data segment. Next, the processing module re-encodes the data segment using the dispersed storage error coding function to reproduce the encoded data slice. The method branches to step 462.

When less than the at least a threshold number of encoded data slices of the set of encoded data slices is stored in the DSN or when the determined resolution includes not to rebuild the encoded data slice, the method continues at step 454 where the processing module determines the status of the write process. The status of the write process includes an initial write phase, a commit phase, and complete. The initial write phase corresponds to write requests sent and awaiting receipt of a write threshold number of write responses. The commit phase corresponds to commit requests sent and awaiting receipt of a write threshold number of commit responses. Complete corresponds to finalize requests sent and write process complete. The determining of the status of the write process includes at least one of initiating a query, receiving a response, performing a table lookup, receiving an error message, and receiving a process status message. The method branches to step 460 when the status of the write process is at the initial write phase. The method branches to step 458 when the status of the write process is at the commit phase. The method continues to step 456 when the status of the write phase is complete.

When the status of the write process is complete, the method continues at step 456 where the processing module issues the set of delete requests to the storage units (e.g., the set of storage units) of the DSN to delete the set of encoded data slices, which includes the encoded data slice. The set of delete requests includes a set of slice names of the set of encoded data slices and the revision number. The method branches to step 462. When the status of the write process is at the commit phase, the method continues at step 458 where the processing module issues the set of undo requests to the storage units of the DSN to undo storing the set of encoded data slices, which includes the encoded data slice. The set of undo requests includes a transaction number associated with the storing the set of encoded data slices. The method branches to step 462. When the status of the write process is at the initial write phase, the method continues at step 460 where the processing module issues the set of roll-back requests to the storage units of the DSN to retract the initial write phase regarding storing the set of encoded data slices, which includes the encoded data slice. The set of roll-back requests includes a transaction number associated with the initial write phase regarding storing the set of encoded data slices. When the resolution for the error of the encoded data slice has been executed, the method continues at step 462 where the processing module sends an unlock command to the storage unit. The sending includes generating and outputting the unlock command. The unlock command includes one or more of the slice name of the encoded data slice and identity of the DS unit associated with the encoded data slice. The unlock command instructs the DS unit to once again accept all access requests associated with the slice name.

FIG. 42 is a flowchart illustrating an example of synchronizing distributed storage and task (DSTN) network data. The synchronizing may include generating a DSTN data concurrency response message to support a checked read response operation. The method begins with step 464 where a processing module (e.g., of a distributed storage and task (DST) execution unit) receives one of at least a threshold number of DSTN concurrency requests that includes a header section and a payload section, where the payload section includes a transaction number, a last known slice revision number, and a slice name section. The method continues at step 466 where, in response to the one of at least the threshold number of DSTN concurrency requests, the processing module determines a most recent slice revision number based on a slice name contained in the slice name section. For example, the processing module accesses an associated memory based on the slice name contained in the slice name section to retrieve a list of slice revision numbers corresponding to the slice name. Next, processing module identifies a greatest slice revision number as the most recent slice revision number.

The method continues at step 468 where the processing module determines whether the last known revision number is less than the most recent revision number. The method branches to step 472 when the last known revision number is not less than the most recent revision number. The method continues to step 470 when the last known revision number is less than the most recent revision number. When the last known revision number is less than the most recent revision number (e.g., the most recent revision number is greater than the last known revision number), the method continues at step 470 where the processing module generates a DSTN concurrency response to return at least one slice of a greater revision number than the last known revision number of the request. The generating includes generating a header section and a payload section, where the payload section includes a revision mismatch status indication (e.g., indicating that the last known revision number is not current), the slice revision count regarding the slice name (e.g., the number of available encoded data slices associated with the slice name), one or more slice revision numbers corresponding to the slice name, one or more slice lengths corresponding to the slice name, and one or more encoded data slices corresponding to the slice name. The generating may further include generating the payload section to include one or more of an encoded data slice corresponding to the most recent revision number, all input data slices associated with revision numbers that are greater than the last known revision number, and all encoded data slices corresponding to the slice name. The generating may further include determining which encoded data slices to include in the payload section based on at least one of a predetermination, a response type indicator of the DSTN concurrency request, a difference between the most recent revision number and the last known revision number, and a system activity level indicator. The method branches to step 474.

When the last known revision number is not less than the most recent revision number (e.g., the most recent revision number is less than or equal to the last known revision number), the method continues at step 472 where the processing module generates the DSTN concurrency response to indicate that an unfavorable revision mismatch does not exist. The generating includes generating a header section and a payload section, where the payload section includes a favorable revision status indication (e.g., indicating that the last known revision number is current) and one or more of the slice revision count regarding the slice name (e.g., the number of available encoded data slices associated with the slice name) and one or more slice revision numbers corresponding to the slice name. As such, the processing module does return encoded data slices when the most recent revision number is less than or equal to the last known revision number. Each header section includes a payload length field and at least one of an operation code field, a protocol class field, and a protocol class version field, wherein, the payload length field includes a length of the payload section, the operation code field includes a concurrency response operation code, the protocol class field includes a protocol class for the concurrency response operation code, and the protocol class version field includes a version of the concurrency response operation code.

The method continues at step 474 where the processing module determines whether an error condition exists based on one or more of the slice name being associated with a locked encoded data slice state, a transaction number error, the slice name is associated with one or more encoded data slices that are unavailable, and one of at least the threshold number of DSTN concurrency requests is not authorized. The method branches to step 478 when the error condition does not exist. The method continues to step 476 when the error condition exists. When the error condition exists, the method continues at step 476 where the processing module discards the DSTN concurrency response. The method continues at step 478 where the processing module outputs the DSTN concurrency response (e.g., to a requesting entity) when the error condition does not exist.

FIG. 43 is a flowchart illustrating an example of assigning an address range. The method begins at step 480 where a processing module (e.g., of a distributed storage and task (DST) client module) detects commissioning of a new DST execution unit. The detecting may be based on one or more of receiving an activation message, receiving an error message, and receiving a response to a query. The method continues at step 482 where the processing module determines a performance level for the new DST execution unit. The determining may be based on one or more of a test, a query, retrieving the performance level, and a lookup based on at least one of a DST execution unit model and configuration information of the DST execution unit.

The method continues at step 484 where the processing module determines a performance level for a current DST execution unit. The determining may be based on one or more of a test, a query, retrieving the performance level, and a lookup based on at least one of a DST execution unit model and configuration information of the current DST execution unit. The method continues at step 486 where the processing module determines a required performance level for slices stored in the current DST execution unit. The determining may be based on one or more of a query, retrieving the required performance level, receiving the required performance level, and accessing a service level agreement.

The method continues at step 488 where the processing module determines whether to move the slices from the current DST execution unit to the new DST execution unit based on the performance level for the new DST execution unit, the performance level for the current DST execution unit, and the required performance level for the slices. The processing module indicates to move the slices when the performance level of the current DST execution unit does not compare favorably with the required performance level for the slices and the performance level of the new DST execution unit compares favorably to the required performance level for the slices. The method loops back to step 484 when the processing module determines not to move the slices. The method continues to step 490 when the processing module determines to move the slices.

The method continues at step 490 where the processing module facilitates reassigning a distributed storage and task network (DSTN) address range from the current DST execution unit to the new DST execution unit, where the DSTN address range corresponds to the slices. The facilitating includes one or more of updating a DSTN address to physical location table, updating a DSTN registry, generating and sending an address update message to the current DST execution unit (e.g., to remove the DSTN address range), and generating and sending an address range assignment to the new DST execution unit (e.g., to add the DSTN address range).

The method continues at step 492 where the processing module facilitates transferring the slices from the current DST execution unit to the new DST execution unit. The facilitating includes sending a transfer request that includes the DSTN address range and an identifier of the new DST execution unit to the current DST execution unit. The facilitating further includes retrieving the slices utilizing the DSTN address range from the current DST execution unit (e.g., generating and sending read slice requests) and storing the slices utilizing the DSTN address range in the new DST execution unit (e.g., generating and sending write slice requests). The method loops back to step 480. Alternatively, the processing module identifies another current DST execution unit as the new DST execution unit, where the other DST execution unit is associated with a storage capacity level greater than a capacity threshold.

FIG. 44A is a diagram illustrating an example of matrix multiplication to encode a secret. A algebraic expression 500 of a form $f(n)=r_1x^2+r_0x^1+sx^0$ is utilized to convey a secret when storing or communicating at least a decode threshold number of variants of the algebraic expression 500 (e.g., with different values for the variable x). The decode threshold number is the number of terms of the algebraic expression (e.g., 3). A width number of shares 498 may be stored or communicated to include the at least the decode threshold number of variants of the algebraic expression 500 to improve a reliability level of decoding the decode threshold number of variants of the algebraic expression 500 to reproduce the secret. Coefficients of the terms of the algebraic expression 500 include the secret (e.g., s) and a decode threshold minus one number of random coefficients (e.g., $r_1$ and $r_0$).

The width number of shares 498 may be generated by matrix multiplying an encoding matrix 494 by a vector matrix 496. The vector matrix 496 includes generating a one column matrix that includes the decode threshold number of coefficients (e.g. s, $r_1$, $r_0$). For example, the secret s is assigned to a first row, coefficient $r_o$ is assigned to a second row, and coefficient $r_1$ is assigned to a third row of the vector matrix 496. The encoding matrix 494 may be generated by generating a shortened identity matrix, generating a Vandermonde matrix, and combining the shortened identity matrix and the Vandermonde matrix to produce the encoding matrix 494. The shortened identity matrix may be generated by generating an identity matrix with a decode threshold number of rows and columns and deleting a row corresponding to a position of the secret in the vector matrix 496. For example, a 3×3 identity matrix is generated and a first row is deleted corresponding to the position of the secret in the vector matrix 496.

The Vandermonde matrix may be generated to include a width minus a decode threshold number plus one number of rows and a decode threshold number of columns. Each row of the Vandermonde matrix includes a value for a variable of the algebraic expression 500, where each row includes a different value. The values are subsequently known to a decoding process. For example, a first row includes a value of a, a second row includes a value of b, and the third row includes a value of c. Each column of the Vandermonde matrix includes the value of the variable to a power represented in the algebraic expression 500. For example, a first column includes a value of the variable to the zero power, the second column includes a value of the variable to the first power, and the third column includes a value of the variable to the second power. In an example of matrix multiplying the encoding matrix by the vector matrix, share 1=0s+1r0+0r1=r0, share 2=0s+0r0+1r1=r1, share $3=sa^0+r_0a^1+r_1a^2$, share $4=sb^0+r_0b^1+r_1b^2$, and share $5=sc^0+r_0c^1+r_1c^2$.

Subsequent decoding of the secret includes retrieving the shares associated with the random coefficients and at least one other share, directly extracting the values of the random coefficients from the shares associated with the random coefficients, and solving an algebraic expression 500 of the other share for the secret utilizing the values of the random coefficients. For example, decoding of the secret includes retrieving shares 1 and 2, extracting the random coefficients directly from shares 1 and 2, retrieving at least one share of shares 3-5, and solving and algebraic expression of the at least one share to reproduce the secret. As such, solving simultaneous linear equations is not required when a decode threshold number minus one number of random coefficients are directly available via the shares associated with the random coefficients and a decoding loading efficiency improvement is provided.

FIG. 44B is a flowchart illustrating an example of encoding a secret. The method begins at step 502 where a processing module (e.g., of a distributed storage and task (DST) client module) receives a secret for storage in a distributed storage and task network (DSTN) module. The method continues at step 504 where the processing module obtains an algebraic expression that includes a decode threshold number of terms. The obtaining includes at least one of retrieving and generating based on the decode threshold number. The processing module may obtain the decode threshold number based on at least one of generating based on a security requirement, retrieving the decode threshold number, and a predetermination. For example, processing module obtains the algebraic expression to include $f(n)=ex^2+fx^1+gx^0$.

The method continues at step 506 where the processing module assigns the secret to a first term of the decode threshold number of terms (e.g., $sx^0=gx^0$. The method continues at step 508 where the processing module generates a random coefficient value for each of the other terms of the decode threshold number of terms (e.g., $r_1x^2+r_0x^1$). The method continues at step 510 where the processing module generates an encoding matrix that includes a partial identity matrix and a Vandermonde matrix such that the encoding matrix includes a decode threshold number of columns and a width number of rows. The method continues at step 512 where the processing module generates a vector matrix that includes the secret and each random coefficient. The method continues at step 514 where the processing module matrix multiplies the encoding matrix by the vector matrix to produce a shares matrix. The method continues at step 516 where the processing module facilitates storing a width number of shares of the shares matrix in the DSTN module. The facilitating includes, for each share, generating a write slice request that includes the share and sending the write slice request to the DSTN module for storage therein.

FIG. 45 is a flowchart illustrating another example of assigning an address range. The method begins at step 518 where a processing module (e.g., of a distributed storage and task (DST) client module) detects a newly commissioned DST execution unit of a plurality of DST execution units of a distributed storage and task network (DSTN) module. The detecting includes at least one of receiving a commissioning message, a query, receiving an authentication request, and detecting a reset of a new DST execution unit. The method continues at step 520 where the processing module identifies at least some of the plurality of DST execution units. The identifying includes at least one of a lookup, a query, receiving a list, and accessing registry information.

The method continues at step 522 where the processing module identifies a DSTN module topology of the at least some of the plurality of DST execution units. The identifying includes at least one of a lookup, a query, a ping test, obtaining an internet protocol address, identifying common router identifiers, measuring a level of bandwidth, estimating a distance to each of the at least some of the plurality of DST execution units, and estimating an access latency to the at least some of the plurality of DST execution units. The DSTN module topology indicates one or more of a physical and a virtual layout of the at least some of the plurality of DST execution units with respect to each other and to the newly commissioned DST execution unit.

The method continues at step 524 where the processing module selects a subset of the at least some of the plurality of DST execution units based on the DSTN module topology such that a favorable condition exists with regards to the newly commissioned DST execution unit and the subset. The favorable condition includes at least one of a close physical proximity, a close virtual proximity, bandwidth availability greater than the bandwidth threshold, and a performance level greater than the performance threshold. For example, the processing module selects the subset to include DST execution units associated with a lowest access latency between each DST execution unit of the subset and the newly commissioned DST execution unit.

The method continues at step 526 where the processing module obtains DSTN address range assignments of the subset of the at least some of the plurality of DST execution units. The obtaining includes at least one of a lookup, receiving the assignments, and querying at least one of the subset of DST execution units. The method continues at step 528 where the processing module facilitates assignment of a DSTN address range for the newly commissioned DST execution unit based on the DSTN address range assignments of the subset of the at least some of the plurality of DST execution units. The facilitating includes one or more of selecting an available address range with regards to the subset of DST execution units, issuing a range assignment request that includes the selected address range, receiving a favorable address range assignment response, storing the selected address range, and sending the selected address range to a subset of DST execution units.

FIG. 46A is a diagram illustrating an example of a site mapping that includes a plurality of sites of a distributed storage and task network (DSTN) module, where each site includes a plurality of distributed storage and task (DST) execution units. The plurality of sites are associated with an overall DSTN address range. The overall DSTN address range includes a DSTN address range of each of the sites. The DSTN address range of each of the sites includes a DSTN address range of each of the DST execution units. Each DST execution unit is associated with a DSTN address range such that adjacent DST execution units include DSTN address ranges that are adjacent and contiguous. For example, DST execution unit 2 has a DSTN address range of 200-300 and DST execution units 3 has a DSTN address range of 301-400.

From time to time, a number of sites may change (e.g., adding a site, deleting a site). Typically the overall DSTN address range does not change when the number of sites changes. When the number of sites changes, the DSTN address range of each of the sites may change and the DSTN address range of each of the DST execution units may change. The DST execution units facilitate storage of slices associated with the DSTN address range of the DST execution unit. A system performance level improvement may be provided when changing the number of sites when DST execution units are moved from one site to another without changing the DSTN address range associations. A method to facilitate moving DST execution units to support adding a site is discussed in greater detail with reference to FIGS. 46B to 46E.

FIG. 46B is a diagram illustrating another example of a site mapping that includes a plurality of sites of a distributed storage and task network (DSTN) module, where an additional site has been added with reference to the three sites depicted in FIG. 46A. Distributed storage and task (DST) execution units of FIG. 46A may be redeployed to facilitate the addition of a fourth site. Typically a similar number of DST execution units are deployed at each site. A target number of DST execution units per site may be determined by dividing a number of DST execution units of a starting point configuration by a number of sites of the target configuration. For example, 12/4=three DST execution units per site for the target configuration (e.g., depicted in FIG. 46D).

The additional site is inserted between two of the existing sites to facilitate contiguous DSTN addressing. For example, site 4 is inserted between sites 2 and 3. As a first step of a migration of DST execution units, one or more DST execution units are moved from at least one adjacent site of an adjacent site pair to the additional site in accordance with the target configuration. For example, DST execution units 7 and 8 are moved from site 2 to site 4. The one or more DST execution units are selected for moving such that DSTN address ranges associated with the one or more DST execution units are to be included in the additional site and are adjacent to a DSTN address range associated with a remaining DST execution unit of the at least one adjacent site. When the one or more DST execution units are moved, DSTN address range assignments associated with the one or more DST execution units remain with the DST execution units and are now associated with the additional site and disassociated with the at least one adjacent site. For example, DSTN address ranges associated with DST execution units 7 and 8 remain associated with DST execution units 7 and 8 and now are associated with site 4.

FIG. 46C is a diagram illustrating another example of a site mapping that includes a plurality of sites of a distributed storage and task network (DSTN) module, where an additional site has been added with reference to the three sites depicted in FIG. 46A and a migration started with reference to FIG. 46B. Distributed storage and task (DST) execution units of FIG. 46B may be further redeployed to facilitate the addition of a fourth site, wherein a similar number of DST execution units are deployed at the fourth site and at each other site when the target configuration has been achieved (e.g., depicted in FIG. 46D).

The additional site has been inserted between two of the existing sites to facilitate contiguous DSTN addressing (e.g., site 4 has been inserted between sites 2 and 3). As a second step of a migration of DST execution units, one or more DST execution units are moved from another adjacent site of an adjacent site pair to the additional site in accordance with the target configuration, wherein one or more other DST execution units were moved from a first adjacent site of the adjacent site pair to the additional site in a previous step (e.g., depicted in FIG. 46B). For example, DST execution unit 9 is moved from site 3 to site 4. The one or more DST execution units are selected for moving such that DSTN address ranges associated with the one or more DST execution units are to be included in the additional site and are adjacent to a DSTN address range associated with a remaining DST execution unit of the other adjacent site. When the one or more DST execution units are moved, DSTN address range assignments associated with the one or more DST execution units remain with the DST execution units and are now associated with the additional site and disassociated with the other adjacent site. For example, DSTN address ranges associated with DST execution unit 9 remains associated with DST execution unit 9 and is now associated with site 4 (e.g., and not with site 3).

FIG. 46D is a diagram illustrating another example of a site mapping that includes a plurality of sites of a distributed storage and task network (DSTN) module, where an additional site has been added with reference to the three sites depicted in FIG. 46A and a migration executed with reference to FIGS. 46B-C. Distributed storage and task (DST) execution units of FIG. 46C may be further redeployed to facilitate the addition of a fourth site, where a similar number of DST execution units are deployed at the fourth site and at each other site when the target configuration has been achieved (e.g., as depicted in FIG. 46D).

The additional site has been inserted between two of the existing sites to facilitate contiguous DSTN addressing (e.g., site 4 has been inserted between sites 2 and 3). As a third step of a migration of DST execution units, one or more DST execution units are moved from one or more sites adjacent to a DST execution unit adjacent site pair to one or more DST execution units of the adjacent site pair in accordance with the target configuration, where one or more other DST execution units were moved from at least one DST execution unit of the DST execution unit adjacent site pair to the additional site in a previous step (e.g., depicted in FIGS. 46B-C).

For example, DST execution unit 4 is moved from site 1 to site 2. The one or more DST execution units are selected for moving such that DSTN address ranges associated with the one or more DST execution units are to be included in the at least one of the DST execution units of the DST execution unit adjacent site pair. When the one or more DST execution units are moved, DSTN address range assignments associated with the one or more DST execution units remain with the DST execution units and are now associated with the adjacent site and disassociated with the site adjacent to the adjacent site. For example, DSTN address ranges associated with DST execution unit 4 remains associated with DST execution unit 4 and is now associated with site 2 (e.g., and not with site 1).

FIG. 46E is a flowchart illustrating an example of migrating distributed storage and task (DST) execution units. The method begins at step 530 where a processing module (e.g., of a distributed storage and task (DST) client module) determines to reposition DST execution units of a distributed storage and task network (DSTN) module storage pool located at a current number of sites to an updated number of sites. The determining may be based on one or more of receiving a request, receiving a message, detecting a current site failure, detecting a newly commissioned site, receiving an updated DSTN topology, and determining the updated number of sites based on at least one of a request, an updated reliability requirement, a measured reliability level, an updated performance requirement, and a measured performance level.

The method continues at step 532 where the processing module determines whether the updated number of sites is greater than the current number of sites. The method branches to step 542 when the updated number of sites is not greater than the current number of sites. The method continues to step 534 when the processing module determines that the updated number of sites is greater than the current number of sites. The method continues at step 534 where the processing module identifies a first site and a second site of an adjacent site pair for a new site insertion when the updated number of sites is greater than the current number of sites. The identifying may be based on at least one of selecting the adjacent site pair at an end of a plurality of sites, selecting the adjacent site pair when the adjacent site pair indicates a favorably low level of system activity, receiving a selection, the predetermination, and a lookup.

The method continues at step 536 where the processing module facilitates repositioning one or more DST execution units from the first site to a new site. The facilitating includes one or more of determining a target number of DST execution units per site including the new site, establishing a new site address range, selecting the one or more DST execution units to move that have an adjacent address range to the new site address range, indicating which DST execution units to move, and updating site address range tables when confirmation of moving the DST execution units has been received. The method continues at step 538 where the processing module facilitates repositioning one or more DST execution units from the second site to the new site. The facilitating includes one or more of selecting the one or more DST execution units to move that have an adjacent address range to the new site address range, indicating which DST execution units to move, and updating site address range tables when confirmation of moving the DST execution units has been received. The method continues at step 540 where the processing module facilitates repositioning one or more DST execution units from one or more other sites that are further adjacent to the adjacent site pair. The facilitating includes one or more of selecting the one or more DST execution units to move that have an adjacent address range to an address range of at least one of the adjacent site pair, indicating which DST execution units to move, and updating site address range tables when confirmation of moving the DST execution units has been received. The method may repeat for each new site to insert.

The method continues at step 542 where the processing module identifies a site (e.g., a site to be eliminated) to reposition all DST execution units to one or more other adjacent sites when the updated number of sites is not greater than the current number of sites. The identifying may include selecting the site to eliminate based on at least one of a request, an error message, a site plan, and a site performance level. The method continues at step 544 where the processing module identifies a first site and a second site of an adjacent site pair to reposition the DST execution units. The identifying includes identifying DST execution units with an adjacent address range. The method continues at step 546 where the processing module facilitates repositioning one or more of the DST execution units to the first site. The facilitating includes one or more of determining a target number of DST execution units per site excluding the site to be eliminated, obtaining site address range information and determining redistribution of an address range associated with the site to be eliminated, selecting the one or more DST execution units to move that have an adjacent address range to the first site address range, indicating which DST execution units to move, and updating site address range tables when confirmation of moving the DST execution units has been received.

The method continues at step 548 where the processing module facilitates repositioning one or more of the DST execution units to the second site. The facilitating includes one or more of obtaining site address range information and determining redistribution of an address range associated with the site to be eliminated, selecting the one or more DST execution units to move that have an adjacent address range to the second site address range, indicating which DST execution units to move, and updating site address range tables when confirmation of moving the DST execution units has been received. The method continues at step 550 where the processing module facilitates repositioning one or more DST execution units from the adjacent site pair to one or more other sites that are further adjacent to the adjacent site pair. The facilitating includes one or more of selecting the one more DST execution units to move that have an adjacent address range to the further adjacent site address ranges in accordance with the target number of units per site, indicating which DST execution units to move, and updating site address range tables when confirmation of moving the DST execution units has been received.

FIG. 47A is a schematic block diagram of another embodiment of a distributed computing system that includes a client 552 and a plurality of controllers 554-560. The client 552 may be implemented utilizing at least one of a user device, a distributed storage and task (DST) processing unit, a DST execution unit, a distributed storage and test network (DSTN) managing unit, and a storage integrity processing unit. Each controller 554-560 may be implemented utilizing at least one of a DST processing unit, a dispersed storage processing unit, a dispersed storage unit, and a DST execution unit. Each controller 554-560 may include one or more of a computing core, memory for storing one or more of slices and error coded slices, and a DST client module.

The plurality of controllers 554-560 may be arranged in a plurality of levels, where each level includes one or more groups of peer controllers, where each group of controllers shares a common parent controller at a higher level. A controller may function as a parent controller when the controller is associated with one or more child controllers at a lower level. The plurality of controllers 554-560 may be utilized to access a plurality of sets of slices including accessing slices within a controller and facilitating access of slices in another controller. Each slice of the plurality of sets of slices is associated with a slice name. Each level of the plurality of levels may utilize a unique naming scheme for slice names such that a parent controller and a group of children controllers utilize a common naming scheme. A child controller of the group of children controllers may utilize a second unique naming scheme with reference to a further group of children controllers with respect to the child controller when the child controller is also a parent controller for next level of the plurality of levels.

Each controller of the plurality controllers 554-560 may execute naming scheme translation to facilitate slice access and to facilitate data migration. Each controller of the plurality controllers 554-560 may maintain an address translation table that includes one or more of a parent level address, an equivalent child level address, and a child level address to child controller identifier (ID) affiliation. In an example of accessing data, the client 552 sends a system request 562 to a first level controller 554, where the system request 562 includes a data ID of the data. The first level controller 554 accesses an associated address translation table utilizing the data ID to identify an equivalent child level address utilizing the data ID as a parent level address. Next, the first level controller 554 identifies one or more child controllers based on the child level address. The first level controller 554 translates the system request to a level 1 request 566, where the level 1 request 566 includes the child level address and an identifier of the one or more child controllers. The first level controller 554 sends the level 1 request 566 to the one or more child controllers. A second level controller 556 of the one or more child controllers accesses an associated address translation table utilizing the child level address to identify an equivalent further child level address utilizing the child level address as a parent level address. Next, the second level controller 556 identifies one or more further child controllers based on the further child level address. The second level controller 556 translates the level 1 request to a level 2 request 570, where the level 2 request 570 includes the further child level address and an identifier of the one or more further child controllers. The second controller 556 sends the level 2 request 570 to the one or more further child controllers. The process continues (e.g., through controller 558, via a level III request 574 to controller 560, etc.) until a controller that is associated with the slice of the data receives an access request and generates and sends an access response back up through the levels to the client, where the controllers at each level retranslate child level addresses into parent level addresses etc. For example, controller 560 issues a level 3 response 576 to controller 558, controller 558 issues a level 2 response 572 to controller 556, controller 556 issues a level 1 response 568 to controller 554, and controller 554 issues a system response 564 to the client 552. Each controller of the plurality controllers at any level may be associated with a slice of a data access request. The controller may respond (e.g., process the request, generate a response, and output the response) to a slice access request when the controller is associated with the slice. The controller forwards a request when the controller is not associated with the slice.

A parent controller at any level of the plurality of levels may facilitate migrating data (e.g., one more slices) from one or more source child controllers to one or more destination child controllers without notifying or updating controllers at other levels. For example, a third level parent controller facilitates moving a first group of slices from a second child controller to a fourth child controller. The facilitating includes one or more of moving the group of slices from the second child controller to the fourth child controller and updating an associated address translation table to indicate that the first group of slices are associated with the fourth child controller and disassociated with the second child controller. The third level parent controller subsequently facilitates access to the first group of slices by utilizing the fourth child controller.

FIG. 47B is a flowchart illustrating an example of migrating data. The method begins at step 578 where a processing module (e.g., of a distributed storage and task (DST) client module of a controller) determines to move data from a first controller to a second controller, where the first and second controllers are affiliated with a common controller level. The determination may be based on one or more of receiving a data migration request, detecting a migration, receiving an error message, receiving a rebuilding request, and detecting a unfavorable capacity utilization level associated with the first controller.

The method continues at step 580 where the processing module facilitates moving the data from the first controller to the second controller. The facilitating includes at least one of generating and sending a data transfer request and migrating the data. The migrating the data includes one or more of retrieving the data from the first controller and sending the data to the second controller for storage therein. The method continues at step 582 where the processing module identifies address to container location table updates. The identifying includes identifying the first controller, identifying the second controller, and identifying one or more addresses associated with the data. The method continues at step 583 where the processing module facilitates updating the address to container location table of a parent level controller based on the updates. The facilitating includes identifying the parent level controller (e.g., a query, a lookup) retrieving at least a portion of the address to container location table, modifying the at least the portion based on the updates to produce a modified portion, and storing the modified portion in the address to container location table of the identified parent level controller.

FIG. 47C is a flowchart illustrating an example of facilitating access of data. The method begins at step 584 where a processing module (e.g., of a distributed storage and task (DST) client module of a controller) receives a request from a higher level controller, where the request includes a higher level addressing (e.g., of a parent controller). When the request is not directly serviced by a present controller, the method continues at step 586 where the processing module translates a higher level address to a lower level address to produce a translated request. The processing module may determine whether the present controller shall service the request based on an address to container location table lookup. For example, processing module indicates that the request is not directly serviced by the present controller when the address to container location table lookup indicates that the lower-level address associated with a higher level address of the request is not affiliated with the present controller (e.g., affiliated with a controller on a still further lower-level). The translating includes accessing the address to container location table to extract the lower-level address associated with the higher level address generating the translated request to include the lower-level address.

The method continues at step 588 where the processing module identifies a lower-level controller associated with the lower-level address. The identifying includes accessing the address to container location table to extract a lower-level container identifier affiliated with the lower-level address. The method continues at step 590 where the processing module sends the translated request to the lower-level controller.

For example, the processing module outputs the translated request utilizing the lower-level container identifier.

FIG. 48A is a diagram illustrating an example of an address range mapping for a set of distributed storage and task (DST) execution units of a common site. For example, a common site includes DST execution units 1-3. The address range of the address range mapping includes a distributed storage and task network (DSTN) address range including at least one of a source name range and a slice name range. The address range mapping may include a site address range mapping (e.g., for a pillar of a particular vault) and for each DST execution unit of the set of DST execution units, a DST execution unit address range mapping. For example, a site address range mapping includes a slice name address range of 101-400 for a first vault and each of three DST execution units are mapped to an equal amount of address range space of the site address range. For instance, DST execution unit 1 is mapped to slice name address range 101-200, DST execution unit 2 is mapped to slice name address range 201-300, and DST execution unit 3 is mapped to slice name address range 301-400.

Address range mapping of a DST execution unit enables subsequent slice access for one or more slices associated with one or more addresses of the address range of the DST execution unit. At a first point in time, DST execution unit 2 may store 1 gigabytes (GB) of slices within its address range utilizing one fourth of a 4 GB capacity. At a subsequent point in time, DST execution unit 2 may store 3 GB of slices within its address range utilizing three fourths of the 4 GB capacity. As time goes on, an unfavorable capacity utilization level may be reached such that an additional DST execution unit may be required to facilitate storing more data within the same site address range. FIG. 48A represents a starting configuration of an example of redistributing the address range mapping when an additional DST execution unit is added to the common site and is affiliated with one or more other DST execution units at the common site (e.g., of a common vault). FIGS. 48B-C represent successive steps in the example of redistributing the address range mapping.

FIG. 48B is a diagram illustrating another example of an address range mapping for a set of legacy distributed storage and task (DST) execution units 1-3 of a common site where additional DST execution unit 4 is added in a first address range migration step to the common site providing additional storage capacity within a site address range. In the first address range migration step, a common address range magnitude to transfer from each of the legacy DST execution units is determined as a per-unit address range divided by a total number of units (e.g., including the legacy DST execution units and the additional DST execution unit). For example, the common address range magnitude to transfer is determined as 100 addresses/4 units=25 addresses per unit.

The first address range migration step further includes transferring the common address range magnitude to transfer of addresses from each of the legacy DST execution units to the additional DST execution unit. The transferring of addresses includes selecting addresses of the addresses to be transferred. The selecting may be based on one or more of a predetermination, a selection scheme, selecting a high end, selecting the low end, selecting the middle portion, selecting a contiguous portion, and selecting random addresses. For example, contiguous addresses at a high-end of each of the DST execution unit address ranges are selected when the selection scheme indicates to contiguously select high-end addresses. For instance, address range 176-200 is selected from DST execution unit 1, address range 276-300 is selected from DST execution unit 2, and address range 376-400 is selected from DST execution unit 3.

The transferring of addresses further includes associating the addresses to be transferred with the additional DST execution unit and disassociating the addresses to be transferred from the legacy DST execution units. The first address range migration step further includes transferring slices associated with the transfer addresses. The transferring of slices includes retrieving slices from the legacy DST execution units and storing slices in the additional DST execution unit. Migration of the address range mapping may end with the first step and alternatively may continue with a second step of optimization as discussed in greater detail with reference to FIG. 48C.

FIG. 48C is a diagram illustrating another example of an address range mapping for a set of legacy distributed storage and task (DST) execution units 1-3 of a common site where additional DST execution unit 4 is added in a second address range migration step to the common site providing additional storage capacity within a site address range. In the second address range migration step, an insertion point for the additional DST execution unit is identified to facilitate more contiguous address range assignments per DST execution unit. For example, the additional DST execution unit 4 is inserted between DST execution units 2 and 3 and address swaps are identified between DST execution units 3 and 4 such that DST execution unit 3 is assigned a contiguous block of addresses at an operand of the site address range. For instance, address range 301-325 of DST execution unit 3 is identified to be transferred to DST execution unit 4 and address range 376-400 of DST execution unit 4 is identified to be transferred to DST execution unit 3. As such, inserted DST execution unit 4 is assigned to a contiguous address range (e.g., 276-325) between DST execution units 2 and 3 and a contiguous address range (e.g., 176-200) between DST execution units 1 and 2. Alternatively, a still further DST execution unit may be subsequently inserted between DST execution units 1 and 2 and assigned address range 176-200 when capacity utilization becomes unfavorable.

FIG. 48D is a flowchart illustrating an example of updating an address range assignment. The method begins at step 592 where a processing module (e.g., of a distributed storage and task (DST) client module) determines to add a DST execution unit to a site that contains at least two legacy DST execution units. The determining may be based on one or more of receiving a request, detecting a new DST execution unit activation, and detecting an unfavorable storage capacity utilization level. The method continues at step 594 where the processing module obtains address range assignments for the at least two legacy DST execution units. The obtaining includes at least one of initiating a query, a lookup, and receiving the address range assignments.

The method continues at step 596 where the processing module determines a common address range magnitude to transfer from each of the at least two legacy DST execution units as a legacy DST execution unit address range divided by a total number of units. For each legacy DST execution unit, the method continues at step 598 where the processing module selects an address range to transfer in accordance with the common address range magnitude to transfer (e.g., in accordance with selection scheme). For each legacy DST execution unit, the method continues at step 600 where the processing module facilitates transferring slices and address range assignments for corresponding address range to transfer from the legacy DST execution unit to the DST execution unit (e.g., move slices, update address tables). The method continues at step 602 where the processing module identifies a further optimization insertion point for the DST execution unit. For example, the processing module identifies the insertion point between two legacy DST execution units associated with an upper end of a common site address range. The method continues at step 604 where the processing module facilitates the optimization. For example, the processing module facilitates an address range swap and a slice swap between the DST execution unit and at least one adjacent DST execution unit associated with the insertion point.

FIG. 49A is a diagram illustrating another example of an address range mapping for a plurality of distributed storage and task (DST) execution units of a common site. For example, a common site includes DST execution units 1-6. The address range of the address range mapping includes a distributed storage and task network (DSTN) address range including at least one of a source name range and a slice name range. The address range mapping may include a site address range mapping (e.g., for a pillar of a particular vault) and for each DST execution unit of the plurality of DST execution units, a DST execution unit address range mapping. For example, a site address range mapping includes a slice name address range of 101-700 for a first vault and each of six DST execution units are mapped to an equal amount of address range space of the site address range. For instance, DST execution unit 1 is mapped to slice name address range 101-200, DST execution unit 2 is mapped to slice name address range 201-300, DST execution unit 3 is mapped to slice name address range 301-400 etc.

Address range mapping of a DST execution unit enables subsequent slice access for one or more slices associated with one or more addresses of the address range of the DST execution unit. At a first point in time, DST execution unit 5 may store 1 gigabytes (GB) of slices within its address range utilizing one fourth of a 4 GB capacity. At a subsequent point in time, DST execution unit 5 may store 3 GB of slices within its address range utilizing three fourths of the 4 GB capacity. As time goes on, an unfavorable capacity utilization level may be reached such that an additional DST execution unit may be required to facilitate storing more data within the same site address range. FIG. 49A represents a starting configuration of an example of redistributing the address range mapping when a set of new DST execution units is added to the common site and is affiliated with the plurality of DST execution units. FIG. 49B represents a an example of redistributing the address range mapping across the set of new DST execution units from the plurality of DST execution units.

FIG. 49B is a diagram illustrating another example of an address range mapping for a plurality of legacy distributed storage and task (DST) execution units 1-6 of a common site where a set of new DST execution units 7-10 are added to the common site providing additional storage capacity within a site address range. The adding of the set of new DST execution units includes determining a common address range magnitude to transfer from each of the legacy DST execution units 1-6 as a per-unit address range divided by a total number of units (e.g., including the plurality of legacy DST execution units and the set of new DST execution units). For example, the common address range magnitude to transfer is determined as 100 addresses/10 units=10 addresses per unit such that each legacy unit contributes 10 addresses of the 100 addresses to each of the other 9 units so that each unit receives 60 addresses. Alternatively, an amount of addresses per unit after the transfer is determined is the address range of the site address range divided by the total number of units (e.g., 600/10=60).

The set of new DST execution units are inserted amongst the plurality of legacy DST execution units utilizing a even distribution approach. For example, a new DST execution unit is inserted approximately after every two legacy DST execution units (e.g., 10/4=2.5). For instance, DST execution unit 7 precedes DST execution unit 1, DST execution unit 8 is inserted between DST execution units 2 and 3, DST execution unit 9 is inserted between DST execution units 4 and 5, and DST execution unit 10 follows DST execution unit 6. The transferring of the address ranges includes transferring the common address range magnitude to transfer of addresses from each of the legacy DST execution units to the set of new DST execution units.

The transferring of address ranges includes selecting addresses of the addresses to be transferred. The selecting may be based on one or more of a predetermination, a selection scheme, selecting a high end, selecting the low end, selecting the middle portion, selecting a contiguous portion, and selecting random addresses. For example, contiguous addresses are selected across the site address range such that each DST execution unit receives an equal amount of contiguous address range space. For instance, address range 101-160 is selected from DST execution unit 1 to be transferred to DST execution unit 7, address range 201-220 is selected from DST execution unit 2 to be transferred to DST execution unit 1, address range 281-300 is selected from DST execution unit 2 to be transferred to DST execution unit 8, address range 301-340 is selected from DST execution unit 3 to be transferred to DST execution unit 8, etc. as illustrated in FIG. 49B.

The transferring of addresses further includes associating the addresses to be transferred with DST execution units to receive the addresses and disassociating the addresses to be transferred from DST execution units originating the addresses. The transferring of addresses further includes transferring slices associated with the transfer addresses. The transferring of slices includes retrieving slices from an originating DST execution unit and storing slices in a receiving DST execution unit.

FIG. 49C is a flowchart illustrating another example of updating an address range assignment. The method begins at step 606 where a processing module (e.g., of a distributed storage and task (DST) client module) determines to add a set of new DST execution units to a site that contains a plurality of legacy DST execution units. The determining may be based on one or more of receiving a request, detecting a set of new DST execution units activation, and detecting an unfavorable storage capacity utilization level associated with the plurality of legacy DST execution units. The method continues at step 608 where the processing module obtains address range assignments for the plurality of legacy DST execution units. The obtaining includes at least one of initiating a query, a lookup, and receiving the address range assignments.

The method continues at step 610 of the processing module determines a common address range magnitude for each of the set of new DST execution units and the plurality of legacy DST execution units as a total address space of the plurality of legacy DST execution units divided by a total number of units including the plurality of DST execution units and the set of new DST execution units. For example, the common address range magnitude is determined as 600/10=60 when the common address range is 600 and a total number of units is 10.

For each DST execution unit of the set of new DST execution units, the method continues at step 612 where the processing module identifies an insertion point of a set of insertion points based on a number of total units and a number of units of the set of new DST execution units to facilitate contiguous addressing. For each legacy DST execution unit of the plurality of legacy DST execution units, the method continues at step 614 where the processing module determines an address range to transfer in accordance with the common address range magnitude and the set of insertion points. The determining includes determining the address range to transfer such that each DST execution unit of the total number of DST execution units includes the common address range magnitude number of addresses and includes a contiguous address range with regards to an adjacent pair of DST execution units. For each legacy DST execution unit, the method continues at step 616 where the processing module facilitates transferring slices and address range assignments for a corresponding address range to transfer from the legacy DST execution unit to a corresponding new DST execution unit in accordance with the insertion points.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a rebuilding module of a computing device within a dispersed storage network (DSN), the method comprising:

identifying an encoded data slice having an error, wherein the encoded data slice has a slice name and a revision number and wherein a storage unit of the DSN stores the encoded data slice;

sending a lock command to the storage unit, wherein the lock command instructs the storage unit to ignore access requests regarding the encoded data slice from other entities of the DSN and to ignore write-related requests and delete-related requests regarding other encoded data slices from the other entities of the DSN and wherein the other encoded data slices have the slice name but different revision numbers than the encoded data slice; and in response to a lock acknowledgement from the storage unit, selecting a resolution from a set of resolutions for the error of the encoded data slice, wherein the set of resolutions includes: rebuilding the encoded data slice, issuing a set of delete requests to storage units of the DSN regarding a set of encoded data slices, issuing a set of undo requests to the storage units of the DSN regarding the set of encoded data slices, and issuing a set of roll-back requests to the storage units of the DSN regarding the set of encoded data slices, wherein the set of encoded data slices includes the encoded data slice and the storage units of the DSN include the storage unit.

2. The method of claim 1 further comprising:

when the resolution for the error of the encoded data slice has been executed, sending an unlock command to the storage unit.

3. The method of claim 1, wherein the identifying the encoded data slice having the error comprises at least one of:

identifying the encoded data slice via a rebuilding detection process;

receiving a message indicating the error; and receiving a response to a query regarding the encoded data slice.

4. The method of claim 1, wherein determining to rebuild the encoded data slice comprises:

determining whether at least a threshold number of encoded data slices of the set of encoded data slices is stored in the DSN, wherein a data segment is dispersed storage error encoded to produce the set of encoded data slices, and wherein the set of encoded data slices includes the encoded data slice; and when the at least a threshold number of encoded data slices is stored in the DSN, rebuilding the encoded data slice using at least one of a partial rebuilding process and a rebuilding process.

5. The method of claim 1, wherein determining to issue the set of delete requests comprises:

when a determination is made not to rebuild the encoded data slice, determining status of a write process; and when the status of the write process is complete, issuing the set of delete requests to the storage units of the DSN to delete the set of encoded data slices, which includes the encoded data slice.

6. The method of claim 1, wherein determining to issue the set of undo requests comprises:

when a determination is made not to rebuild the encoded data slice, determining status of a write process; and when the status of the write process is at a commit phase, issuing the set of undo requests to the storage units of the DSN to undo storing the set of encoded data slices, which includes the encoded data slice.

7. The method of claim 1, wherein determining to issue the set of roll-back requests comprises:

when a determination is made not to rebuild the encoded data slice, determining status of a write process; and when the status of the write process is at an initial write phase, issuing the set of roll-back requests to the storage units of the DSN to retract the initial write phase regarding storing the set of encoded data slices, which includes the encoded data slice.

8. The method of claim 1, wherein the selecting the resolution further comprises:

requesting re-issuance of a write command regarding the encoded data slice.

9. The method of claim 1 further comprising:

sending a resolution request regarding the resolution to at least one of the other entities of the DSN for execution of the resolution.

10. A dispersed storage (DS) module of a computing device within a dispersed storage network (DSN), the DS module comprising:

a first module, when operable within the computing device, causing the computing device to:

identify an encoded data slice having an error, wherein the encoded data slice has a slice name and a revision number and wherein a storage unit of the DSN stores the encoded data slice;

a second module, when operable within the computing device, causing the computing device to:

send a lock command to the storage unit, wherein the lock command instructs the storage unit to ignore access requests regarding the encoded data slice from other entities of the DSN and to ignore write-related requests and delete-related requests regarding other encoded data slices from the other entities of the DSN and wherein the other encoded data slices have the slice name but different revision numbers than the encoded data slice; and a third module, when operable within the computing device, causing the computing device to:

in response to a lock acknowledgement from the storage unit, select a resolution from a set of resolutions for the error of the encoded data slice, wherein the set of resolutions includes: rebuilding the encoded data slice, issuing a set of delete requests to storage units of the DSN regarding a set of encoded data slices, issuing a set of undo write requests to the storage units of the DSN regarding the set of encoded data slices, and issuing a set of roll-back write requests to the storage units of the DSN regarding the set of encoded data slices, wherein the set of encoded data slices includes the encoded data slice and the storage units of the DSN include the storage unit.

11. The DS module of claim 10 further comprising:

when the resolution for the error of the encoded data slice has been executed, the third module further functions to send an unlock command to the storage unit.

12. The DS module of claim 10, wherein the first module functions to identify the encoded data slice having the error by at least one of:

identifying the encoded data slice via a rebuilding detection process;

receiving a message indicating the error; and receiving a response to a query regarding the encoded data slice.

13. The DS module of claim 10, wherein the third module further functions to determine to rebuild the encoded data slice by:

determining whether at least a threshold number of encoded data slices of the set of encoded data slices is stored in the DSN, wherein a data segment is dispersed storage error encoded to produce the set of encoded data slices, and wherein the set of encoded data slices includes the encoded data slice; and when the at least a threshold number of encoded data slices is stored in the DSN, rebuilding the encoded data slice using at least one of a partial rebuilding process and a rebuilding process.

14. The DS module of claim 10, wherein the third module further functions to determine to issue the set of delete requests by:

when a determination is made not to rebuild the encoded data slice, determining status of a write process; and when the status of the write process is complete, issuing the set of delete requests to the storage units of the DSN to delete the set of encoded data slices, which includes the encoded data slice.

15. The DS module of claim 10, wherein the third module further functions to determine to issue the set of undo requests by:

when a determination is made not to rebuild the encoded data slice, determining status of a write process; and when the status of the write process is at a commit phase, issuing the set of undo requests to the storage units of the DSN to undo storing the set of encoded data slices, which includes the encoded data slice.

16. The DS module of claim 10, wherein the third module further functions to determine to issue the set of roll-back requests by:

when a determination is made not to rebuild the encoded data slice, determining status of a write process; and when the status of the write process is at an initial write phase, issuing the set of roll-back requests to the storage units of the DSN to retract the initial write phase regarding storing the set of encoded data slices, which includes the encoded data slice.

17. The DS module of claim 10, wherein the third module further functions to determine the resolution further by:

requesting re-issuance of a write command regarding the encoded data slice.

18. The DS module of claim 10 further comprising:

the third module further functions to send a resolution request regarding the resolution to at least one of the other entities of the DSN for execution of the resolution.

* * * * *